Dec. 11, 1956 R. L. LORENZ 2,773,733

WORKMEN'S IN-AND-OUT RECORDER

Filed April 17, 1953 32 Sheets-Sheet 1

INVENTOR.
RICHARD L. LORENZ
BY
Atty.

Dec. 11, 1956 R. L. LORENZ 2,773,733

WORKMEN'S IN-AND-OUT RECORDER

Filed April 17, 1953 32 Sheets-Sheet 2

INVENTOR.
RICHARD L. LORENZ

BY [signature]

Atty.

Dec. 11, 1956 R. L. LORENZ 2,773,733

WORKMEN'S IN-AND-OUT RECORDER

Filed April 17, 1953 32 Sheets-Sheet 3

INVENTOR.
RICHARD L. LORENZ
BY
H. H. Hulse
Atty.

INVENTOR.
RICHARD L. LORENZ
BY
Atty.

Dec. 11, 1956 R. L. LORENZ 2,773,733

WORKMEN'S IN-AND-OUT RECORDER

Filed April 17, 1953 32 Sheets-Sheet 5

INVENTOR.
RICHARD L. LORENZ

BY [signature]
Atty.

INVENTOR.
RICHARD L. LORENZ
BY
[signature]
Atty.

Dec. 11, 1956 R. L. LORENZ 2,773,733

WORKMEN'S IN-AND-OUT RECORDER

Filed April 17, 1953 32 Sheets-Sheet 7

Stepping Mechanism

INVENTOR.
RICHARD L. LORENZ

BY H. H. Hulse

Atty.

INVENTOR.
RICHARD L. LORENZ
BY [signature]
Atty.

INVENTOR.
RICHARD L. LORENZ
BY
[signature]
Atty.

Dec. 11, 1956 R. L. LORENZ 2,773,733

WORKMEN'S IN-AND-OUT RECORDER

Filed April 17, 1953 32 Sheets-Sheet 10

INVENTOR.
RICHARD L. LORENZ
BY H. H. Hulse
Atty.

Dec. 11, 1956 R. L. LORENZ 2,773,733

WORKMEN'S IN-AND-OUT RECORDER

Filed April 17, 1953 32 Sheets-Sheet 11

ENERGY RELEASE

INVENTOR.
RICHARD L. LORENZ

BY H. H. Hulse
Atty.

INVENTOR.
RICHARD L. LORENZ
BY
Atty.

Dec. 11, 1956 R. L. LORENZ 2,773,733

WORKMEN'S IN-AND-OUT RECORDER

Filed April 17, 1953 32 Sheets-Sheet 13

INVENTOR.
RICHARD L. LORENZ
BY
Atty.

Dec. 11, 1956 R. L. LORENZ 2,773,733

WORKMEN'S IN-AND-OUT RECORDER

Filed April 17, 1953 32 Sheets-Sheet 14

SELECTOR MECHANISM

INVENTOR.
RICHARD L. LORENZ
BY H. H. Hulse
Atty.

Dec. 11, 1956 R. L. LORENZ 2,773,733

WORKMEN'S IN-AND-OUT RECORDER

Filed April 17, 1953 32 Sheets-Sheet 15

PROGRAM UNIT

INVENTOR.
RICHARD L. LORENZ
BY H. H. Hulse
Atty.

Dec. 11, 1956 R. L. LORENZ 2,773,733

WORKMEN'S IN-AND-OUT RECORDER

Filed April 17, 1953 32 Sheets-Sheet 16

INVENTOR.
RICHARD L. LORENZ
BY H. H. Hulse
atty.

INVENTOR.
RICHARD L. LORENZ
BY
[signature]
Atty.

Dec. 11, 1956 R. L. LORENZ 2,773,733

WORKMEN'S IN-AND-OUT RECORDER

Filed April 17, 1953 32 Sheets-Sheet 18

INVENTOR.
RICHARD L. LORENZ
by: [signature] Atty.

Dec. 11, 1956 R. L. LORENZ 2,773,733

WORKMEN'S IN-AND-OUT RECORDER

Filed April 17, 1953 32 Sheets-Sheet 19

INVENTOR.
RICHARD L. LORENZ

BY

[signature]

Atty.

WORKMEN'S IN-AND-OUT RECORDER

Filed April 17, 1953 32 Sheets-Sheet 20

INVENTOR.
RICHARD L. LORENZ
BY
[signature]
Atty.

INVENTOR.
RICHARD L. LORENZ
BY [signature]
Atty.

INVENTOR.
RICHARD L. LORENZ
BY H. H. Hulse
Atty.

Dec. 11, 1956 R. L. LORENZ 2,773,733

WORKMEN'S IN-AND-OUT RECORDER

Filed April 17, 1953 32 Sheets-Sheet 23

CARD PRESSED DOWN

INVENTOR.
RICHARD L. LORENZ by: H. H. Hulse
Atty.

INVENTOR.
RICHARD L. LORENZ by: [signature] Atty.

INVENTOR.
RICHARD L. LORENZ
BY
H. H. Hulse
Atty.

Dec. 11, 1956 R. L. LORENZ 2,773,733

WORKMEN'S IN-AND-OUT RECORDER

Filed April 17, 1953 32 Sheets-Sheet 26

INVENTOR
RICHARD L. LORENZ by H. H. Hulse
Atty.

INVENTOR
RICHARD L. LORENZ
by: H. V. Hulse Atty.

INVENTOR.
RICHARD L. LORENZ
BY
Atty.

INVENTOR.
RICHARD L. LORENZ
BY
[signature]
Atty.

WORKMEN'S IN-AND-OUT RECORDER

Filed April 17, 1953 32 Sheets-Sheet 30

INVENTOR.
RICHARD L. LORENZ
BY
H. F. Hula
Atty.

INVENTOR.
RICHARD L. LORENZ
BY
H. H. Hulse [signature]
Atty.

INVENTOR.
RICHARD L. LORENZ
BY [signature]
Atty.

United States Patent Office 2,773,733
Patented Dec. 11, 1956

2,773,733

WORKMEN'S IN-AND-OUT RECORDER

Richard L. Lorenz, Chicago, Ill., assignor to General Time Corporation, New York, N. Y., a corporation of Delaware Application April 17, 1953, Serial No. 349,419

59 Claims. (Cl. 346—84)

The present invention relates to recorders, and more particularly to a device for recording time on a time card or record sheet.

It is a general object of the present invention to provide a recorder which has a high degree of reliability under all service conditions. It is another object to provide a recorder which may be operated in spite of power failure in the commercial A.-C. supply lines although normally obtaining a portion of its electrical energy from such lines.

More specifically, it is an object to provide a recorder which is electrically powered and fully automatic, but which is automatically conditioned for manual printing during failure of the A.-C. supply lines, thereby preventing the holding up of a line of employees and insuring an uninterrupted time record. It is a more detailed object to provide a recorder in which automatic printing is reestablished upon restoration of power in the A.-C. lines.

It is another object to provide a recorder which is completely reliable in spite of careless treatment on the part of the users, such as rough and incomplete insertion of time cards, tampering, insertion of foreign objects and the like. It is still another object to provide a recorder in which all critical moving parts are locked in position, making the recorder highly resistant to shock and vibration.

It is a further object to provide a recorder in which all of the functions except applying the printing impulse are performed using the energy in the periodic timing impulses supplied from a master clock. More specifically, it is an object to provide a recorder having a novel provision for storing energy from the timing impulses over a period of time and for releasing such energy for later performance of "shift," "lift," color change, or other programmed functions. It is an object to provide a recorder of the above type which requires a minimum amount of power from the timing impulses and which is capable of operating wholly and in normal fashion from auxiliary batteries during power-off conditions.

It is a further object relative to the foregoing to provide a recorder which requires only light-duty wiring from master clock to recorder, and which may be used for replacement in existing recorder systems or added to existing systems without necessity for rewiring.

It is a further general object to provide a recorder which is flexible in use and which is adaptable, with only minor modifications or adjustment, to the widely varying requirements of all types and sizes of businesses having different work schedules, different overtime procedures and using time cards having a different size and arrangement of data, including data subtractively printed to facilitate wage extension in the accounting department.

It is an object related to the above to provide a recorder which is universal in application and which employs a novel unit construction enabling the same basic recorder to be employed with different lift and shift mechanisms, and different program units, as well as different type units and clock faces.

It is another object to provide a recorder which is capable of performing more programmed functions than conventional devices and in which any programmed function may be performed, either singly or in multiple during any desired minute during a 24-hour day, and repeated as often as required during the day. It is still another object to provide a recorder which is easily and quickly set up and programmed for operation. More specifically, it is an object to provide a recorder in which the program of functions may be established by inexperienced personnel in a direct fashion without employing charts or the like and in which the clock face, shift and lift mechanisms are readily brought into synchronism with the master clock, requiring no subsequent adjustment or attention.

It is another object to provide a recorder which produces a printed record which is neater in appearance and which has the impressions more precisely located than is possible using conventional recorders. It is a related object to provide a recorder which is fully automatic but in which accuracy of imprint is assured even during manual operation.

It is an object of the invention in one of its aspects to provide a recorder which is primarily intended for operation as a slave in a battery operating master system but which is nevertheless capable of timing by an internal synchronous motor. It is a further object to provide a recorder which may be used as an independent unit timed by a self-contained light-duty synchronous motor.

It is a further object to provide a recorder having novel provision for preventing front-to-back insertion of record cards.

Finally, it is an object to provide a recorder which is relatively simple and straightforward of construction, which is long-lived and which is less expensive to manufacture than other recorders having a lesser degree of flexibility.

Other objects and advantages of the invention will be apparent upon reference to the drawings, in which.

Figures 10, 10A, 10B:
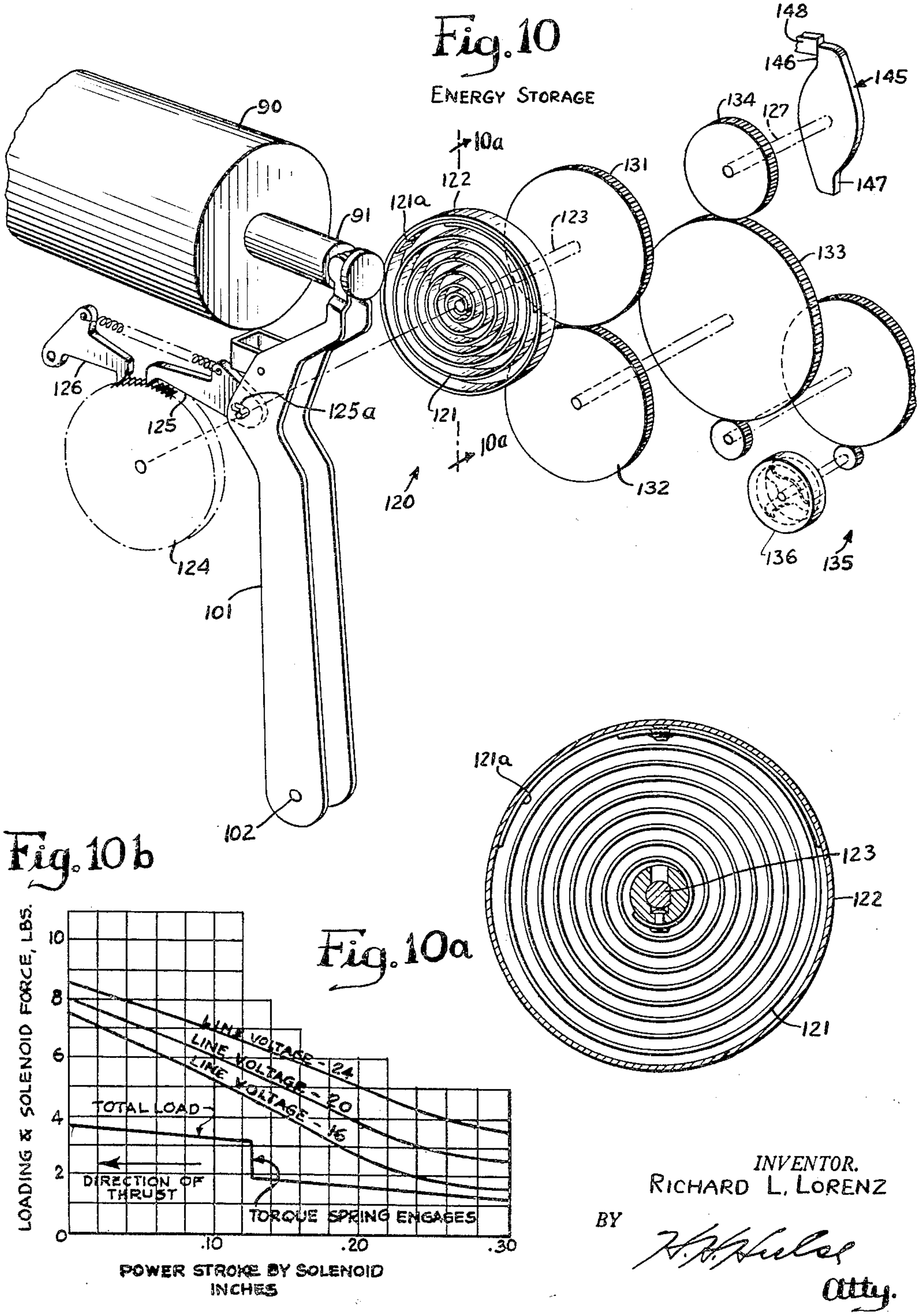
Fig. 10 is a diagrammatic view of the energy storage mechanism.

Fig. 10*a* is a section taken along the line **10*a*—10*a*** in Fig. 10 showing the slip clutch construction.

Fig. 10*b* is a plot of force characteristics.

Figure 11:
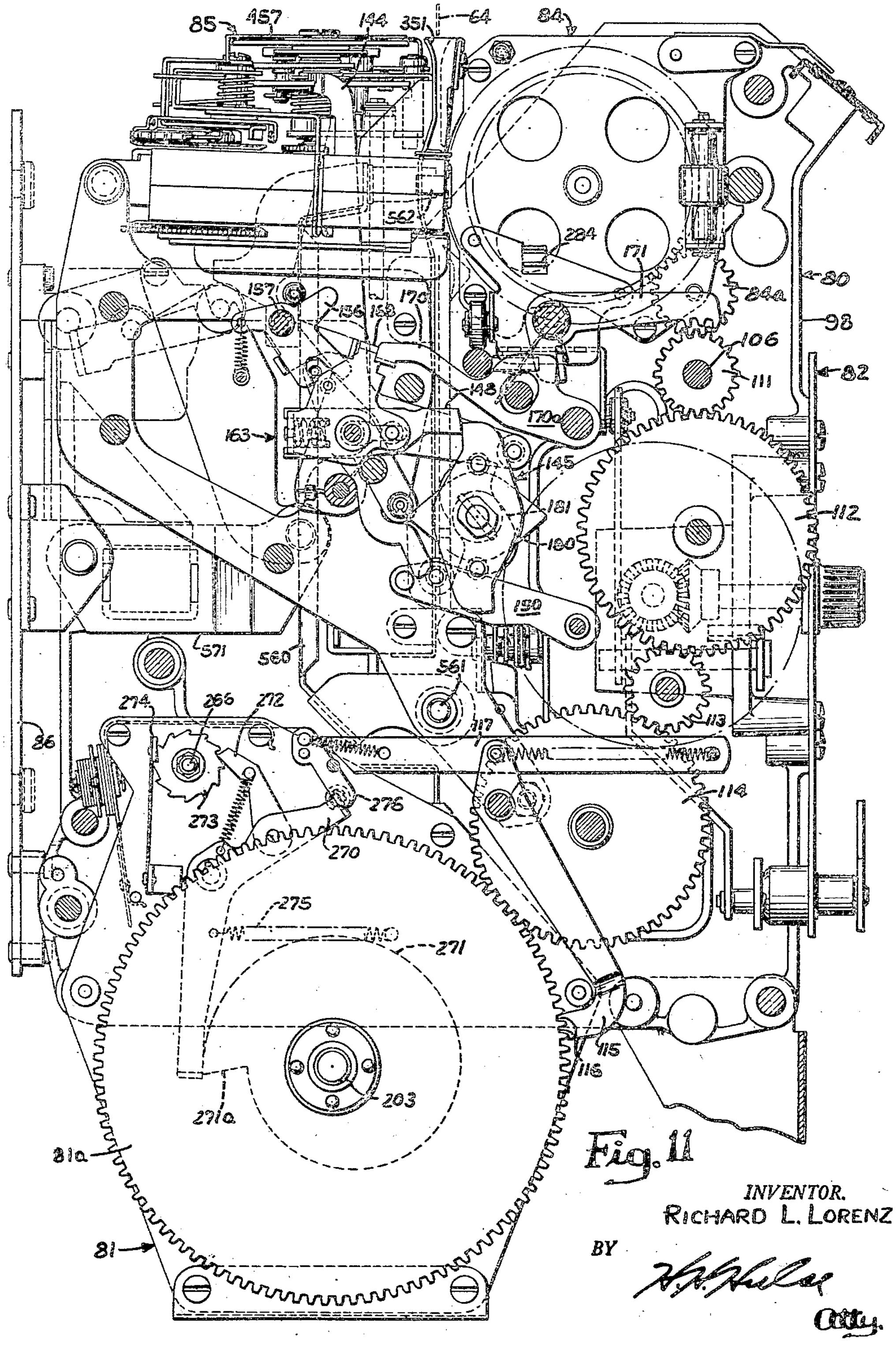

Fig. 11 shows the left-hand side of the recorder in elevation with the frame plate removed.

Figure 8:
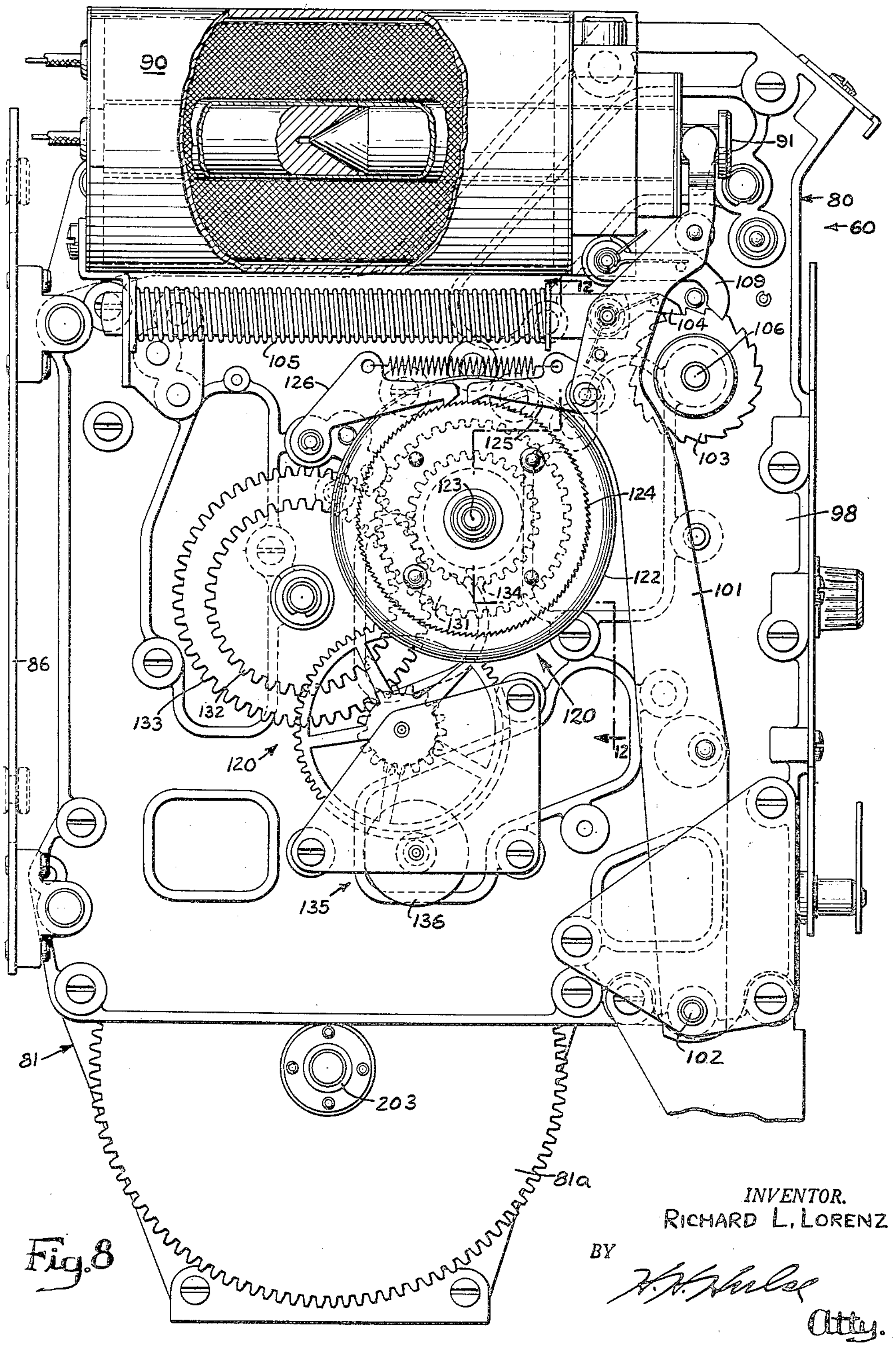
Fig. 8 is an elevation showing the recorder viewed from the left.
Figure 12:
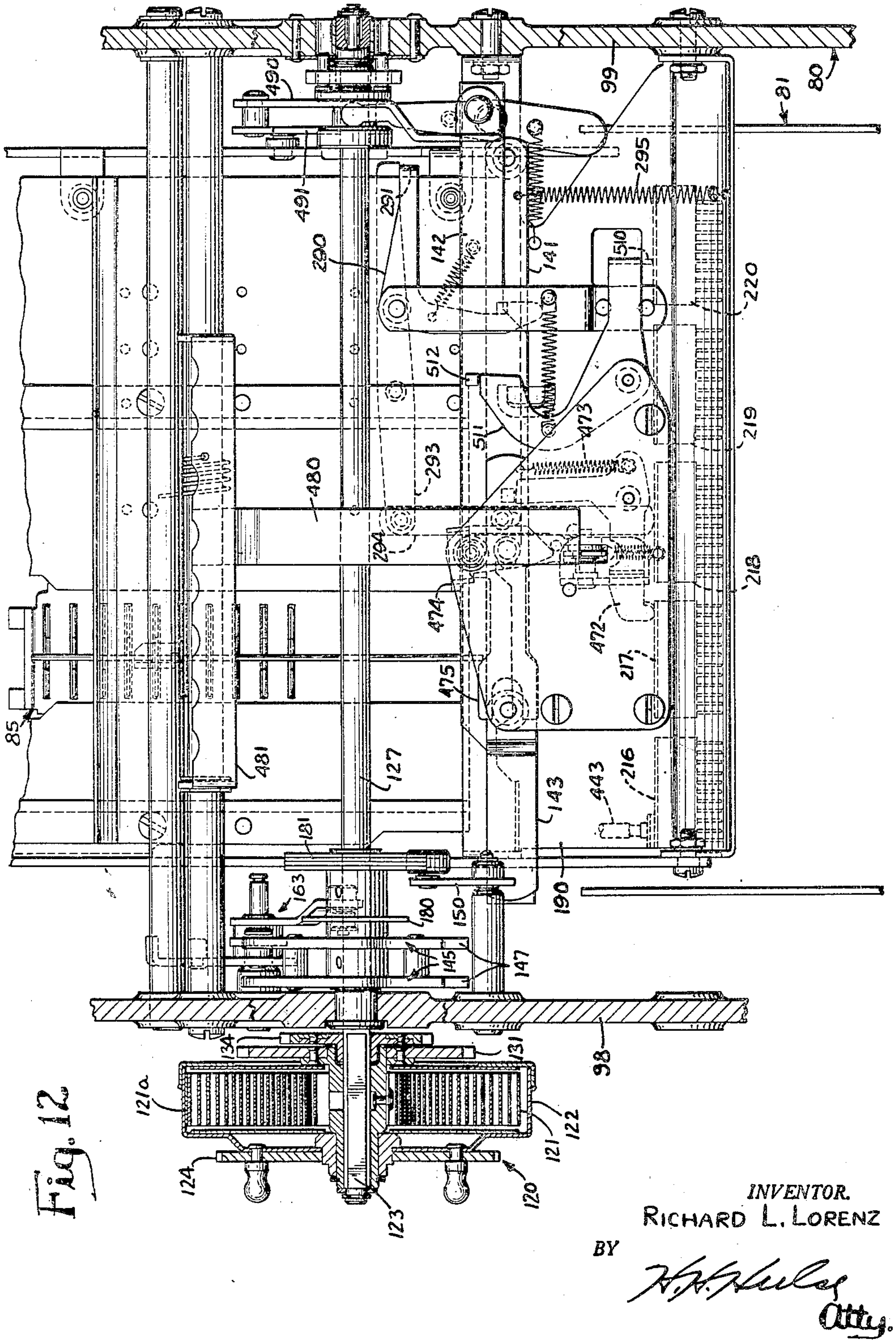

Fig. 12 is a section taken along the line 12—12 in Fig. 8.

Figure 13:
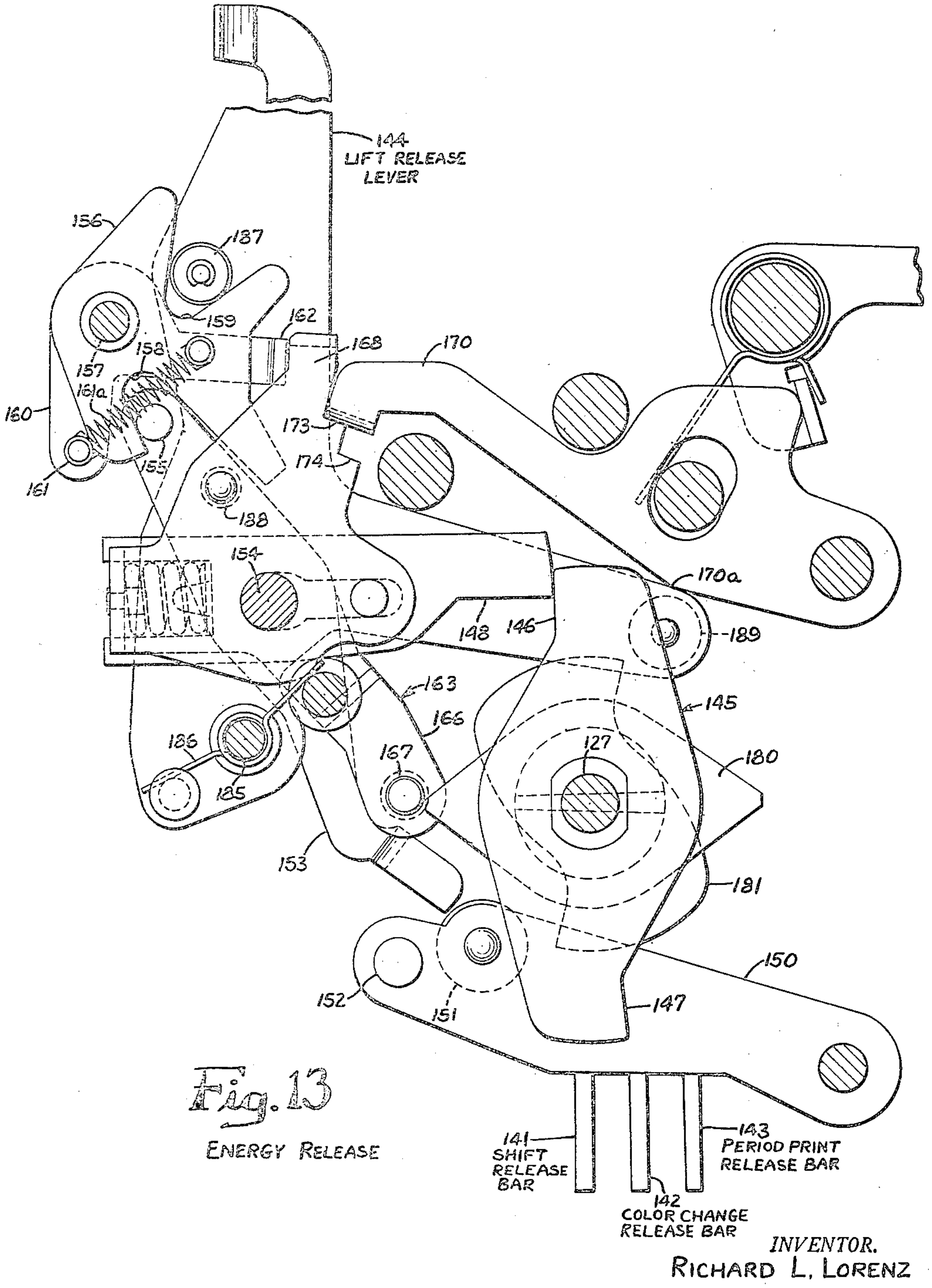

Fig. 13 is an enlarged fragmentary elevation of the torque release mechanism, in the "at rest" position.

Figures 14, 15:
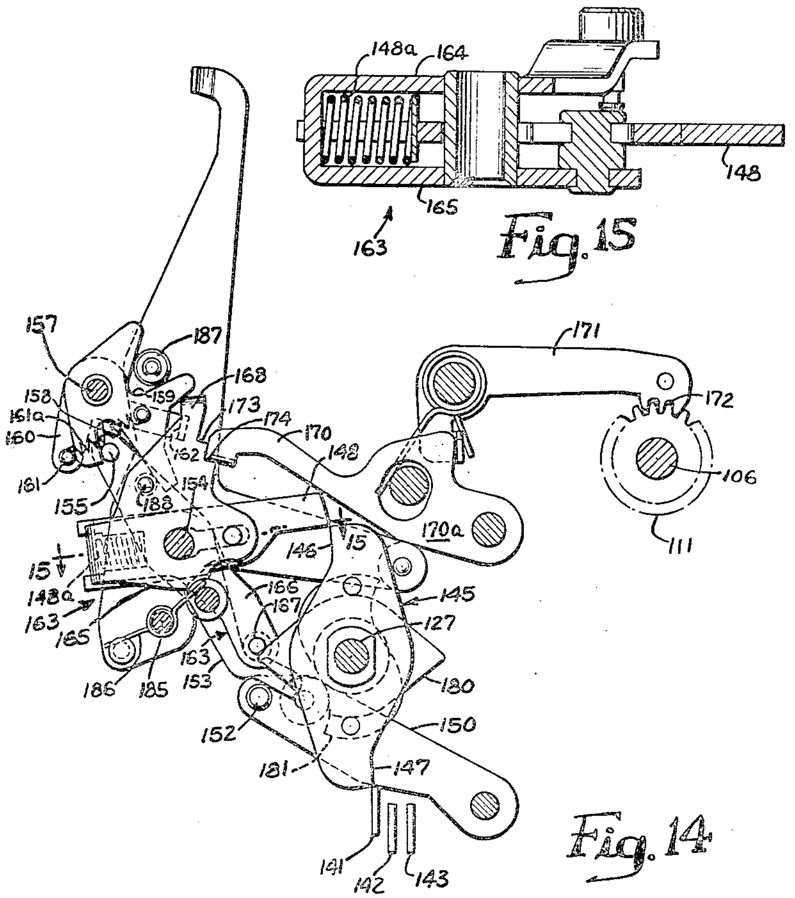

Fig. 14 is a view similar to Fig. 13 showing the position of the mechanism after tripping and just prior to release of the torque shaft.

Fig. 15 is a section taken along the line 15—15 in Fig. 14.

Figure 16:
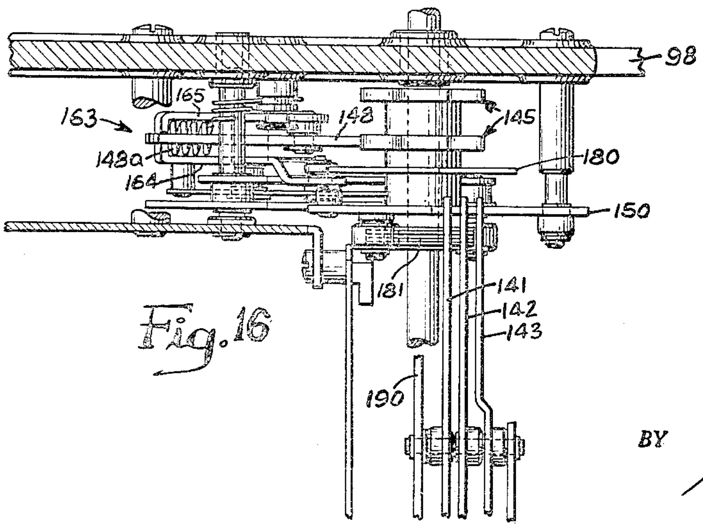

Fig. 16 is a bottom view of the structure shown in Fig. 14.

Figure 17:
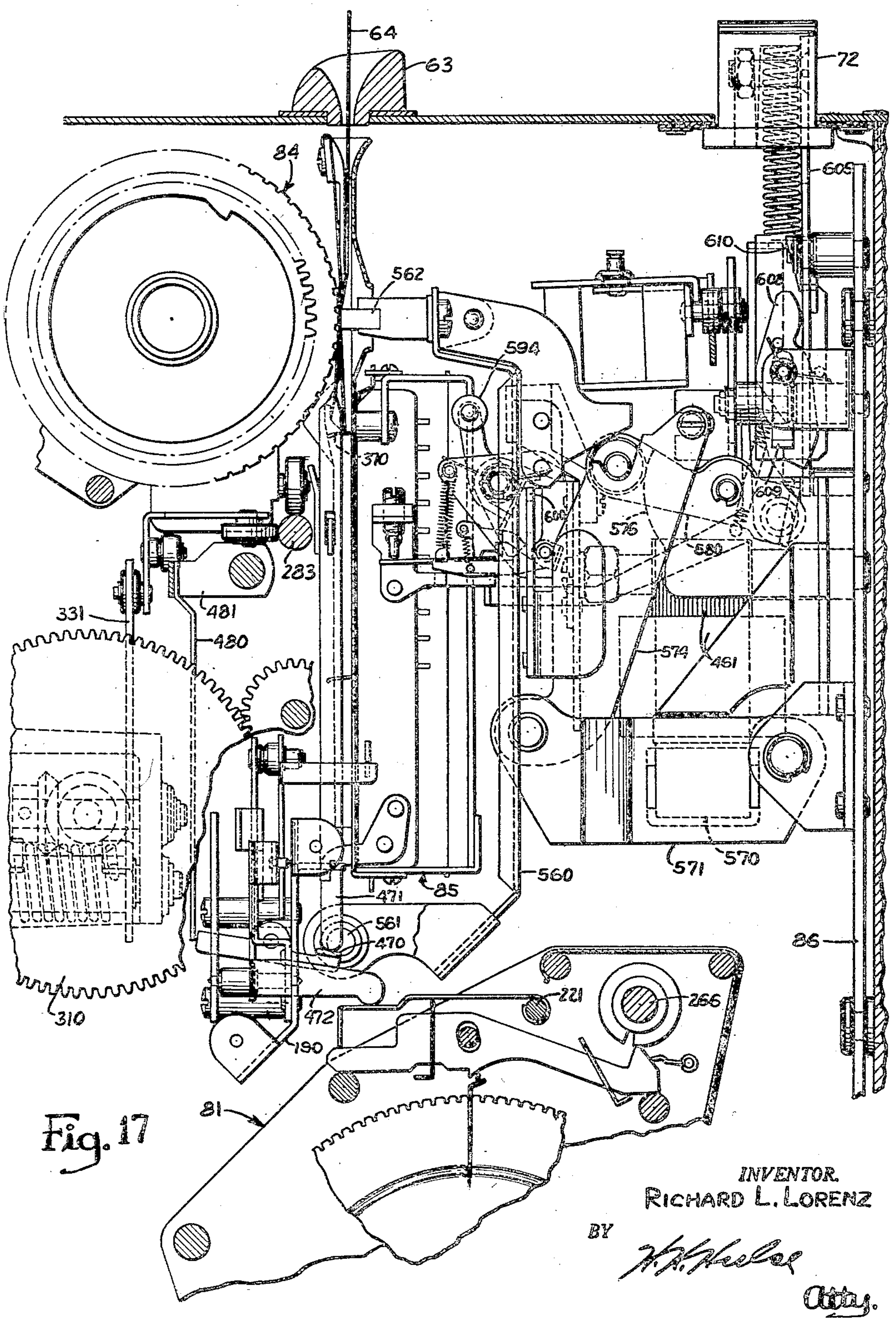

Fig. 17 is a partial right-hand side view of the recorder with the frame plate removed.

Figure 18:
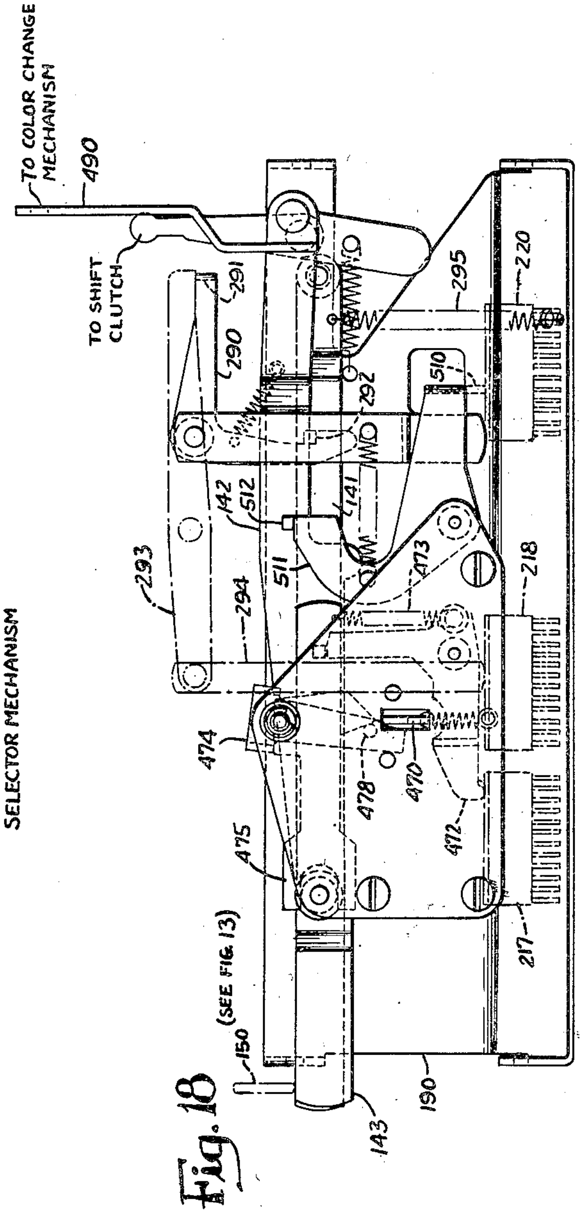

Fig. 18 is an elevation showing the selector mechanism.

Figure 19:
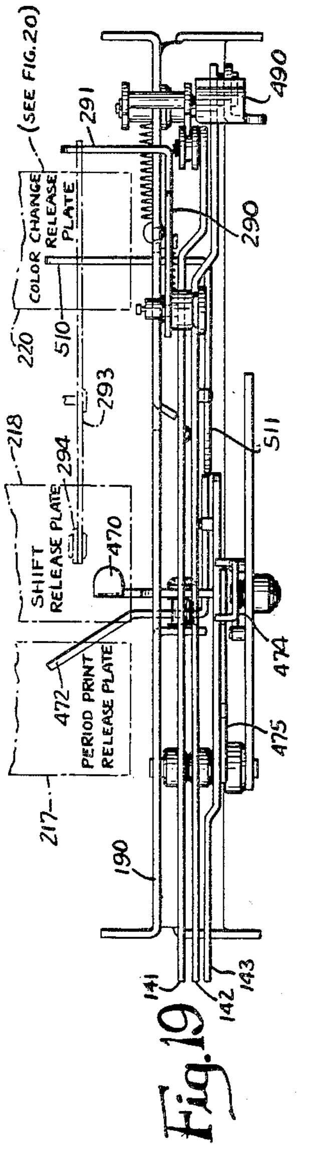

Fig. 19 is a top view of the selector mechanism of Fig. 18.

Figures 20, 20A, 20B:
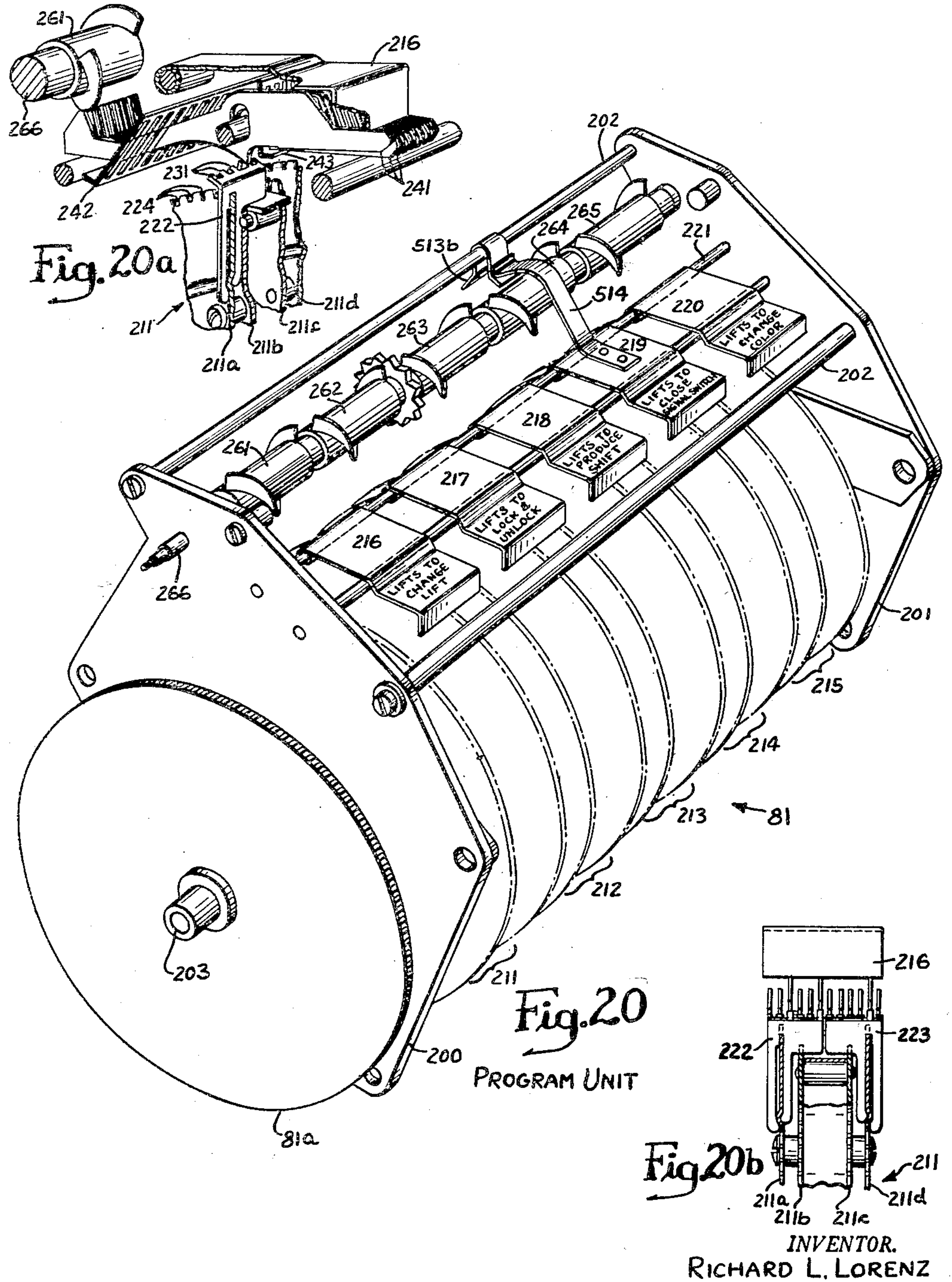

Fig. 20 is a perspective view of the program unit.

Fig. 20*a* is a fragmentary perspective showing the sensing fingers being acted upon by the program disc.

Fig. 20*b* is a fragmentary cross section showing the mounting of two clips in place on a program disc.

Figure 21:
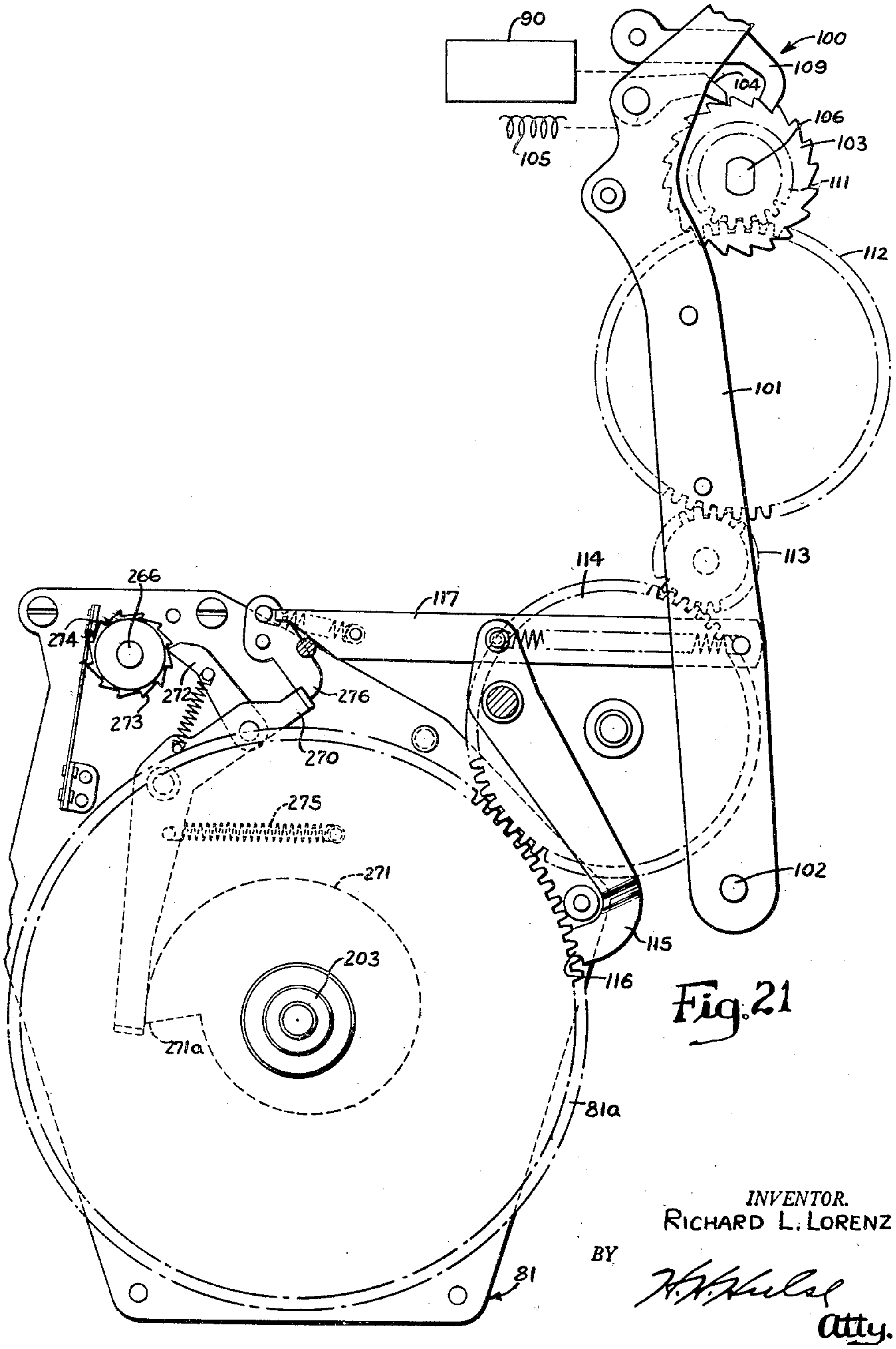

Fig. 21 shows the means for rotating the helical fulcrum members.

Figure 22:
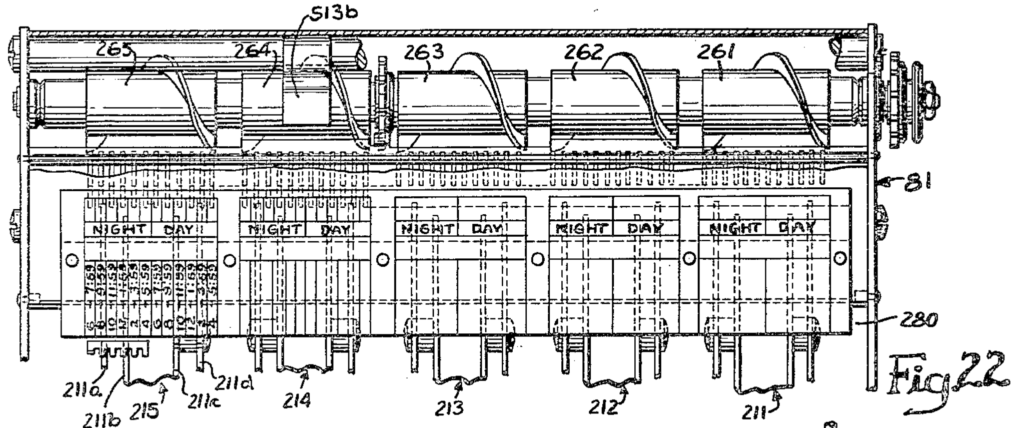

Fig. 22 shows the upper portion of the program unit as viewed from the rear and showing the index plate.

Figure 23:
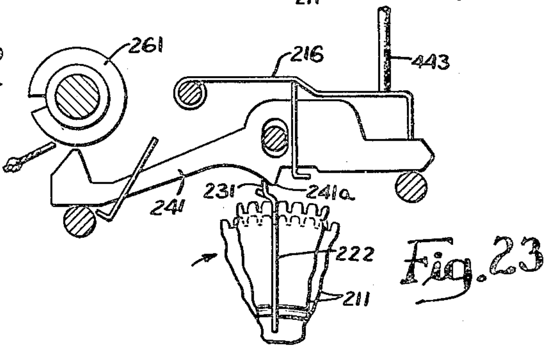
Figure 24:
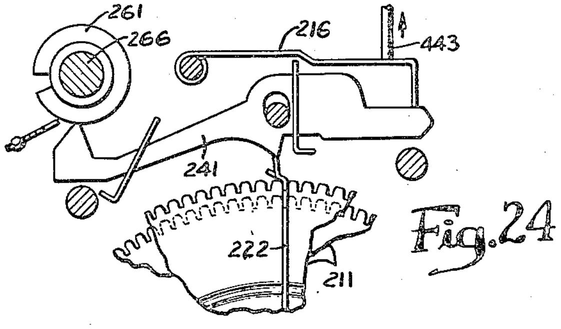

Figs. 23 and 24 are stop motion views of a sensing finger acted upon by a program disc.

Figure 25A:
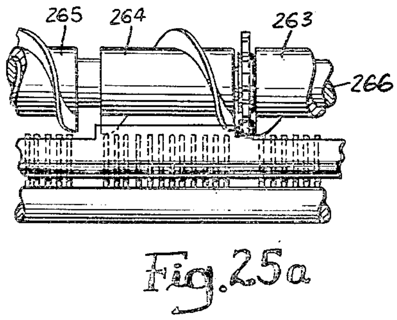
Figure 25:
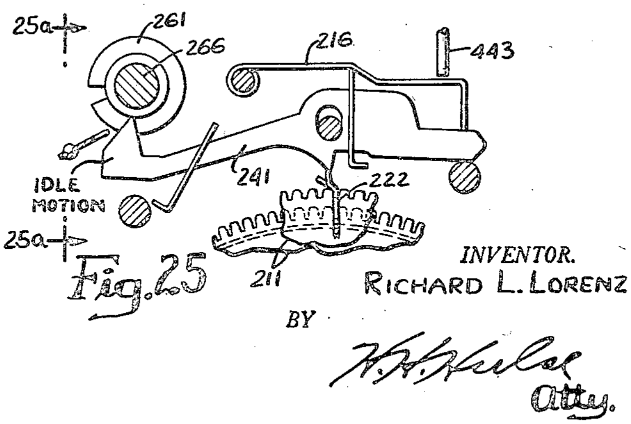

Fig. 25 shows the idle motion of the inactive sensing fingers.

Fig. 25*a* is a fragmentary view taken along the line **25*a*—25*a*** in Fig. 25.

Figures 26, 27, 27A, 27B:
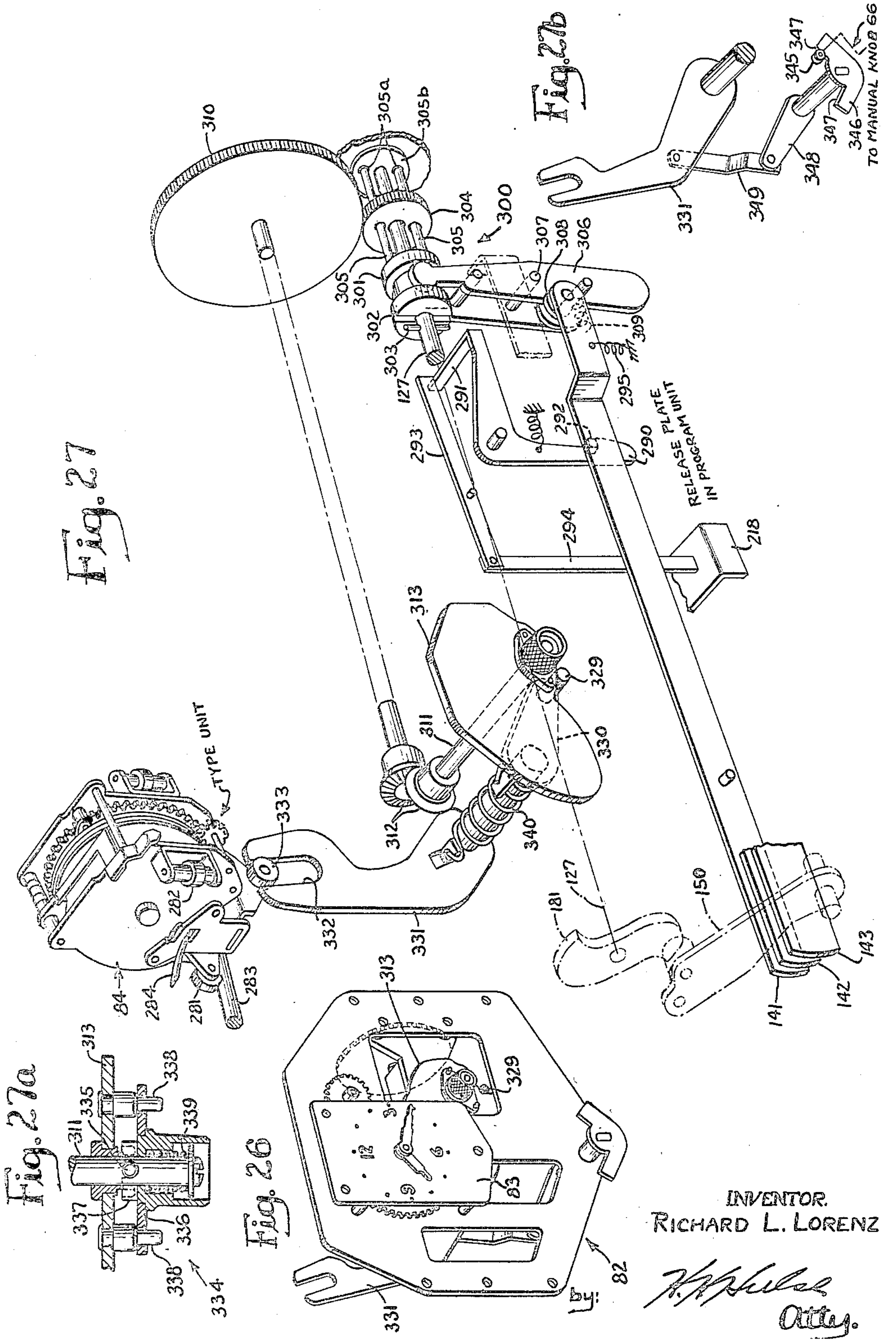

Fig. 26 is a general view of the shift unit.

Fig. 27 is a diagrammatic partially exploded view of the shift mechanism.

Fig. 27*a* shows the cam coupling in partial section.

Fig. 27*b* shows the linkage for manually moving the shift lever.

Figures 28, 29, 30, 31:
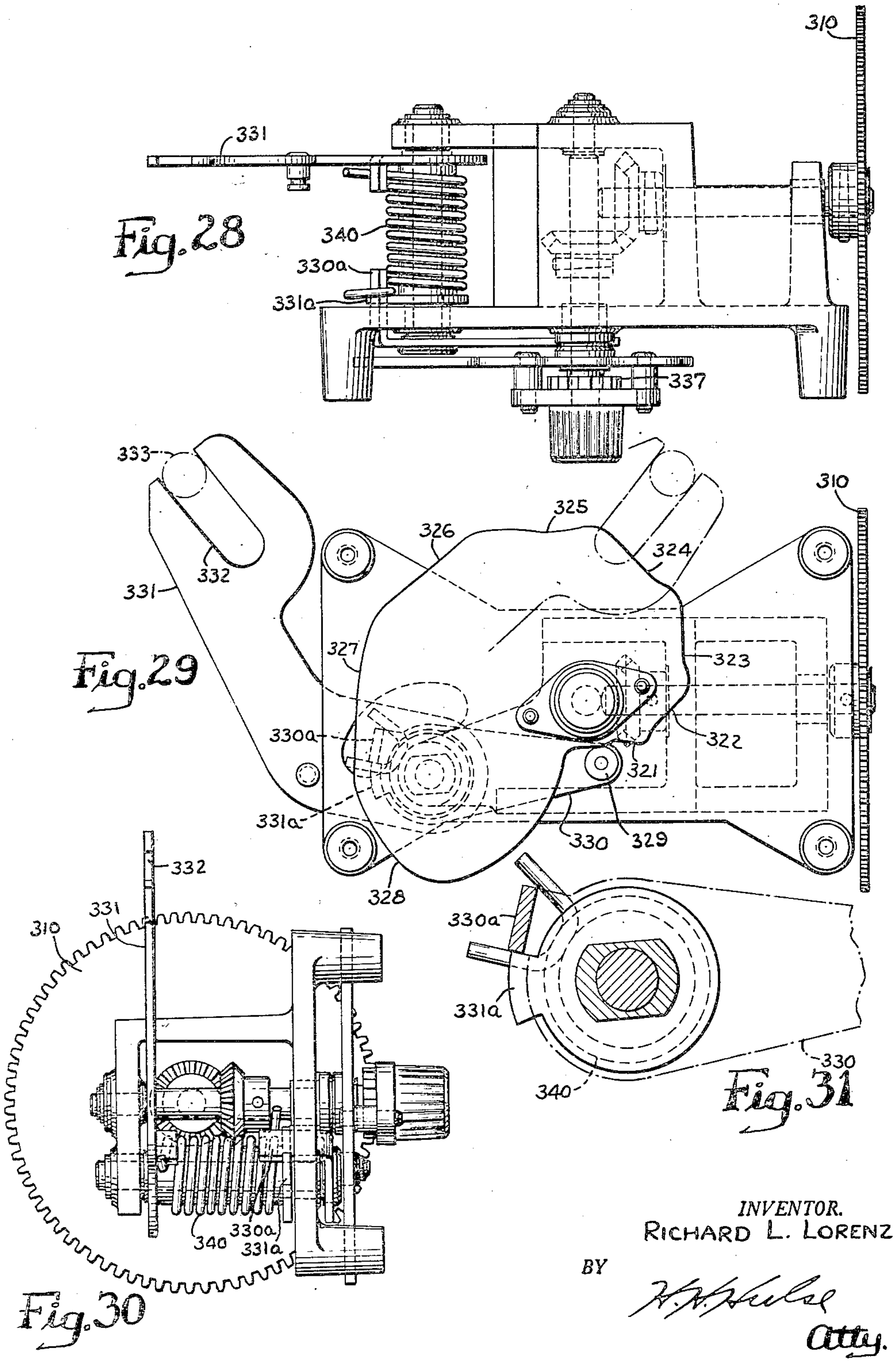

Figs. 28, 29 and 30 are top, front and side views respectively of the shift mechanism.

Figures 30A, 30B, 30C, 32, 38:
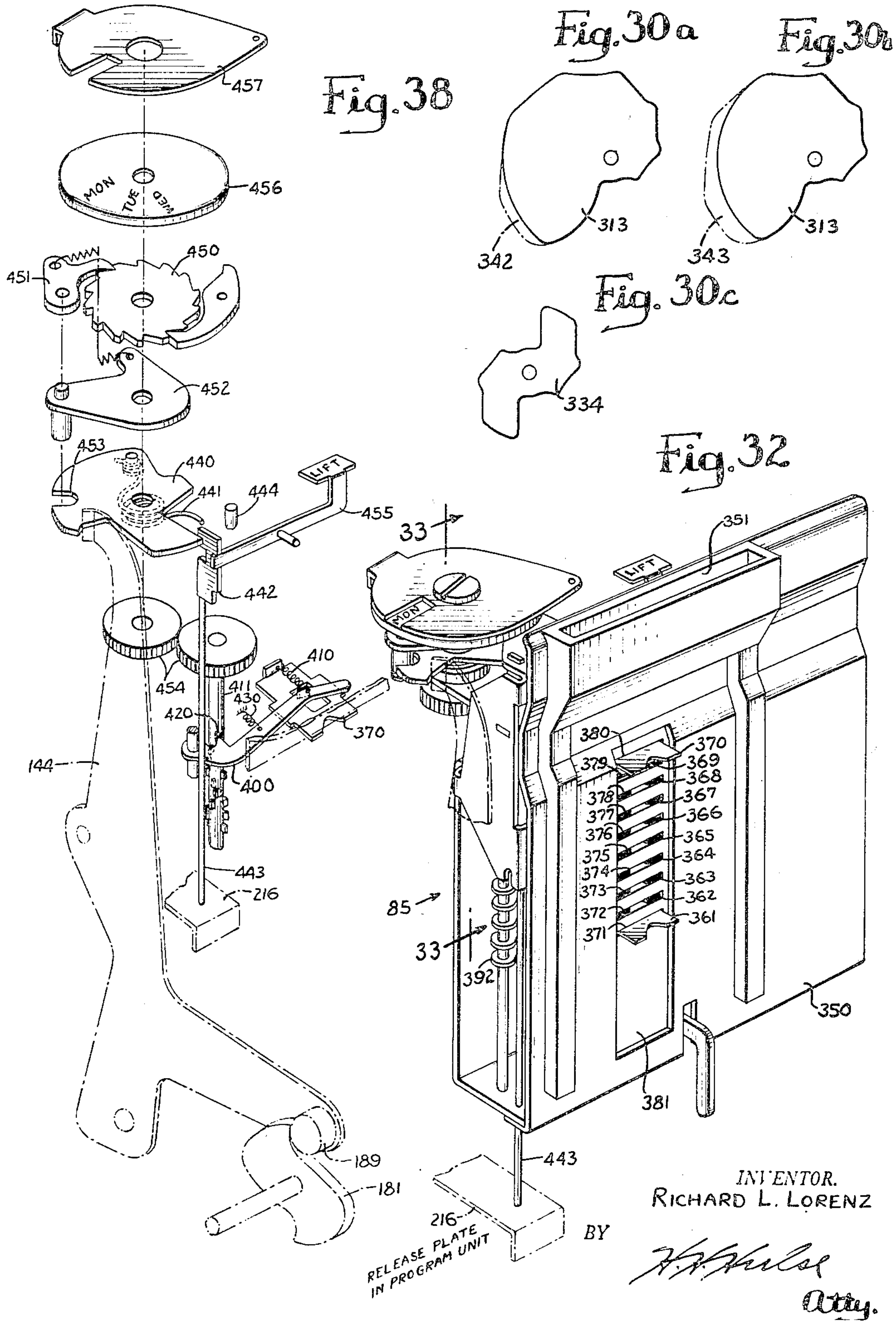

Fig. 30*a* shows a shift cam for use with a card having seven columns.

Fig. 30*b* shows a cam for use with a card having six columns.

Fig. 30*c* shows a two-lobed cam for use with cards having four columns.

Fig. 31 is a fragmentary section showing the resilient coupling between the cam and type unit to permit manual positioning of the latter.

Fig. 32 is a general perspective view of the lift unit.

Figure 33:
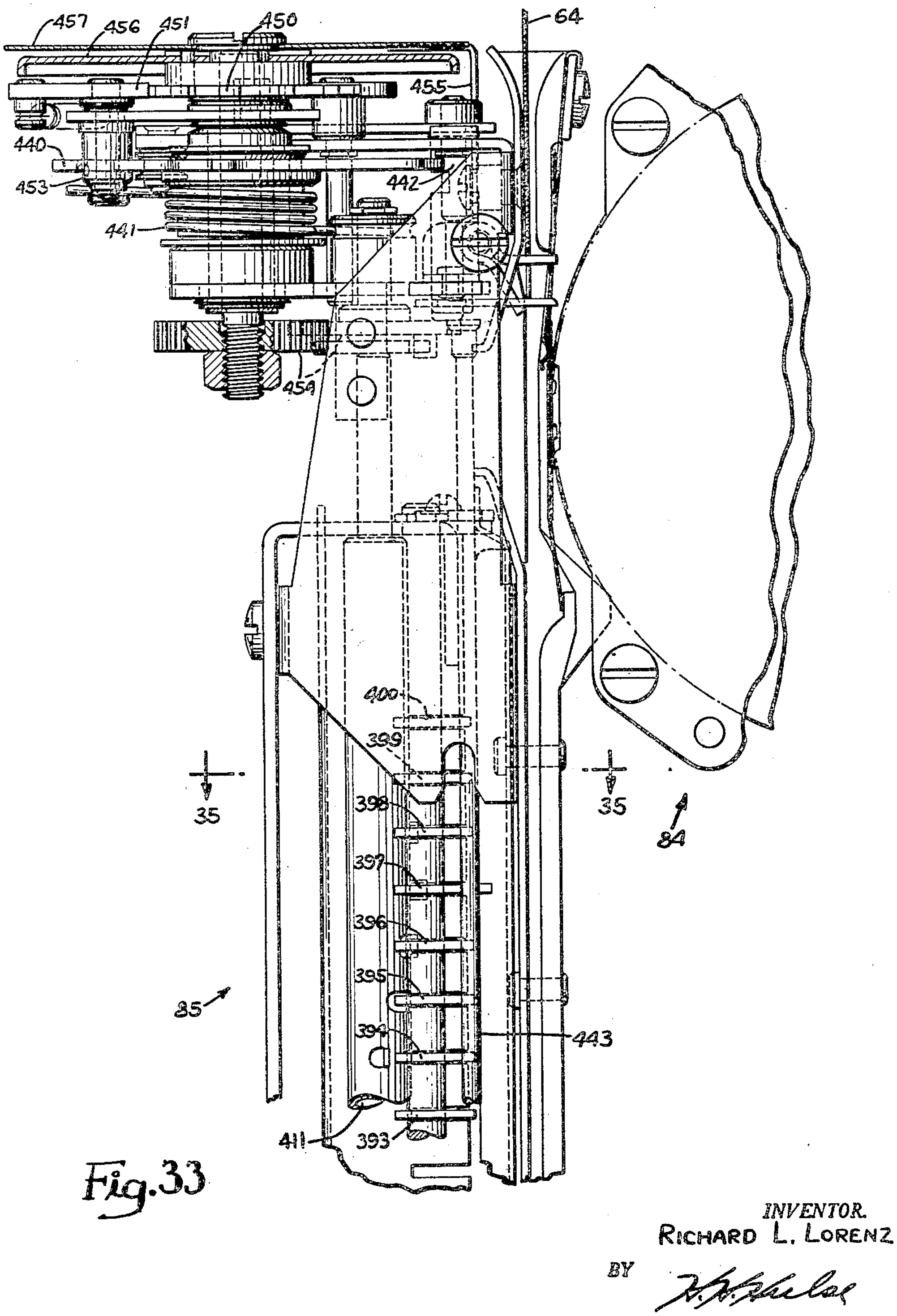

Fig. 33 is a side elevation of the lift unit in partial section.

Figure 34:
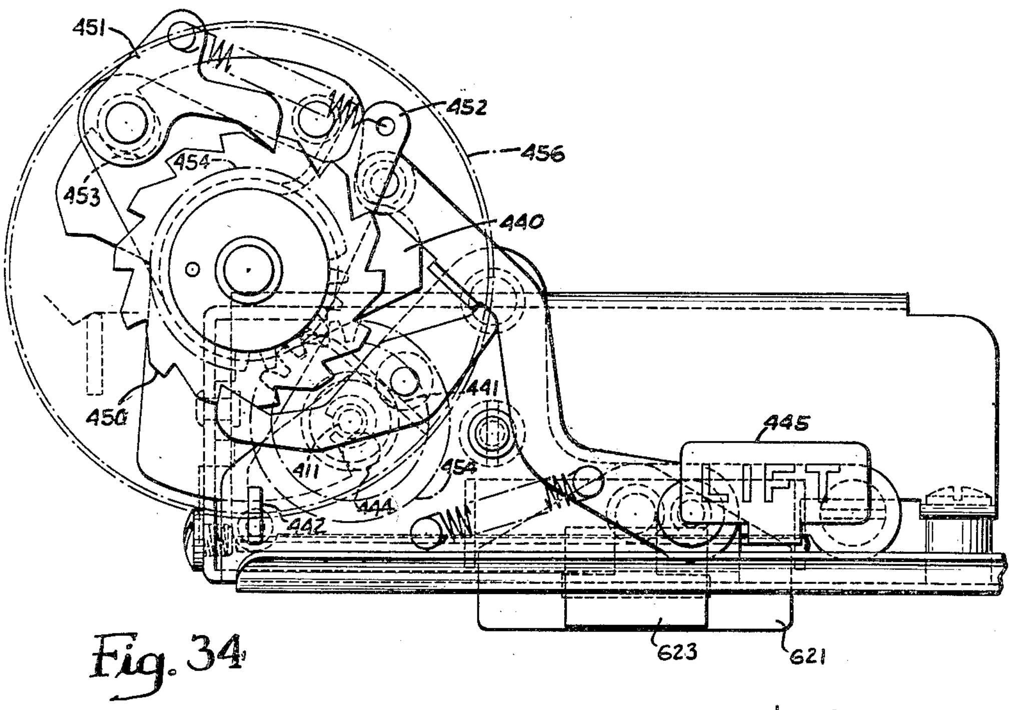

Fig. 34 is a top view of the lift unit.

Figure 35:
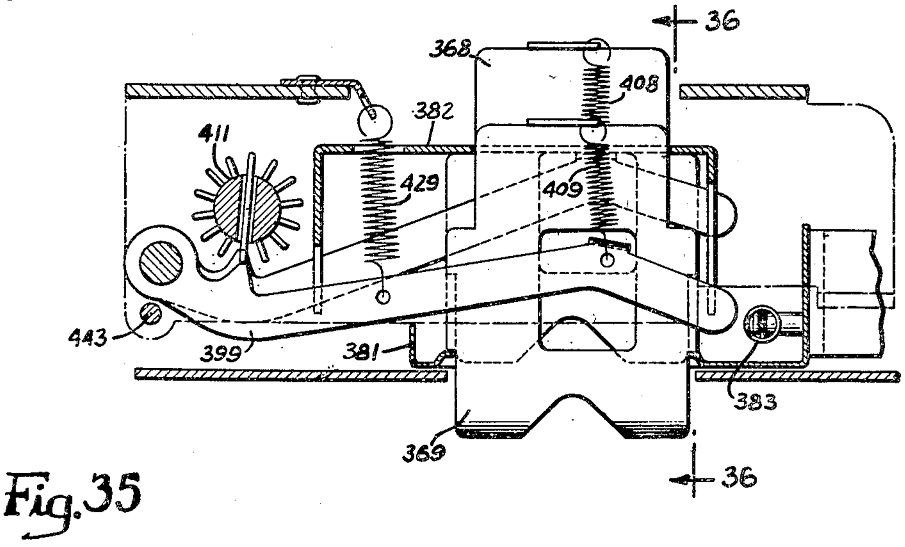

Fig. 35 is a cross section of the lift unit taken along the line 35—35 in Fig. 33.

Figures 36, 39:
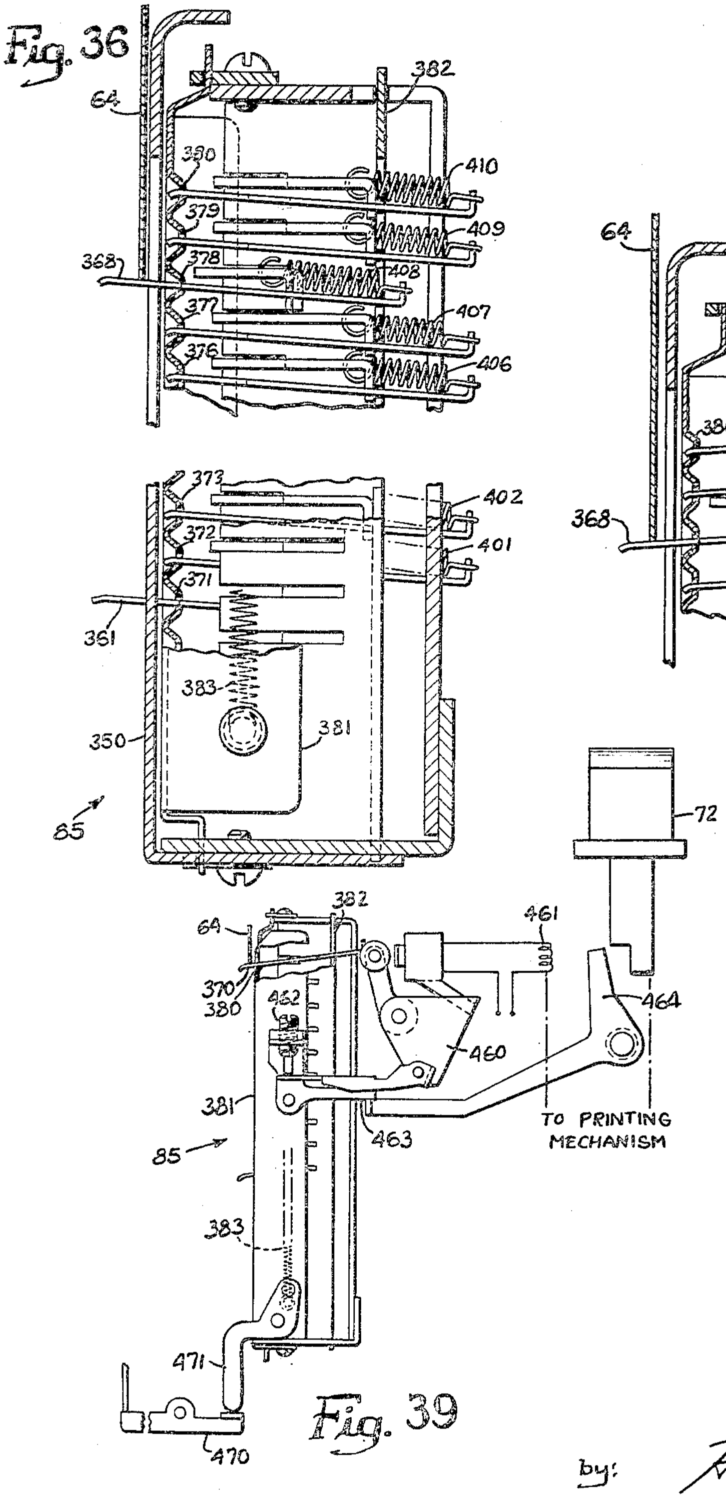

Fig. 36 is a cross section taken along the line 36—36 in Fig. 35 and prior to insertion of a card.

Figure 37:
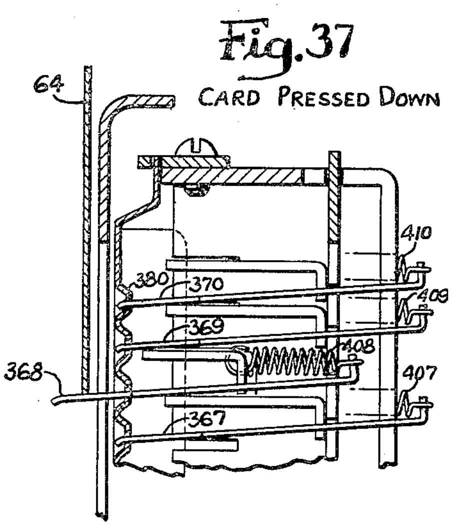

Fig. 37 is a cross section similar to Fig. 35 showing the effect of bottoming a card.

Fig. 38 is a diagrammatic view of the lift mechanism partially exploded.

Fig. 39 is a diagrammatic view of the contact slide of the lift unit and the elements operated thereby.

Figures 40, 53:
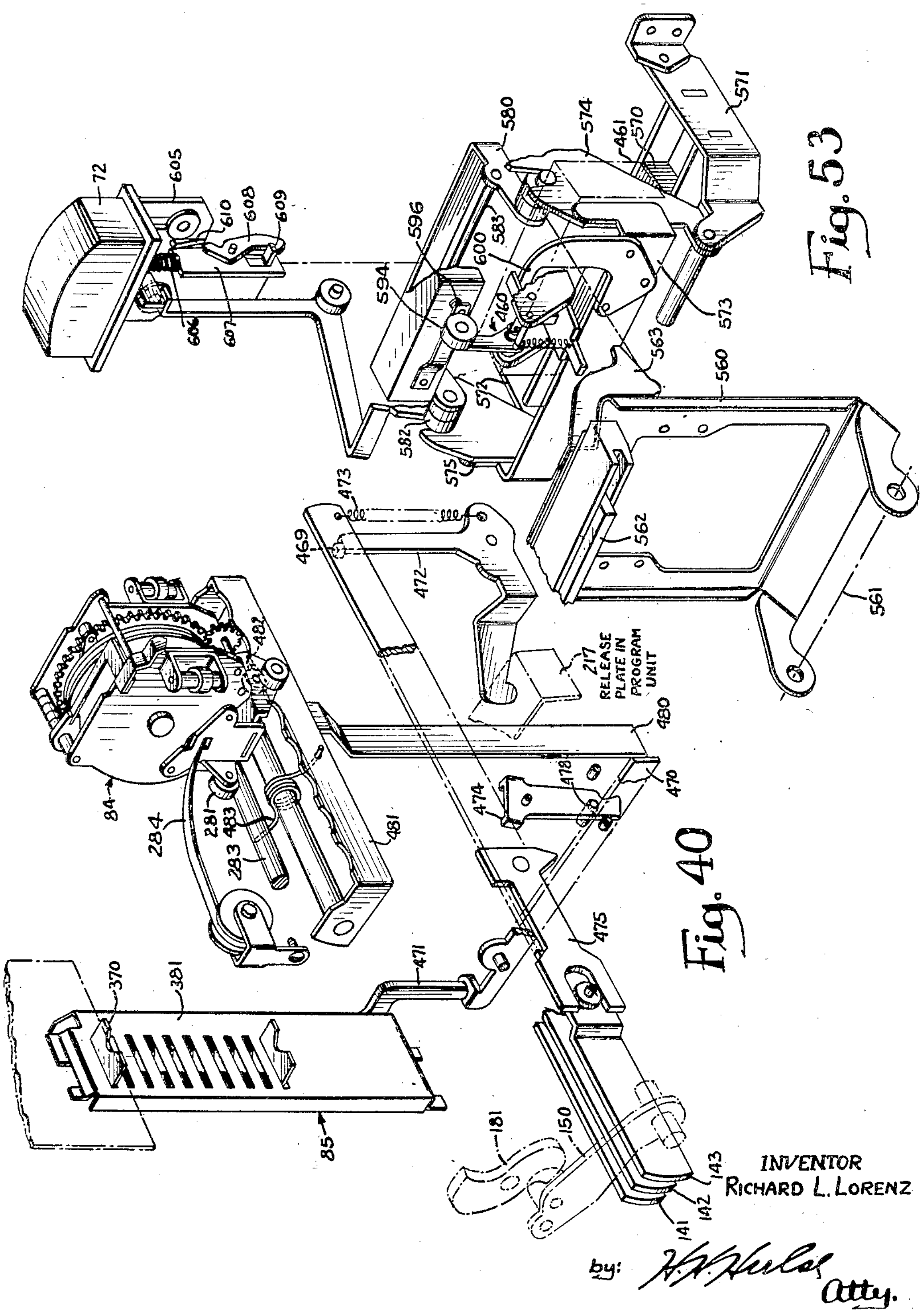

Fig. 40 shows the locking mechanism exploded for clarity.

Figure 41:
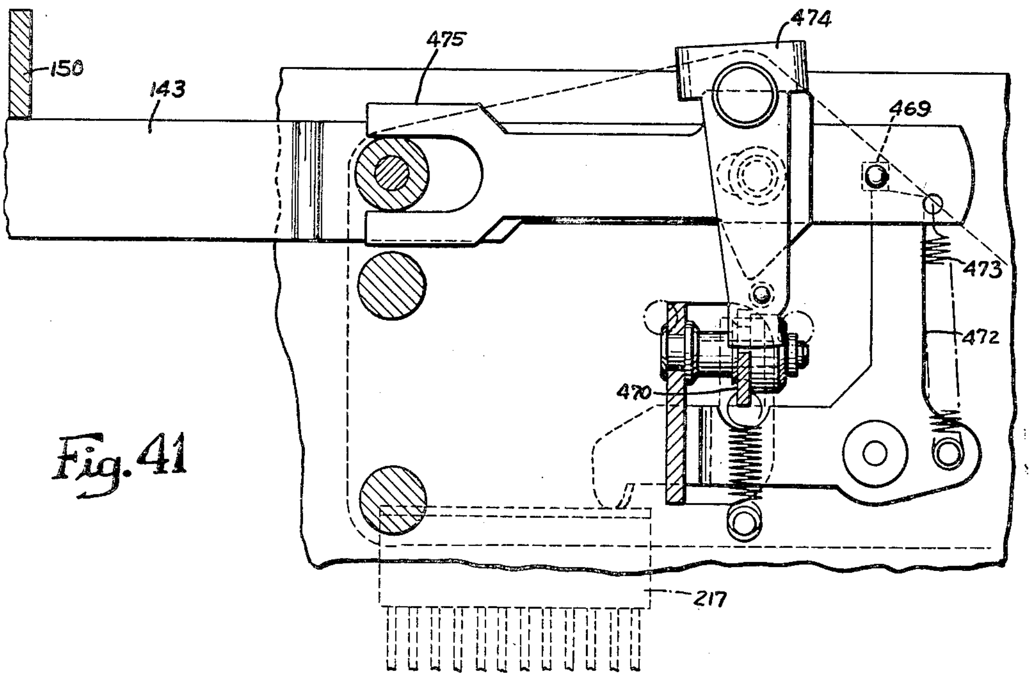

Fig. 41 is an enlarged fragmentary elevation of the locking mechanism.

Figs. 42, 42*a*, 42*b* and 42*c* are a set of stop motion views of the locking mechanism.

Figure 43:
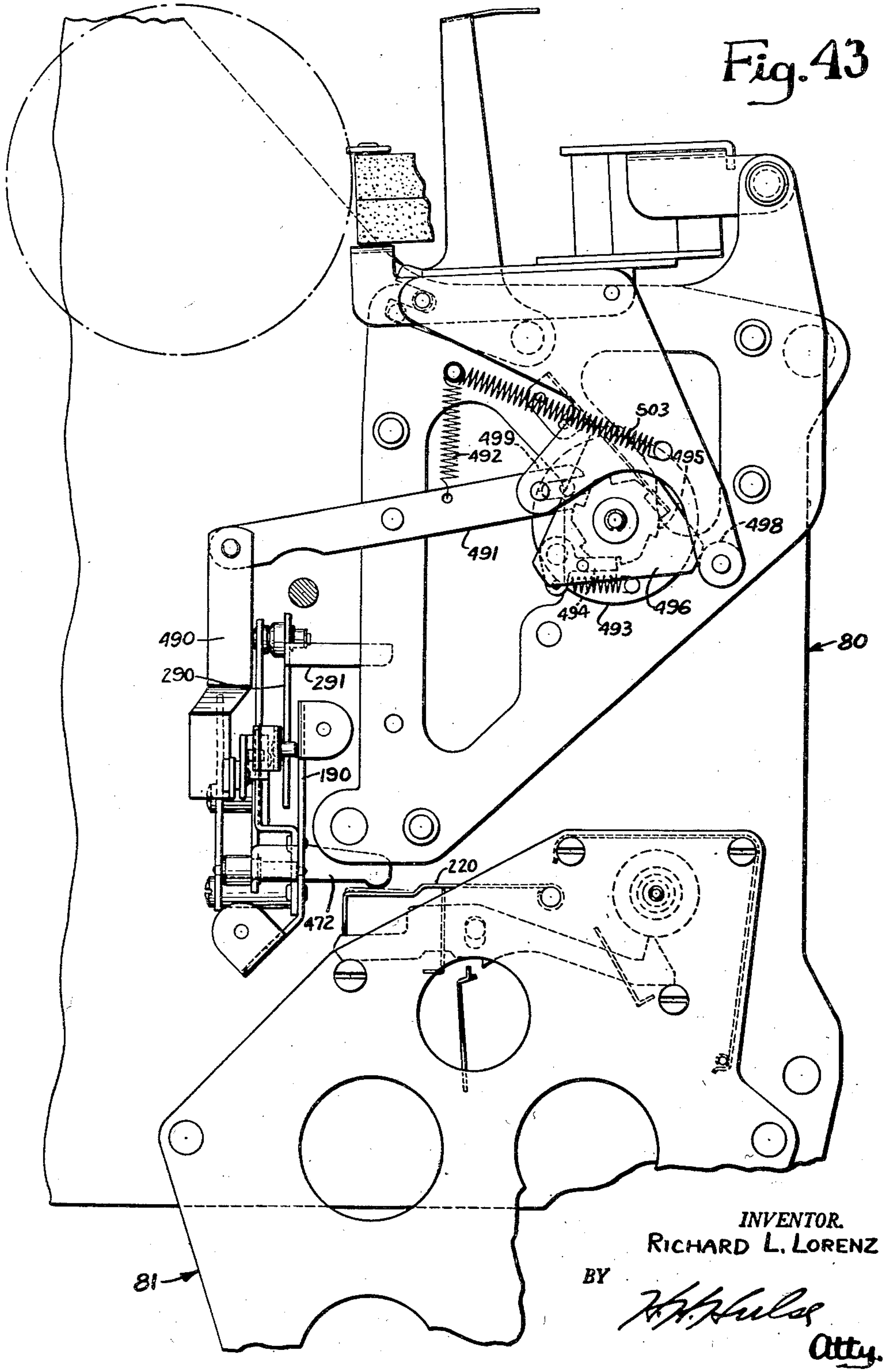

Fig. 43 is a side view of the color change mechanism.

Figure 44:
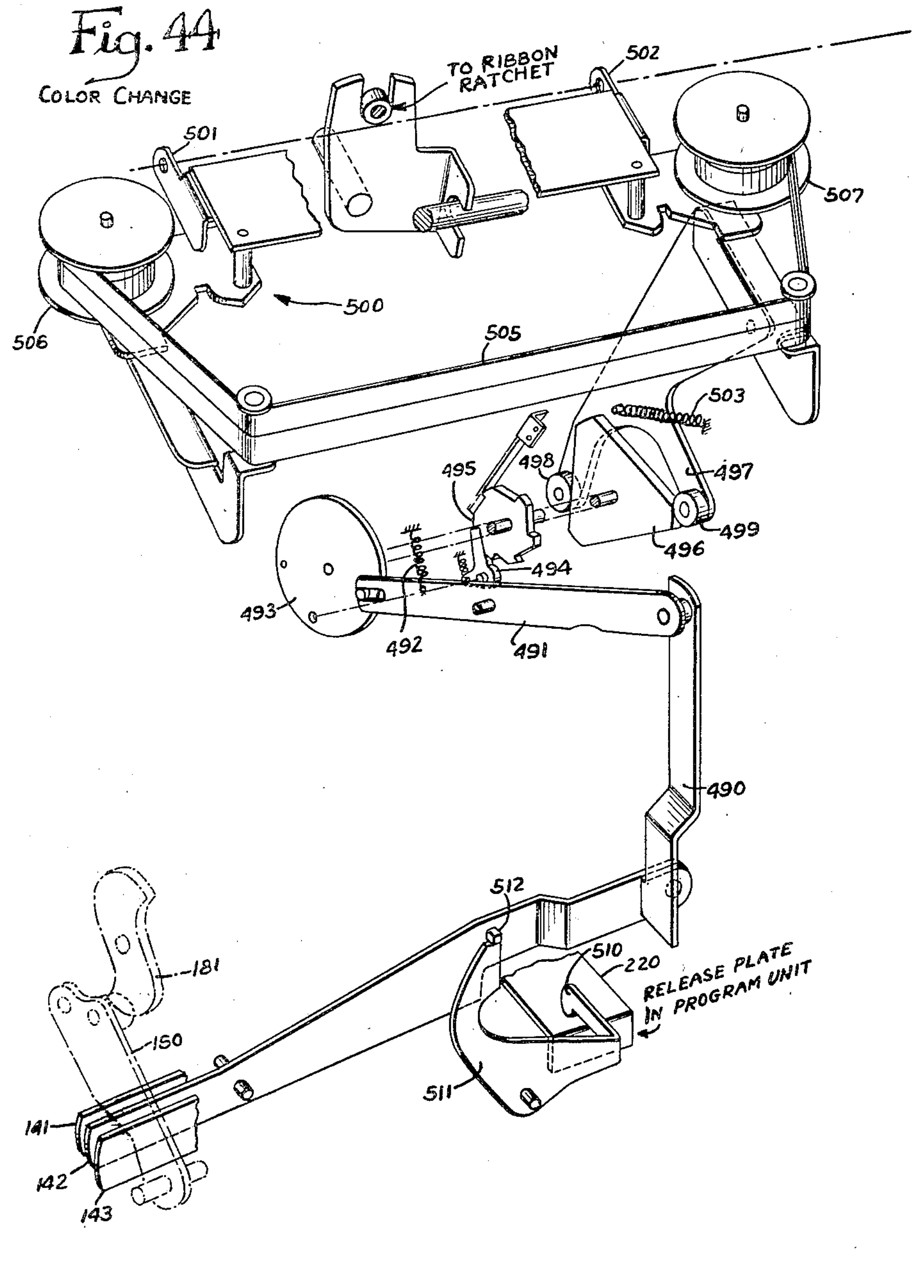

Fig. 44 is a diagrammatic perspective view of the color change mechanism.

Figure 45:
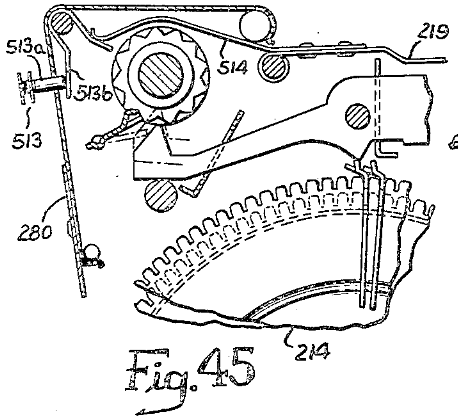

Fig. 45 is a fragmentary section of the signal switch mechanism.

Figure 46:
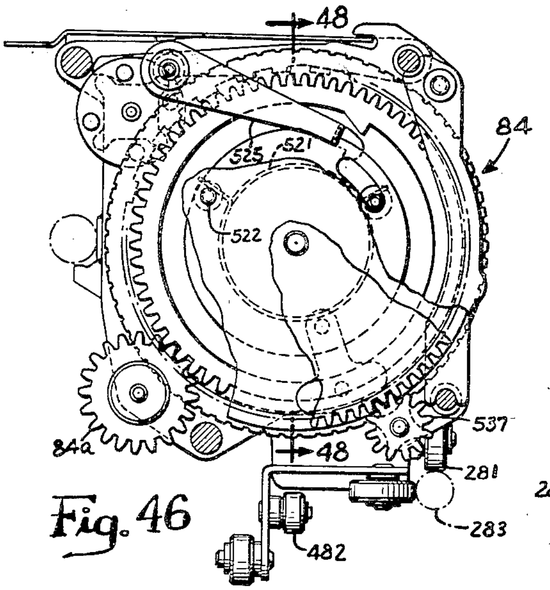

Fig. 46 is a side view in partial section of the type unit.

Figure 47:
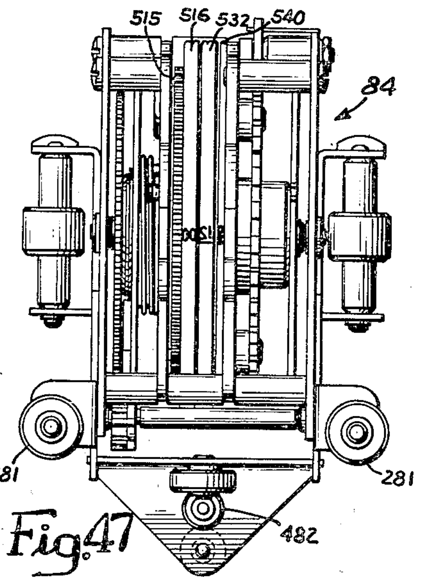

Fig. 47 is a front view of the type unit.

Figures 48, 52:
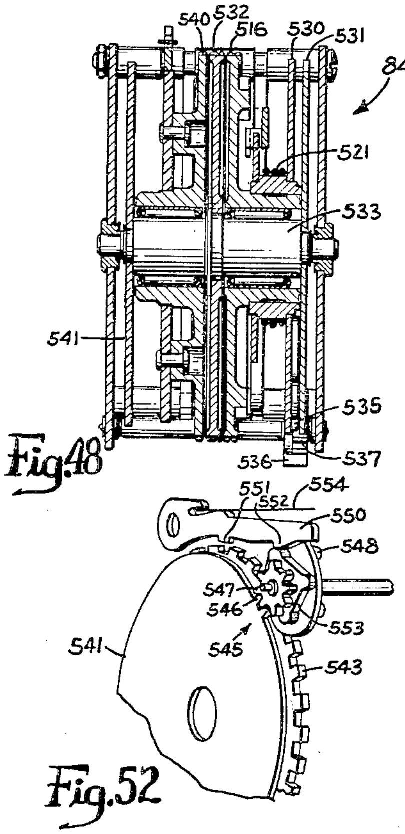

Fig. 48 is a cross section of the type unit taken along line 48—48 in Fig. 46.

Figure 49:
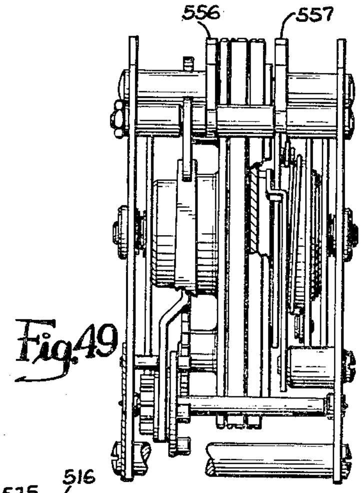

Fig. 49 is a top view of the type unit.

Figure 50:
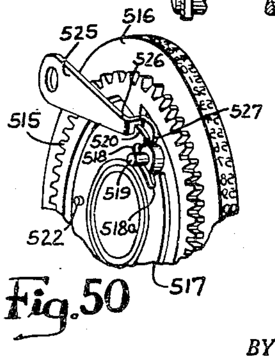

Fig. 50 is a fragmentary view showing the minute disc and associated detent disc.

Figure 51:
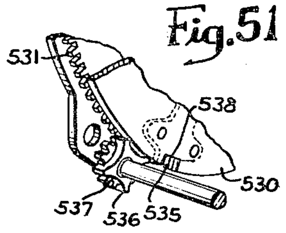

Fig. 51 is a fragment showing the Geneva coupling between the hour change-over disc and the hour gear.

Fig. 52 shows the Geneva coupling between the day change-over disc and the day gear, and including the locking mechanism therefor.

Fig. 53 is a diagrammatic perspective view of the printing mechanism with the hammer in exploded position.

Figures 54, 60:
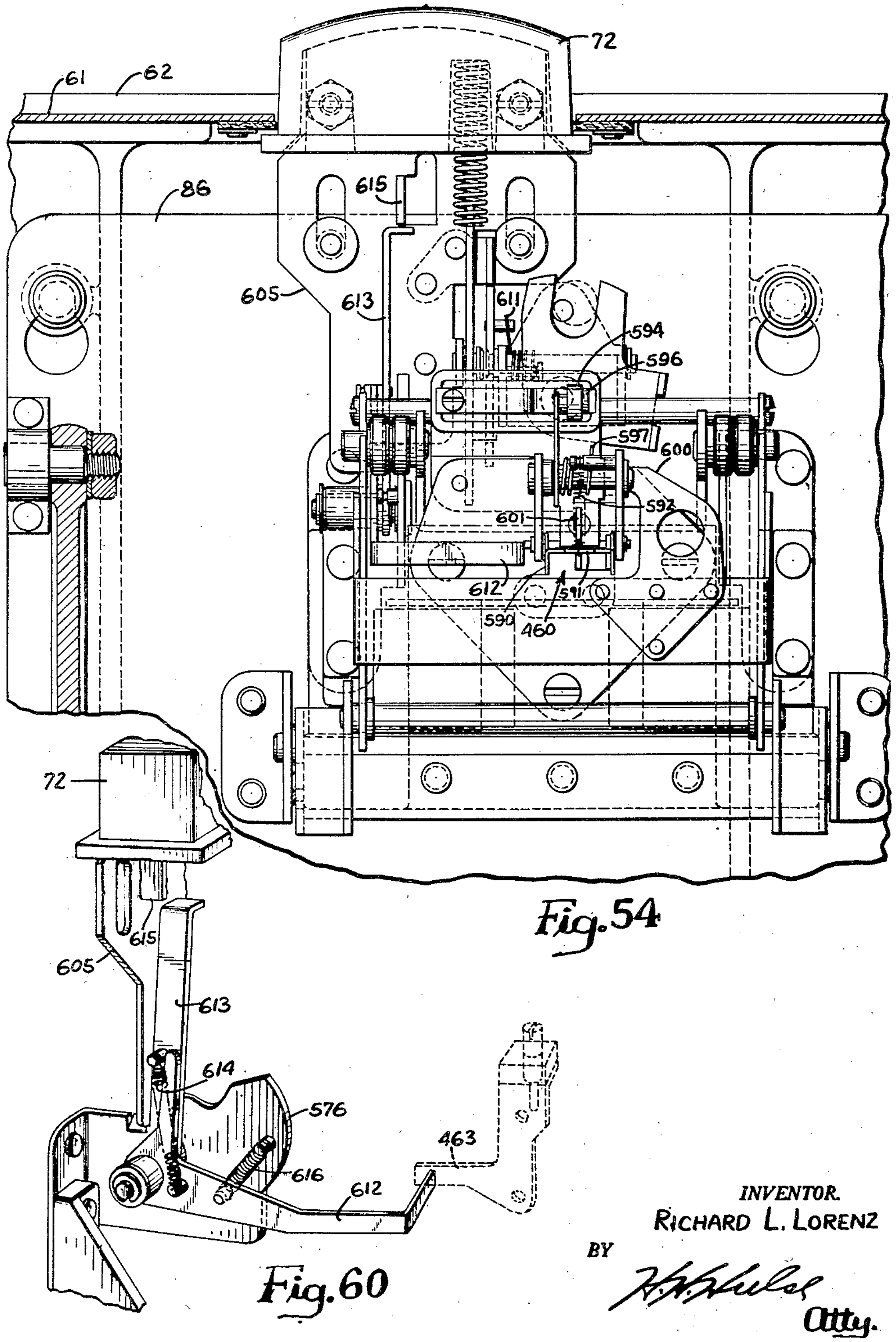

Fig. 54 is a front view of the printing mechanism.

Figure 55:
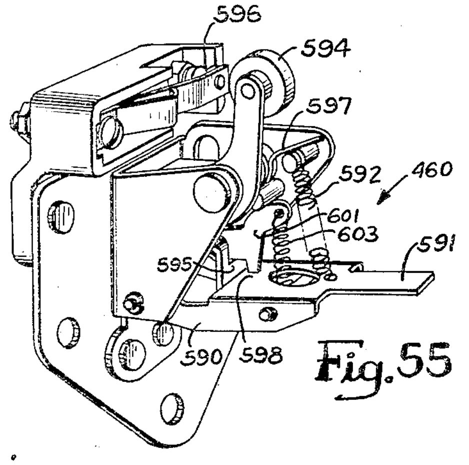

Fig. 55 shows the switch assembly for operating the printing mechanism.

Figs. 56–59 are a set of stop motion views in partial section showing the operation of the switch assembly of Fig. 55.

Fig. 60 shows the push bar locking lever in detail.

Figures 61, 62:
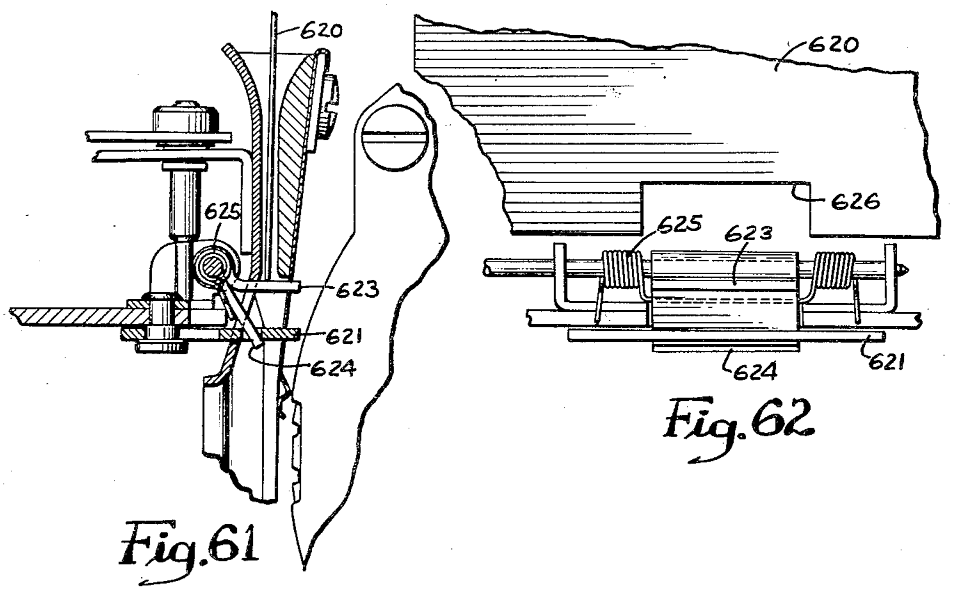

Fig. 61 is a fragmentary cross section showing the card blocking mechanism for preventing front-to-back insertion.

Fig. 62 is a fragmentary front view of the mechanism of Fig. 61.

Figure 63:
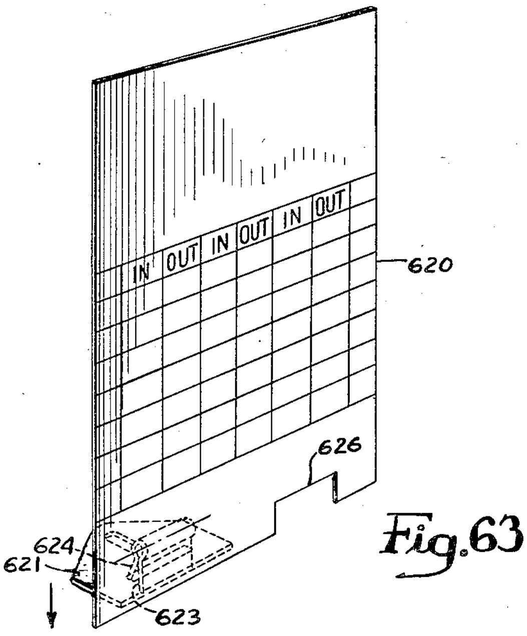

Fig. 63 shows the effect of proper card insertion.

Figure 64:
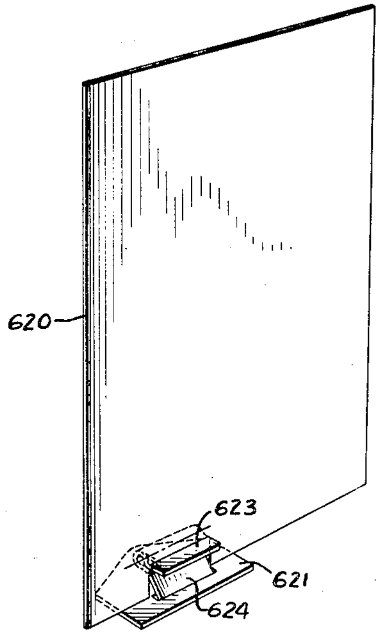

Fig. 64 shows the effect of improper card insertion.

Figures 65, 66, 66A, 66B, 67:
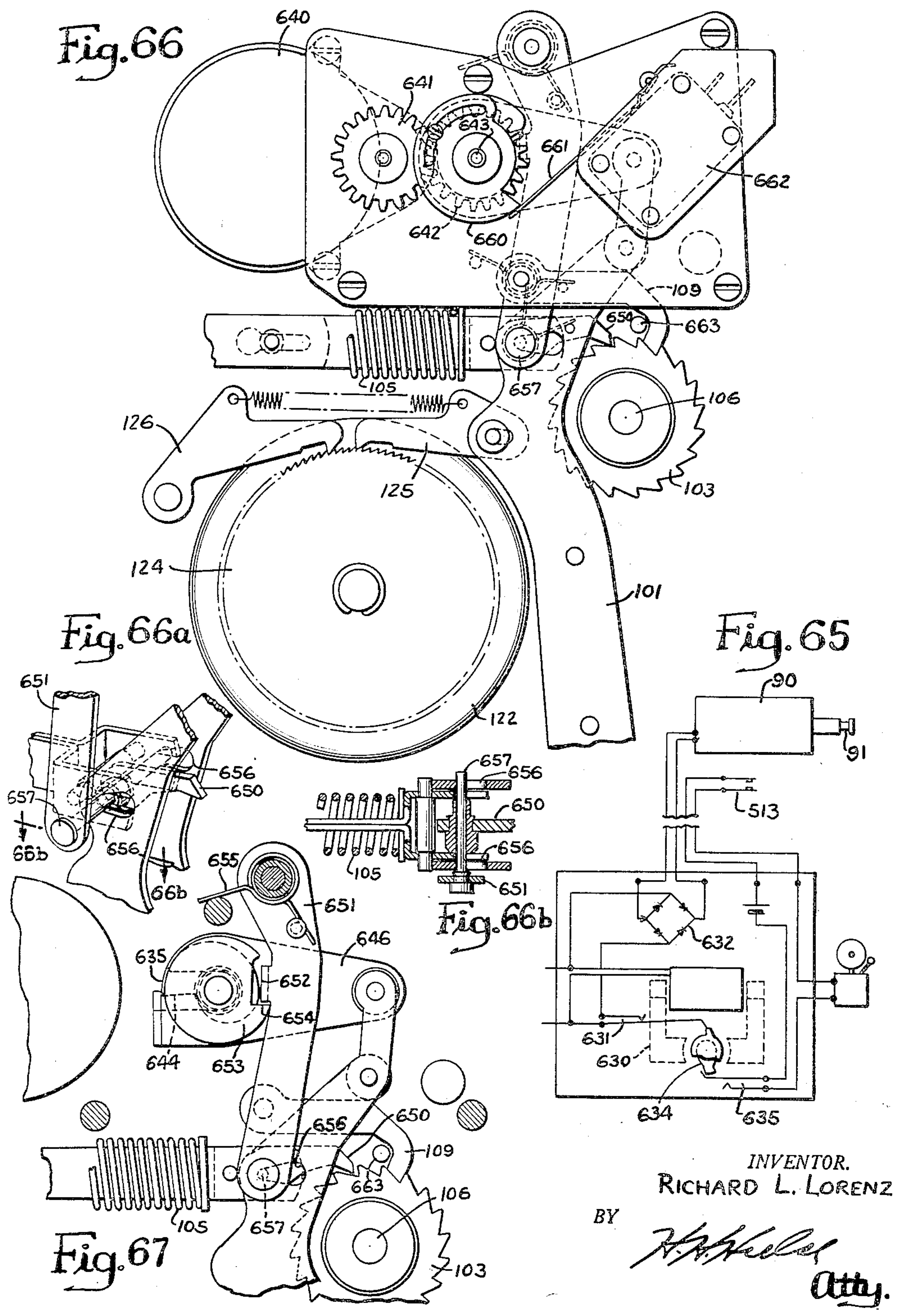

Fig. 65 is a wiring diagram showing the use of a synchronous motor as the master clock.

Fig. 66 shows a modification in which the timing shaft and storage spring are driven by a self-contained synchronous motor.

Fig. 66*a* is a fragmentary perspective showing the mounting of the driving pawl.

Fig. 66*b* shows a section taken along line **66*b*—66*b*** of Fig. 66*a*.

Fig. 67 is similar to Fig. 66 but with parts broken away to show the internal mechanism.

While the invention has been described herein in connection with a number of preferred embodiments, it will be understood that the invention is not necessarily limited to such embodiments. Various modifications and alternative constructions may be employed by one skilled in this art without departing from the spirit and scope of the invention, as set forth in the appended claims.

*General*

Workmen's "in-and-out" recorders occupy a unique position in the field of time recording. A truly satisfactory recorder should not only be completely reliable in operation, flexible in application and low in cost but it should in addition be capable of avoiding problems of a psychological nature, for example, the problem of jam-up of the workmen at the clock resulting from failure of the A.-C. supply lines at quitting time.

Figures 1, 2:
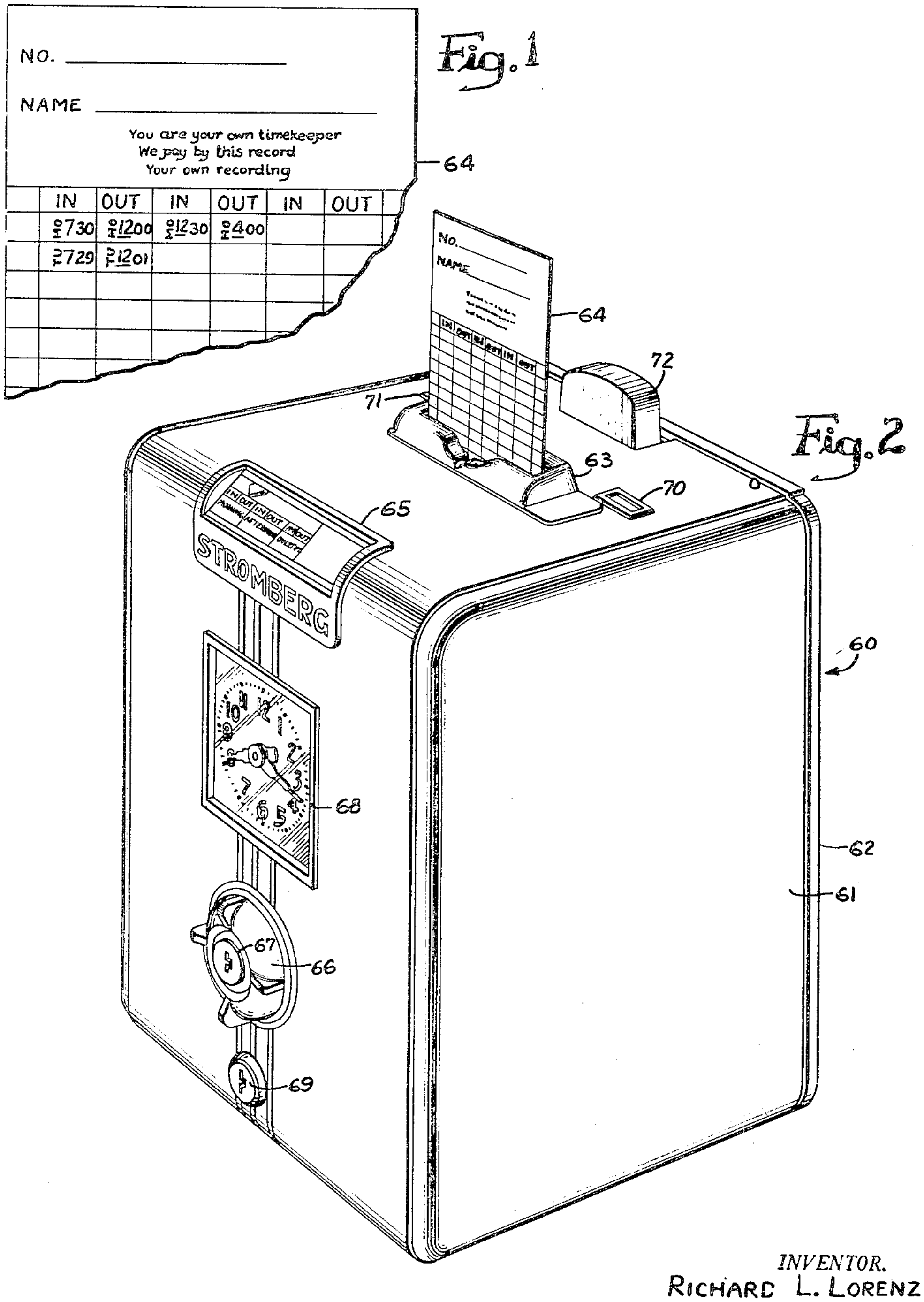
Figure 1 shows a time card of a type which may be employed in the workmen's in-and-out time recorder forming the subject matter of the present invention.
Fig. 2 is a general external view of the recorder installed in its case.

The manner in which the present recorder meets all field requirements will become apparent as the discussion proceeds. However, prior to a detailed discussion of structure, it will be well to have clearly in mind what an "in-and-out" recorder is and what it is intended to do. It is basically clock mechanisms capable of printing the "in" and "out" time on an employee's record or "time" card, which card is then used by the payroll department to calculate wages. An example of a time card is shown in Figure 1. In this card each day of the week occupies a separate line, and the time of day is imprinted horizontally in successive positions along the line. This is the most common arrangement of data, although on some cards the two "coordinates" are interchanged to place the "in" and "out" times in vertical columns to facilitate calculation in the payroll department. It is one of the features of the present device that both types of data arrangement may be accommodated. The importance of a time card as final authority in case of dispute is indicated by the fact that most union contracts now specify approved time recorders shall be provided.

Turning to Fig. 2 of the drawings, the external appearance of the present recorder 60 is shown in perspective. The recorder is mounted in a generally rectangular housing 61 having a back plate 62 which is adapted for wall mounting. At the top of the housing 61 is a card receiver 63 for reception of the time card 64. At the front of the case is an "in-and-out" indicator 65 which indicates the column in which the recorder is printing. At the lower portion of the front panel a shift knob 66 is provided which is capable of overpowering the automatic shift mechanism and which, in connection with the indicator 65 may be used to print in any desired column for special purposes. The knob 66 is, however, normally locked by means of a lock 67. The time of day is indicated by a clock face 68, the hands of which are driven by the internal mechanism. A lock 69 locks the housing 61 in place and is unlocked only when service is required.

At the top of the housing is a window 70, through which is indicated the color of the printing, either red or blue. The second window 71 is positioned over an indicator dial which shows the day of the week. At the back of the housing 61 is a manual push bar 72 which is connected to a mechanism for operating the recorder during periods of power failure, a feature which is covered in detail at a later point.

To an employee, a time recorder is merely a box in which he inserts a card to mark the beginning and end of a work period. One having a somewhat deeper interest will find it necessary first to understand the programmed functions performed by the device and then to understand the individual mechanism, the subassemblies, for carrying out such functions. Although these functions are closely woven together, to simplify understanding they may be considered separately. It then becomes a simple matter to understand the recorder as a whole.

The programmed functions performed by the present device may be summarized as follows:

1. Shift
2. Lift
3. Period print (lock-out)
4. Color change
5. Signal

"Shift" is the process of moving the type unit, which makes the imprint, from one column to the adjacent column across the face of the card. In some conventional recorders the printing head is kept stationary and the card moves, and the term "shift" is broad enough to cover both of these arrangements. "Lift" is the process of positioning the card in the recorder so that printing takes place on the desired line. "Period print" causes the recorder to operate in normal fashion during a selected part of the day, for example, during working hours, while causing it to be inoperative during nonworking hours. The "signal" function is used to operate bells, whistles or the like to mark the beginning and end of work periods or for other special purposes.

In the present device all of the above functions are controlled by a program unit which causes the particular functions to be performed, either singly or in combination with other functions, at predetermined times during the 24-hour day. Broadly speaking, the program unit includes timing discs, one for each function to be performed, which are advanced in unison with the hands of the clock. The discs each include provision for mounting clips which determine the time that the particular function shall be performed. Arrival of a clip at a reference point trips a latch and a novel power mechanism then operates to perform the function.

The operation of the program unit in controlling lift may be easily understood. Assuming that the time card is of the type in which each day occupies a separate line (Fig. 1), the control disc for the lift mechanism is set to trip the lift latch only once every 24 hours, at 12 midnight; this actuates the lift mechanism to change the line of the card stop, and all cards inserted during the next 24 hours will be positioned so that the imprint falls in the next succeeding line.

The shift mechanism is controlled by a separate timing disc, causing the type unit to shift from one column to the next. The times that shift is caused to occur throughout the day depends upon the work schedule. If the schedule is 8:00 a. m. to 12 noon and 1:00 p. m. to 5:00 p. m., the disc in the program unit may be set up so that time is printed in the "in" column until 10:00 a. m. at which time a shift to the next or "out" column occurs, followed at 12:30 p. m. by another shift to the next "in" column. In short, the shift time disc is set up to cause "in" printing during those intervals when employees are normally arriving and "out" printing during the intervals when employees are normally leaving.

The color change mechanism (for changing between, say, red and blue) is controlled by its own program disc to print in red to signal unusual arrivals and departures, which serves as notice to the payroll clerk that a special calculation may be called for, for example, calculation of overtime. Assuming working hours as above, the color change disc may be set to print in blue from 5 minutes before to 5 minutes after the hours 8:00, 12:00, 1:00 and 5:00, and in red at all other times.

The period print or lock-out mechanism has its own disc in the program unit to establish the intervals during which the recorder is to operate normally and the intervals of lock-out. Thus, an employee will find it impossible to actuate the recorder except during authorized periods which have significance to the payroll department. Finally, a disc is provided in the program unit for signalling purposes, making it possible to operate bells or whistles at programmed times throughout the working day.

It is one of the features of the present device that the functions mentioned above are performed by units which are bodily removable from the basic mechanism.

Figures 3, 4:
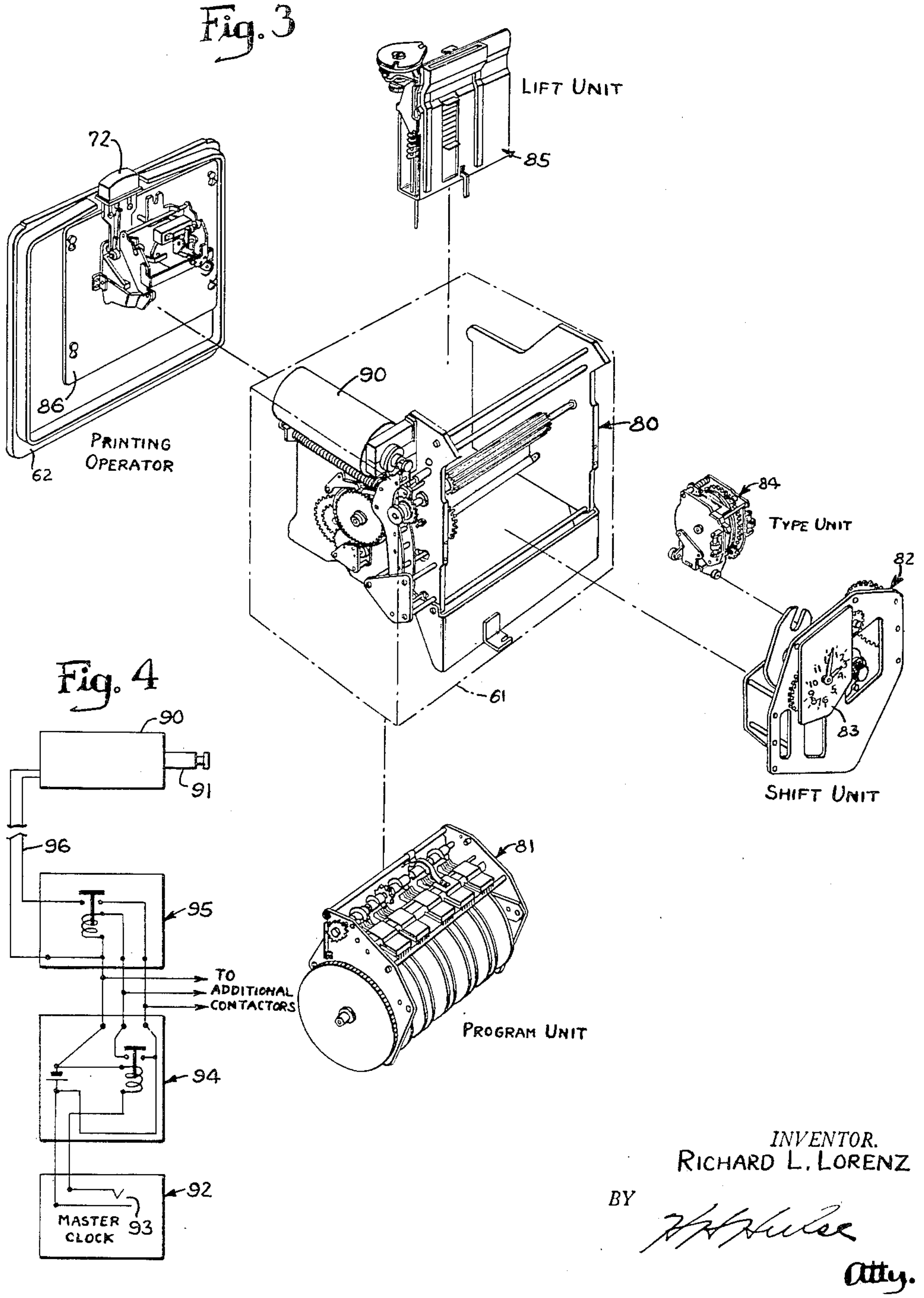
Fig. 3 is an exploded view showing the unit construction employed in the present recorder.
Fig. 4 is a diagram of an electric circuit for a master clock and plurality of recorder units.
Figure 5:
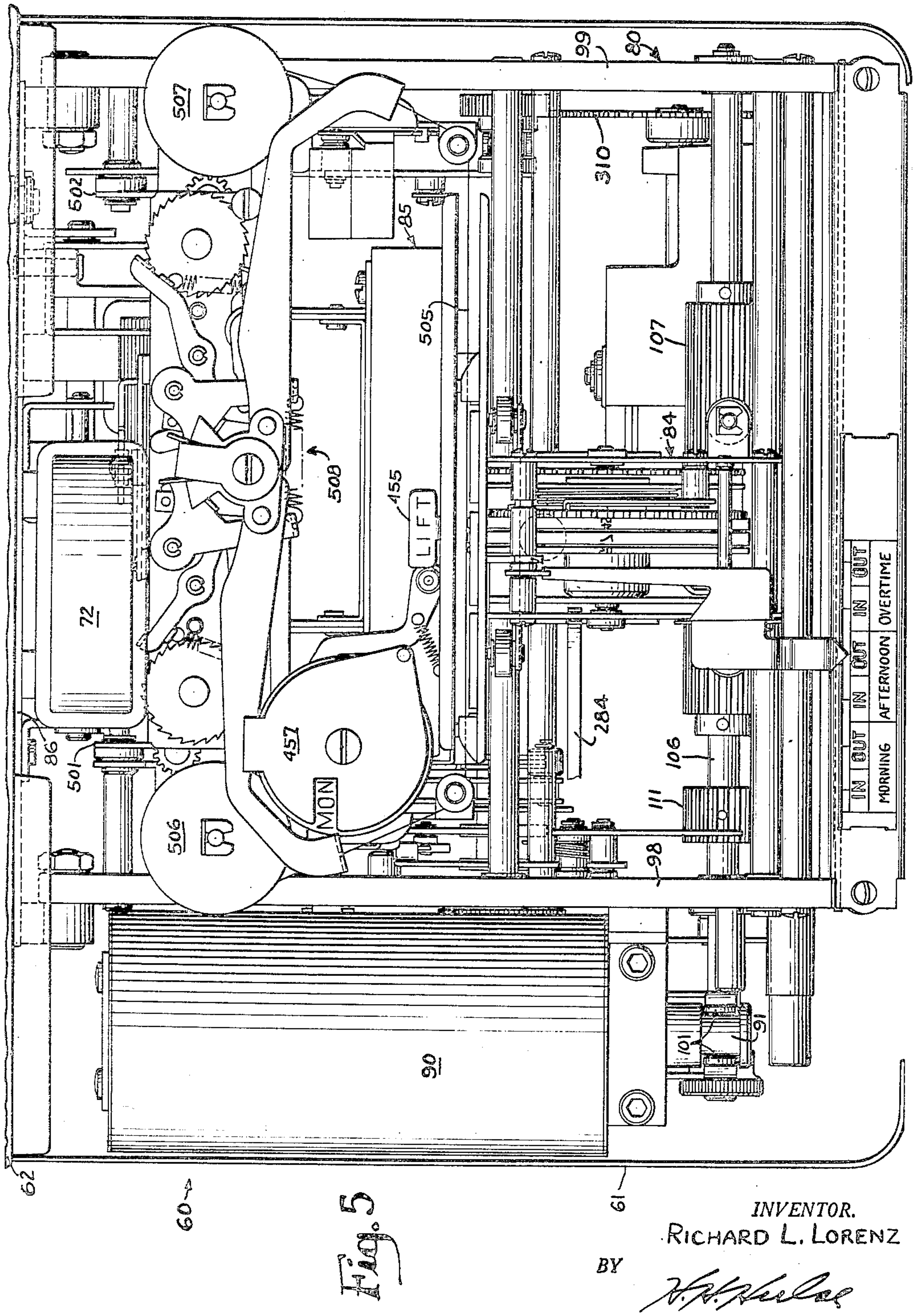
Fig. 5 is a top view of the recorder with case removed.
Figure 6:
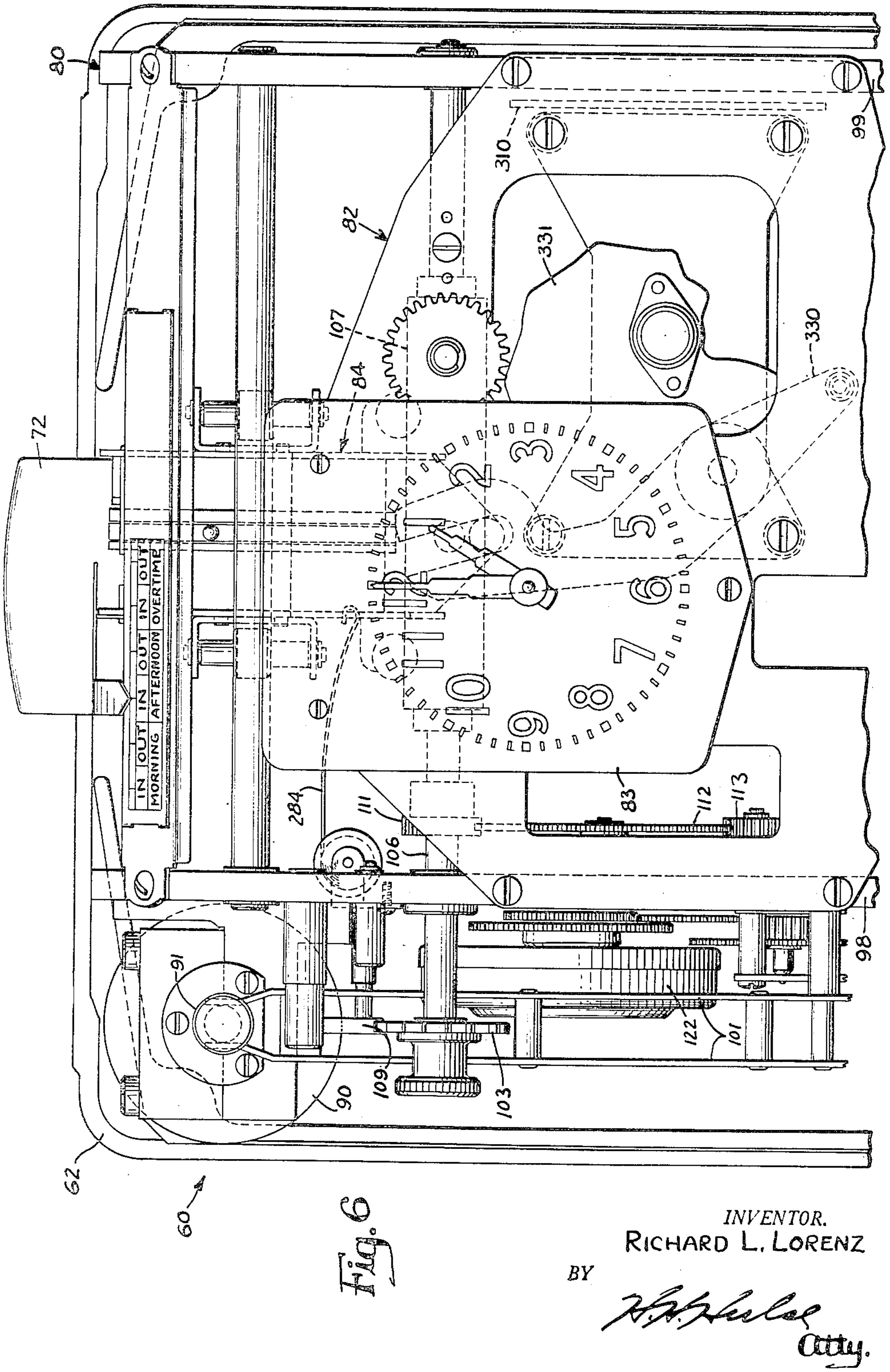
Fig. 6 is an elevation showing the upper front portion of the recorder.
Figure 7:
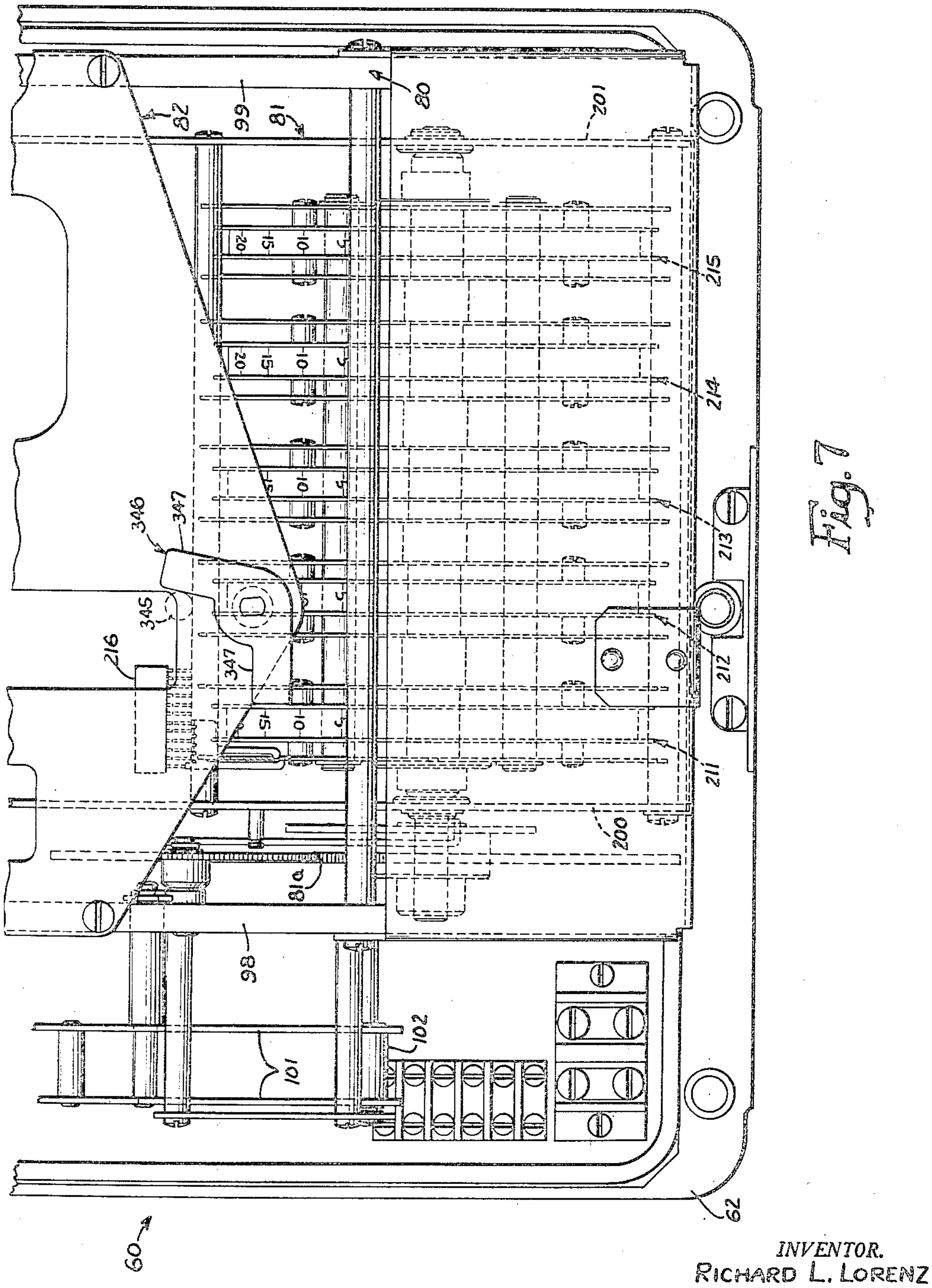
Fig. 7 is an elevation showing the lower front portion of the recorder.

Referring to Fig. 3, the basic mechanism is indicated at 80, with the removable units occupying "exploded" positions. At the bottom of the figure is the program unit 81. To the right are the shift unit 82, which includes an indicating clock 83, and type unit 84. Located above the recorder is the lift unit 85. The printing operator is mounted on a detachable panel at 86. The advantages of such arrangement are apparent to one skilled in the art. One advantage is that the recorder may be readily adapted for an entirely different kind of card simply by substituting appropriate shift and lift units. The type face may be easily changed by substituting a new type unit. In addition, the number of functions controlled by the program unit may be changed simply by substituting a program unit having a different number of program discs. During all of these substitutions the basic unit may be left relatively unchanged, and only one basic unit is necessary to satisfy substantially all practical requirements. The unit construction greatly facilitates accessibility and maintenance. Other advantages will be apparent as the discussion proceeds.

*Control circuit*

In describing the present device it will be assumed that the control circuit is of a conventional type having a master clock and in which timing impulses are applied to a control line at the rate of one per minute. These impulses are fed to a solenoid in a stepping mechanism located in the recorder. Referring to Fig. 4, the solenoid is indicated at 90, having an armature 91. The master clock 92 has contacts 93 which are closed at the beginning of each minute for a period of 2 seconds. The contacts are connected to a control relay 94, which in turn energizes a contactor 95 connected to the control line 96. Where the same clock controls more than one line, separate contactors may be provided, each being similarly connected to the relay 94. In many business and industrial establishments the lines are permanently installed and are designed to carry approximately 1/10th ampere for each connected recorder.

*Stepping mechanism*

Figure 9:
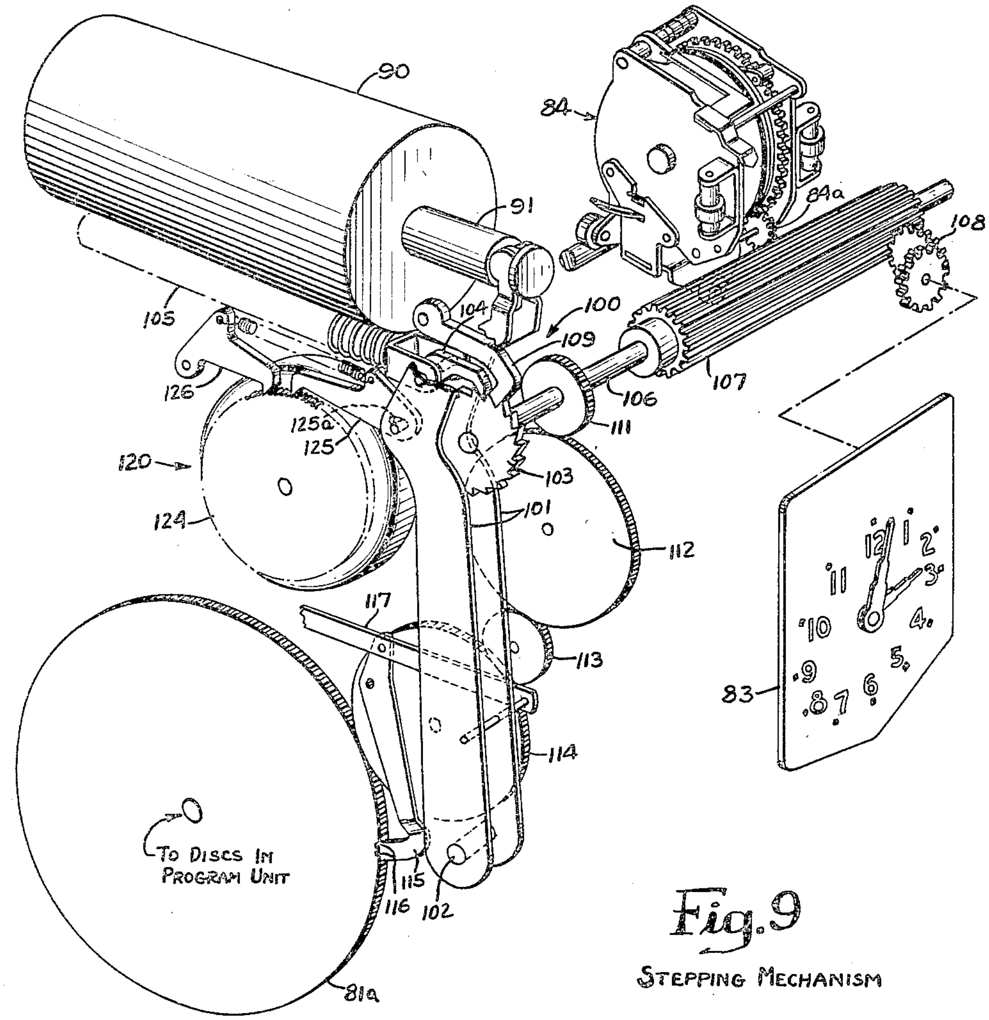
Fig. 9 is a diagrammatic view of the stepping mechanism.

To understand the stepping mechanism, reference is made to Figs. 5–9, inclusive, and especially to Figs. 8 and 9. In these figures the recorder as a whole is supported on two frame plates 98, 99, which extend vertically parallel to one another. The stepping mechanism 100 is mounted on the left-hand frame plate immediately below the solenoid 90.

Energy is transmitted from the armature of the solenoid by a timing lever 101, which is pivoted at its lower end on a pivot 102. To provide rigidity, the timing lever is formed of two similarly shaped plates of metal separated by spacers. This provides a forked upper end portion which straddles the armature and insures balanced application of force. Arranged between the sides of the timing lever 101 is a ratchet wheel 103 which is coupled to the timing lever by a drive pawl 104. Return movement of the timing lever is produced by a return spring 105. The drive pawl 104 is so arranged that torque is applied to the ratchet wheel on the return stroke of the timing lever. Retrograde movement is prevented by a retaining pawl 109. The ratchet wheel 103 is connected to a timing shaft 106 which rotates one step each time the solenoid 90 is deenergized, i. e., 2 seconds after the beginning of every minute.

For the purpose of timing the laterally movable type unit 84, the shaft 106 carries a long pinion 107 which is meshed with a gear 84*a* on the type unit. As will later be covered in detail, the type unit 84 includes rotatable type discs coupled to the gear 84*a* for making a printed impression.

To drive the indicating clock 83 in the shift unit, a gear train 108 is provided which also meshes with the long pinion 107. Being directly coupled, the indicating clock 83 and type unit 84 remain in synchronism with one another.

The program unit 81 is also driven in unison with the long pinion 107. This is accomplished by a pinion 111 mounted on shaft 106, which engages a gear train consisting of gears 112, 113 and 114. The output gear 114 is meshed with the main gear 81*a* of the program unit to cause the discs in the program unit to be rotated in synchronism. In order to avoid the effect of backlash in the gear train, a positioning arm 115 is provided having teeth 116 which wedgingly engage the teeth of the gear 81*a*. The positioning arm is coupled to the timing lever 101 by means of a link 117. The linkage is so arranged that the teeth 116 on the positioning arm come into locking engagement with the teeth on the gear 81*a* at the end of the return stroke of the timing lever. This not only insures proper positioning of the discs of the program unit, but also insures that the discs remain locked in position between the timing impulses.

*Energy storage mechanism*

It is one of the features of the present device that some of the excess energy imparted to the armature of the solenoid is stored and later released at a higher rate for performing the programmed functions. For storing the energy a spring storage unit 120 is used (see Figs. 8–12) having a spring 121, a barrel 122 and a torque shaft 127, the spring being coupled through reduction gears 131, 132, 133 and 134 to a torque shaft 127. As shown in Fig. 12, shaft 127 and gear 134 are connected by providing the shaft with a milled flat 123 and the gear with a similarly shaped broached hole. The spring 121 is pinned to the gear 131, the latter being loosely mounted on the torque shaft 127.

Coupled to the gear 133 is a fly wheel governor 135, having a frictionally engaged fly wheel 136. The governor insures that the shaft 127 turns at a controlled rate of speed.

The energy storage mechanism serves to accumulate stored energy each minute of the day and to store it for use whenever a function requiring torque is to be performed. The present device is capable of performing up to 48 such functions during a single day. Since the ratchet wheel 124 has 120 teeth milled into the periphery, the daily number of spring turns is 12. As each torque actuation results in a half revolution of shaft 127, as will be seen, a gear reduciton from spring barrel to shaft 127 of a ratio of 2:1 provides for the desired 48 actuations. The 48 anticipated possible torque actuations are seldom used, so that the spring in most cases is constantly operating near its maximum tension. Overwinding of the spring is, however, prevented by providing a friction clutch between the outer end of the spring and the spring barrel 122. In the present instance this is accomplished as shown in Fig. 10*a* by anchoring the outer end of the spring 121 to the center of a flat length of spring 121*a* which snugly engages the inside of the spring barrel. When the recorder is placed in operation the spring is manually wound by handles provided on the barrel 122. Should the A.-C. current to the printing solenoid be interrupted for as long a time as 24 hours, the recorder will still function in all its component elements so long as the master clock impulse is received.

It is one of the novel features of the present device that the load imposed upon the solenoid conforms closely to the rising characteristic of the solenoid force curve. This is accomplished in the present embodiment by deferring the winding of the torque spring 121 until the latter portion of the power stroke. Thus, as shown in Fig. 10, a lost-motion connection 125*a* is provided between the timing lever 101 and the pawl 125 associated with the torque spring. The amount of lost motion is such that force is applied to the pawl only during the last forty percent of movement which corresponds to the sharply ascending portion of the solenoid characteristic curve. The relationship between the solenoid force and the loading force is graphically shown in Fig. 10*b*. This figure shows the solenoid characteristic at the nominal line voltage of 24 volts as well as at 20 volts and 16 volts. Such lower voltages are often encountered in large factories where the supply lines from the master clock are excessively long. It will be noted that the load curve is upwardly stepped at the point corresponding to forty percent of the power stroke indicating the additional load imposed by the torque spring and that the overall load curve conforms quite closely to the three curves lying above it. It will be noted furthermore that there is a substantial margin of safety over the entire range of plunger movement even though the line voltage may be extremely low, thereby insuring reliability. Looking at the device from another standpoint, it will be appreciated that use is made of the inherent rising curve of solenoid magnets and that energy is used to wind a torque spring which is normally "thrown away," i. e. not utilized, by conventional timing devices. The breakaway force of the magnet is in no way affected by the added load.

*Energy release mechanism*

In the release of spring energy the program unit in the present device is not called upon to do any substantial work, its primary function being the releasing of latches so that the work may be accomplished by the energy stored in the spring 121. The latches themselves are described in detail at a later point. It will suffice for the present to say that the program unit causes tripping of release members associated with the various functions, namely, shift, lift, period print and color change. Referring to Fig. 13, the release bar associated with the shift function is indicated at 141. The release bar for color change is indicated at 142 and the release bar for period print (lock-out) is indicated at 143. These release bars are all tripped upwardly, either singly or in combination, when directed to do so by the corresponding disc in the program unit.

In the case of the lift function, release of energy from the spring 121 is controlled by a release lever 144 which is shown at the top of Fig. 13 and to which more complete reference will be made.

To understand the operation of the torque release mechanism, it will be helpful to refer to Figs. 11–16, inclusive, and particularly to Figs. 13 and 14. As stated in the preceding section, torque is applied from the spring 121 to the torque shaft 127. Rotation of the shaft 127 is, however, normally prevented by a torque release stop 145 which has two lobes or arms 146, 147 which are engaged successively by a latch 148. Through the action of the release mechanism, upward movement of one of the release bars 141–143 causes the latch 148 to be retracted upwardly, thereby permitting the torque shaft 127 to rotate through a half turn. During such rotation a power thrust is applied to the tripped release bar, or bars, for performing the function.

Turning attention first to the latch retracting means, a lower release arm 150 is provided which extends across the release bars 141–143. The arm is pivoted at its right-hand end and at its left-hand end carries a cam follower 151 and a pin 152. The function of the cam follower is to apply a power thrust to the release bar and will be discussed at a later point. The arm 150, upon upward movement of one of the release bars, is swung upwardly and the pin 152 thereon contacts the lower end of a torque release lever 153. The latter is centrally pivoted at a point 154 and carries a pin 155 at its upper end. Arranged in the path of movement of the pin 155 is a release dog 156 which is pivoted at 157 and which has notches 158, 159. The pin 155 engages the left-hand edge of the notch 158 causing immediate clockwise movement of the release dog 156. Coupled to the release dog 156 and rotating about the same axis is a blocking pawl 160, the elements being coupled together by a pin 161 and an associated spring **161*a*. The blocking pawl has a tip portion 162. As shown in Fig. 13, this tip is in blocking position and prevents backward rocking of the latch 148. Briefly stated, the blocking pawl prevents release of energy from the spring 121, unless such release has been initiated by one of the release members 141–144. As the lever 153** begins its rotation the blocking pawl rotates downwardly into an out-of-the-way position and the latch is thus unlocked.

Positive unlatching is accomplished as follows: Continued upward movement of the lower release arm 150 and the pin 152 thereon causes continued counterclockwise rotation of the torque release lever 153. During the latter portion of such movement, such lever engages the latch lever 163 on which the latch 148 is mounted. The latch lever 163 includes two parallel side walls 164, 165 and is centrally pivoted at pivot 154, which extends through both of the side walls. One of the side walls has a downwardly extending arm 166, which carries a pin 167 arranged in the path of movement of the torque release lever 153. The other side wall 164 of the latch lever extends upwardly, terminating in an arm 168. The arm 168 lies adjacent the blocking pawl 160 previously referred to. Rocking of the latch lever causes the latch 148 to be moved upwardly, freeing the stop 145. The U-shaped or folded construction is used simply for rigidity and convenience in mounting the latch.

To summarize operation of the elements described thus far, upward movement of the arm 150 causes counterclockwise rotation of the lever 153, which (1) moves blocking pawl 160 to an out-of-the-way position, and (2) rotates the latch 148 out of engagement with the lobe 146 on stop 145. The stop motion view (Fig. 14) shows the condition of the elements when the latch 148 just clears the stop 145. The torque shaft 127 then begins its rotation.

As one of the features of the invention, means are provided for locking the timing shaft 106 against rotation at all times, except when the torque release stop 145 is in the position shown in Fig. 13. This is accomplished by a locking lever 170 and locking arm 171. Locking arm 171 carries a set of teeth 172 at its outer or right-hand end (Fig. 14). These teeth engage the teeth of the pinion 111 which is mounted on the timing shaft 106. The locking lever 170 is normally latched in an upraised position in which the left-hand end thereof is seated on an abutment 173 which is formed on the latch lever 163. Under such conditions the locking arm 171 is upraised so that rotation of the timing shaft may take place without obstruction. However, when the latch lever 163 rotates counterclockwise with the latch 148, the locking lever 170 falls into the position 174 shown in Fig. 14, causing the locking arm 171 to drop and locking the shaft 106. The shaft remains locked until a half-turn of revolution of the shaft 127 is almost complete. At such time the lobe 147 of the stop 145 strikes the locking lever 170 at a point **170*a*, thereby raising the locking lever back into its initial position where it is latched in place at 173**, thereby freeing the timing shaft for normal and continued movement.

In order to restore the latch 148 into position in the path of movement of the lobe 147 on the stop member, a latch-resetting cam 180 is used. This cam is fastened to and rotates with torque shaft 127. It includes two relatively sharp projections for engaging the pin 167 on the latch lever 163. Thus, when the half revolution of the shaft is virtually complete, the cam 180 strikes the pin 167 downwardly, thereby rotating the latch lever clockwise into the latching position illustrated in Fig. 13. Upon being restored to such position, the latch engages the oncoming lobe 147 of the stop 145. The positive positioning of the latch by the cam 180 insures that the torque shaft will not rotate through more than one-half revolution.

In order to take up the impact of the stop member 145 against the latch 148, a spring **148*a* (Fig. 15) is provided. The latch mounting pin 169 has a lost motion connection with the latch so that the latch is free to move longitudinally against the spring. This arrangement permits the shaft 127** to be stopped abruptly while avoiding any hammering effect on either the stop member or the latch.

The above sequence of operations occurs whenever one of the release bars 141–143 moves upwardly. It is one of the features of the present invention that during the course of rotation of the shaft 127, the release arm 150 is cammed forcibly downward, thereby to restore the upwardly tripped release bar, or bars, to the lowered position illustrated in Fig. 13. This is accomplished in the present instance by a two-lobed operating cam 81, which is fixed to the shaft 127. When the shaft 127 turns through a half revolution, the "active" lobe of the operating cam 181 engages the cam follower 151 on the arm 150, forcing it downwardly. The release arm 150 pressing downwardly upon the tripped release bar acts through the selector mechanism to be discussed in the following section to accomplish the programmed function.

In the above discussion it was assumed that the mechanism was tripped by upward movement of one of the release bars 141–143. The mechanism may also be tripped by the release lever 144 which is associated with the lift function. While the lift function is discussed in a following section, it will suffice for the present to say that when the program unit calls for a "lift," the release lever 144 is pushed to the right, as viewed in Fig. 13, about a lower pivot 185 and against the force of bias of a spring 186. Tripping movement of the release lever 144 is transmitted directly to the release dog 156 and thence to the latch lever 163 to release the latch 148. This occurs as follows: The release lever 144 carries a roller 187 thereon which engages the notch 159 in the release dog. Tripping movement causes the roller 187 thereon to rock the release dog 156 clockwise. The initial portion of the movement causes the blocking pawl 160 to be moved downwardly clear of the latch lever 163. Continued movement of the release dog causes the dog to strike a pin 188 on the latch lever 153. Thus, torque is applied to the latch lever in a clockwise direction about its pivot 154, swinging the latch 148 bodily upward and clear of the lobe 146 of the stop 145. Operation of the locking lever 170 and the restoring of the latch 148 occurs in the same way as outlined above.

As in the case of the release bars 141–143, the release lever 144 not only serves to initiate release of torque, but also serves to apply a power thrust which restores the lever to its initial position. This is accomplished by a cam follower 189 which is mounted on an arm integrally formed on the release lever 144. When tripping of the lever 144 occurs, the cam follower 189 falls against the operating cam 181. Rotation of the operating cam results in upward pressure against the cam follower 189, thereby rotating the release lever in a counterclockwise direction with a rather powerful thrust. The effect of this power thrust is to reset the lift mechanism as discussed in a subsequent section. It will be appreciated that while operation of any one of the release members 141—144 is sufficient to cause release of torque, two or more of such members may be tripped at the same time and the members thus tripped will all be forcibly restored to their initial latched positions.

*Selector mechanism*

In the preceding section it was stated that release bars 141, 142, 143 were tripped upwardly by the action of the program unit to release the spring torque required to perform a function. The mechanism next to be discussed is interposed between the program unit and the torque-releasing mechanism of Fig. 13 and may be referred to as the selector mechanism. The action of the selector mechanism is not immediately apparent from the drawings (Figs. 18, 19) because the selector serves as a junction point for three different programmed functions, namely, shift, period print and color change. Briefly stated, the selector mechanism has three input or trigger elements and three output elements. The input elements are operated by the program unit. The three output elements are the release bars 141, 142 and 143, previously described in connection with Figs. 13 and 14.

In subsequent sections on shift (Fig. 27), period print (Fig. 40) and color change (Fig. 44), the three "channels" in the selector mechanism are separated from one another to facilitate understanding of the operation. Accordingly, present reference is restricted to the external features of the selector mechanism. In addition to Figs. 18, 19, reference is made to Figs. 12, 14, 16 and 17. It will be noted that the frame 190 of the unit is so arranged that the ends of the release bars extend transversely to the left when the unit is mounted in the recorder. The three trigger elements controlling the release bars all extend rearwardly from the frame of the selector assembly into the path of movement of release plates which form the output elements of the program unit.

*Program unit*

The function of the program unit is to operate latches for the performance of the respective functions of the recorder at selected times throughout the day. The program unit is bodily removable from the recorder and is shown in perspective in Fig. 20. Here it will be noted that the unit includes a pair of end plates 200, 201, which are interconnected by a series of pillars or cross members 202. Mounted centrally in the unit is a shaft 203, which carries the main driving gear 81*a* at its left-hand end. Mounted on the shaft 203 within the unit are a series of spaced program discs 211, 212, 213, 214, 215. The discs are shown merely in outline and portions of the mechanism have been omitted from Fig. 20 for the sake of simplicity.

Alined with the respective discs are release plates 216–220. Upward movement of the release plates constitutes the "output signal" of the program unit. As will be noted in the drawings (for example, Figs. 17 and 20), each of the release plates is pivoted at one end on a shaft 221, and is swung upwardly by its associated disc at a predetermined instant in order to initiate the desired function.

The structure for raising one of the release plates is briefly as follows: A clip is mounted at a predetermined point on the periphery of the program disc. Alined with the clip is a sensing finger which is normally in a lowered position, but which is raised upon arrival of the clip to cause raising of the release plate. To carry this idea out in the simplest possible way would require that the disc have no less than 1440 slots in its periphery, one for each minute of the 24-hour day. This is impractical for a number of reasons, and a novel arrangement of clips and sensing fingers has been devised which permits the discs to rotate on a 2-hour cycle, enabling the member of clip positions on the periphery of the disc to be reduced to 120. The overall operating cycle of the recorder is increased to 24 hours by providing twelve sensing fingers for each disc and by providing for a maximum of twelve lugs at each of the clip positions for engaging the respective sensing fingers. Means are further provided for causing the sensing fingers to become active in succession, each for a period of 2 hours, during a 24-hour day.

The manner in which this has been accomplished in the present construction is shown in the drawings, reference being made particularly to Figs. 20, 20*a* and 20*b*. In these drawings the disc 211, which corresponds to the lift function, is shown by way of example. The disc is made up of four circular plates 211*a*–211*d*. These plates include registering notches 224 for seating program clips at each of the minute positions. In Fig. 20*b* two clips 222, 223 are arranged side by side at one of the minute positions on the disc 211. Each of the clips is provided with lugs 231, six in number, making a total of twelve lugs for the two clips.

Centered above the twelve lug positions are corresponding sensing fingers 241. The sensing fingers are arranged flatly side by side and are kept in proper spaced relationship by receiving them in slots formed in a pair of side combs 242, 243. The latter are mounted for axial adjustment.

The lugs 231 are so constructed that they may be bent upwardly into active position for striking the corresponding sensing finger when the program disc revolves. In order to cause each of the sensing fingers 241 to be active or susceptible of operation by the lugs during only 2 hours of the 24-hour day, a support or fulcrum is provided at one end of the sensing fingers which is transferred from finger to finger upon passage of time. The movable fulcrums are provided by helix members 261–265, which are mounted on a common shaft 266. At the beginning of the day the helix member 261 engages the first sensing finger 241 for a period of 2 hours. During this two-hour period the disc 211 makes one complete revolution. Provided that the first lug 231 is bent upwardly into its active position, arrival of the clip at the topmost point of travel causes the finger 241 to be cammed upwardly. At the end of the 2-hour period, the helix 261 rotates to cause the control function to be switched to the next sensing finger and so on throughout the day.

The operation of the sensing fingers will be made clear upon reference to stop motion Figs. 23 and 24. In Fig. 23 the clip 222 has an upwardly bent lug 231, which is approaching a projection 241*a* on the sensing finger 241. In Fig. 24 the lug 231 has come into contact with the sensing finger and has raised the release plate 216, thereby initiating operation of the lift mechanism. In the following two hour periods the fulcrum is rotated out of contact with the first sensing finger and the movement of the first sensing finger takes place idly as shown in Fig. 25. Here it will be noted that the sensing finger 241 upon being struck by the lug 231 simply moves upwardly at its left-hand end and the release plate 216 remains in its "at rest" position.

Attention may next be given to the mechanism for rotating the helix shaft 266 once every 24 hours. Referring to Fig. 21, this is accomplished by a ratchet mechanism which is driven by a cam mounted on the main shaft of the program unit. The mechanism includes a ratchet lever 270, which engages a cam 271 at its lower end and carries a ratchet pawl 272 at its upper end. The pawl cooperates with a 12-toothed ratchet wheel 273 having a retaining pawl 274. It will be apparent that when the drop-off position 271a of the cam is reached, the ratchet lever 270 is freed to rotate in a counterclockwise direction about its central pivot point under the urging of a spring 275. Means are, however, provided for deferring the actual ratchet movement until the beginning of the next minute period following drop-off. This is accomplished by a latch 276 which is coupled to the link 117 (see Fig. 9) which is in turn actuated by the timing lever 101. In operation, energization of the solenoid causes movement of the lever 101 and link 117 to the left, operating latch 276 and releasing the ratchet lever 270. The shaft 266 is thus immediately stepped forward producing fulcrum change-over at the very beginning of the minute interval. It will be recalled that rotation of the gear 81a and the program discs does not take place until the return movement of the solenoid armature 2 seconds later. This insures that transfer of the fulcrum is completed prior to engagement by one of the sensing fingers 241—252, making the construction much less critical and increasing reliability.

Setting of the program unit may be accomplished readily without the use of charts or the like. For this purpose a night-day index 280 (Fig. 22) is provided in which the day is divided into 2-hour periods, corresponding to each of the sensing finger positions. Each of the discs is, furthermore, subdivided into minutes covering a 2-hour period and a convenient minute scale is located directly on the periphery of the disc between the plates 211b, 211c. Should it be desired, for example, to cause operation of the lift at 12 midnight, reference to the index 280 shows that the fourth lug on a standard clip must be bent upwardly into active position. The clip is then inserted at the first minute position on the disc 211. Should it be desired to cause lift to occur during some other 2-hour interval, the same clip may be employed merely by bending the lug originally used back into its initial or inactive position or a new lug may be used.

While the features of the program unit are referred to briefly above, reference is made to my copending application Serial No. 349,420, filed April 17, 1953, for more complete discussion of the features and details of operation.

*Shift mechanism*

The purpose of the shift mechanism (Figs. 26–31) is to move the type unit 84 from one column on a record card to the next to indicate "in" and "out" times. In the present device this is accomplished by moving the type unit bodily while keeping the card stationary. Friction-free movement is accomplished by mounting the type unit 84 on rollers 281, 282, which ride on alined cross members, for example, 283. This movement occurs parallel to the long pinion 107 so that the driving connection to the type discs is not interrupted during the course of lateral shifting movement. The type unit is constantly biased to the left by a spiraled biasing spring 284.

For the sake of simplicity the mechanism for initiating the shifting movement and for releasing the necessary energy to accomplish it is shown in diagrammatic form in Fig. 27. Here the initiating element is the release bar 141 previously referred to in connection with Figs. 13 and 14. The means for tripping this bar upwardly in order to initiate the shifting movement includes a trigger element or latch 290 having an arm 291 and which engages a stop 292 on the release bar. The latch element 290 is coupled to the release plate 218 on the program unit by means of a lever 293 and plunger 294. The release bar is centrally pivoted and biased for clockwise rotation by a biasing spring 295. It will be apparent that when the release plate 218 on the program unit moves upwardly the latch is tripped, causing the release bar to rotate clockwise. As stated in connection with Fig. 13, such tripping causes the lower release arm to move upwardly, thereby to trip the energy release mechanism to cause a half revolution of the torque shaft 127. The energy from the torque shaft 127 then is utilized to produce shifting movement of the type unit.

In order to couple the torque shaft 127 to the shift unit, a shift clutch 300 is provided. In the present instance the clutch includes an axially movable member 301 in the shape of a spool and having a transverse slot 302 milled at one end thereof. This slot engages a pin 303 in the torque shaft 127 when the member 301 is in its "clutched" or left-hand position.

The clutch member 301 is at all times coupled to a gear 304. This coupling is effected by sliding pins 305 projecting through registering holes in the gear. When the spool is in its right or unclutched position the pins project into holes 305a in the frame plate, thereby locking the shift mechanism in position. For the purpose of engaging and disengaging the clutch, a rockable clutch-operating lever 306 is provided having a central point of pivoting 307. The lever extends vertically and is forked at its upper end so as to straddle the clutch member 301. The lever is engaged along its edge by means of a roller 308 mounted at the right-hand end of the release bar 141. A spring 309 connected to the lever 306 biases the lever in the clutch-disengaging direction.

As shown in the drawings, the lever 306 and the release bar 141 are in T-formation with the roller 308 on the bar 141 being movable over a range of movement lying below the point of pivoting of the lever 306. Thus, when the release bar 141 is in its "normal" position shown in Fig. 27, the clutch-operating lever 306 is biased clockwise, causing the clutch to be disengaged. Upon tripping of the release bar 141, the roller 308 thereon drops, rotating the clutch-operating lever into its left-hand position, causing engagement of the clutch, i. e., engagement between slot 302 and pin 303. Rotation of the torque shaft occurring immediately thereafter causes gear 304 to be rotated through one-half revolution.

Meshing with the gear 304 is a cam gear 310 which is connected to the cam shaft 311 by a pair of beveled gears 312. Adjustably fixed to the cam shaft 311 is a shift cam 313 having a plurality of steps 321 to 328 (Fig. 29). The edge of the cam is engaged by a cam follower 329 mounted on a cam follower arm 330. The cam follower arm is coupled to a shift arm 331 having a vertical slot 332. Engaged in this slot is a roller 333 on the frame of the type unit. This enables the type unit to be positioned within the range indicated in Fig. 29, the position depending upon the setting of the cam.

Means are provided for setting the type unit to any desired initial position. This is accomplished by a coupling 334 interposed between the cam shaft 311 and the cam 313. As shown in Fig. 27*a*, the coupling includes a pin 335 in shaft 311, which engages a manually settable plate 336 having a plurality of radially arranged slots 337. A sliding pin connection 338 is provided between the plate 336 and the cam 313. To position the cam 313 relative to the shaft 311, the plate 336 is drawn outwardly against the biasing force of a spring 339. This disengages the pin 335 which is then brought into register with a new pair of slots 337. Thus the type unit can be adjusted to occupy any one of its eight possible positions laterally with respect to the record card.

The operation of the mechanism outlined above will be clear upon considering the following sequence. At a predetermined time during the day the raising of the release plate 218 in the program unit causes tripping of the latch 290. This causes the release bar 141 to drop at its right-hand end, thereby engaging the clutch 300. At the same time, the left-hand end of the release bar 141 moves upwardly to trip the release lever 150 release mechanism. This results in rotation of the torque shaft 127 through half a revolution, causing the cam 313 to be rotated through one step and advancing the type unit 84 to the next columnar position. During movement of the type unit the cam 181 mounted on the shaft 127 presses downwardly on the lower release arm 150, thereby pushing the release bar down to its normal position and resetting the latch 290. This places the mechanism in readiness for a subsequent shifting operation as may be directed by the program unit. When the type unit reaches the last columnar position, the next shift produces drop-off of the cam follower and movement of the type unit all the way to the left under the influence of the spiraled spring 284.

It is to be noted that declutching and axial locking movement of the pins 304 into the holes 305*a* in the frame plate are delayed until the pins 305 are in register with the holes. Such delay results from the fact that the clutch-operating lever is resiliently biased in the declutching (locking) direction. Thus, when the release bar 141 is reset, which occurs before the torque shaft 127 comes to rest, this results in a biasing force being applied to the clutch member 301. The pins 305 resist any axial movement, however, simply riding around on a wear plate 305*b* on the frame plate until they come into register with the holes 305*a*. The pins drop into place and declutching occurs.

It is one of the more detailed features of the shift mechanism that cards having fewer columns may be employed with only minor modification to the mechanism, and without necessity for changing gear ratios. Where a card includes seven columns, for example, the cam 313 may be modified as shown in Fig. 30*a*, simply by removing the portion in dot-dash outline at 342. This prevents the type unit from being moved beyond the seventh column. It is, however, necessary for the cam to complete a full revolution just as though eight columns were present. Completion of the revolution is accomplished by the simple expedient of using an auxiliary clip on the shift program disc to produce an additional shift at any time within the seventh shift period, preferably at the end of the period. This completes the cam cycle but is ineffective to advance the type unit to the eighth or last column.

The mechanism may be similarly adapted for use with cards having six columns, as shown in Fig. 30*b*. Here the removed portion is indicated in dot-dash outline at 343. It will be apparent that where this is done two auxiliary clips must be used in the sixth shift period in order to complete the cam cycle in only six columns.

While instructions have been given above for modifying the cam 313, it will be understood that cams may be kept in stock having the shape set forth in Figs. 30*a* and 30*b*. Where the card is only four columns wide a double cam is employed having the shape set forth in Fig. 30*c*. Here the cam is indicated at 344, each lobe thereof having a total of only four steps. It will be apparent that the type unit is restored to the first column whenever a total of four shifting operations have been called for by the program unit.

The present shift mechanism is capable of skip-column shifting. Skipping a column may be desirable where the space in the card permits and where it is desired to separate the columnar data by a blank column for ease in reading the recorded data or for any other purpose. To accomplish skip-column shifting, it is sufficient to insert an additional program clip to cause two column shifts instead of one. The additional clip may be positioned for operation one minute prior to the normal shifting operation. Where this is done, it is desirable to disable the recorder so that it will not print during the one-minute interval between the two shifting operations. The interlock for accomplishing this is discussed in the subsequent section which covers the period print or lock-out mechanism. Briefly stated, means are provided for locking the printing mechanism whenever the type unit is in the "blank" column position. Such lock-out for a period of one minute does not provide any substantial limitation in the use of the recorder, since the additional shifting operation may be programmed to occur at a time when the recorder is not being used by incoming or outgoing workmen.

It is desirable at times to print in a column other than that which is directed by the program unit. For this purpose means are provided for manually positioning the type unit independently of the setting of the cam 313. This is accomplished by providing a resilient breakaway connection between the cam follower arm 330 and the shift arm 331. As shown in Fig. 31, the two arms are provided with stops 330*a*, 331*a* which are normally held in engagement with one another by a spring 340. Under normal conditions the arms 330, 331 thus rotate as a unit. When it is desired to print in a column other than that determined by the program unit, this may be accomplished by positioning the knob 66 at the outside of the recorder housing (see Figs. 2 and 7). This knob carries a pin 345 projecting from its back surface. Placed in the path of movement of the pin is a manual shift lever 346 (Fig. 27*b*) having arms 347 arranged in V-formation. Directly coupled to the lever 346 is a linkage consisting of an arm 348 and connecting link 349. The connecting link is connected to the shift arm 331 which, it will be recalled, engages a roller 333 on the type unit for laterally shifting the type unit. To move the type unit to the left, the knob 66 is rotated to the left, causing resilient breakaway between the stops 330*a* and 331*a*. To move the type unit to the right the knob 66 is rotated to the right, resulting in separation between the cam 313 and cam follower 330 and against the force of the biasing spring 284. In either event release of the knob 30 after imprinting causes the type unit to be restored to its programmed position. Because of the lost-motion connection provided by the V-shaped arrangement of the arms 347, the knob may be locked in a central position without affecting normal automatic positioning of the type unit.

*Lift mechanism*

The purpose of the lift mechanism is to position the card vertically so that the imprint occurs on a desired line. In the case of the card illustrated in Fig. 1, each line corresponds to a particular day of the week. Positioning is accomplished by interposing a selected stop in the path of movement of the card so that the card "bottoms" in the recorder. Printing occurs when the leading edge of the card is in this lowermost position.

In carrying out the present invention, the lift mechanism is embodied in the lift unit 85 (see Figs. 3 and 32). This lift unit may be removed very simply either in the factory or in the field for replacement by a similar unit having a different number of lift stops. A ten-stop lift unit has been shown in the drawings (Figs. 32–38, inclusive), and will be described in the paragraphs which follow. The lift unit includes a frame plate 350 on which is mounted a card receiver or funnel 351. The width of the funnel depends upon the width of the card to be used and a relatively snug sliding fit is provided in order to insure accurate positioning of the imprint.

The lift mechanism has two aspects which may be discussed separately to simplify understanding, namely, the means for determining the depth to which a card shall be inserted and the means for sensing that an inserted card has been bottomed in position, thereby to initiate the automatic printing operation.

Attention will first be given to the means for positioning a selected stop in the path of movement of an inserted card. In the present device as shown, for example, in Figs. 32 and 36, the stops have been designated 361–370, respectively. Each of the stops extends through a slot formed in a contact slide 381 which lies flatly adjacent the frame plate 350. The slots are indicated at 371–380, respectively. The contact slide is upwardly biased by a spring 383.

Referring more particularly to Figs. 36 and 37, the stops 361–370 are slidably supported at their rear ends in notches formed in a fulcrum plate 382 which is anchored to the frame plate 350. For the purpose of projecting a selected one of the stops 362–370, a series of stop levers 392–400 are provided, one for each of the stops. These levers are resiliently connected to their respective stops by tension springs 402–410, so that a desired stop is projected when the corresponding lever is rotated clockwise (Fig. 35). The tension springs 402–410 insure that blocking of the stops does not cause jamming of the lift mechanism as might occur when an employee leaves a card in the recorder funnel overnight.

It will be noted that no stop lever is provided for the lowermost stop 361, since such stop remains in extended position and is active when the remainder of the stops have been withdrawn. Having the lowermost stop continuously extended has the further advantage of assuring that no card will be passed beyond the lowermost position.

To actuate a selected lever, a helix shaft 411 is provided having helically arranged lugs 412–420 which lie in register with the ends of the respective levers. In the illustrated lift mechanism the lugs are formed on the helix shaft in pairs so that a complete cycle of operation occurs during half a revolution of the helix shaft. Because of the helical arrangement of the lugs, only one of the levers is operated at a time, the remaining levers being withdrawn into inactive position by return springs 422–430.

Attention may next be given to the means for rotating the helix shaft, which mechanism is set forth diagrammatically in Fig. 38. A lift driving lever 440 is provided which is normally biased in a counterclockwise direction by a spring 441. The lever is latched against the force of bias by means of a latch 442 mounted on a release plunger or trigger element 443. The plunger extends downwardly into contact with the release plate 216 in the program unit. It will be apparent upon reference to Fig. 38 that triggering the release plunger 443 frees the lift driving lever 440 for rotation in a counterclockwise direction. A stop 444 is provided to limit the amount of rotation.

Mounted coaxially with the driving lever 440 is a ratchet wheel 450 having a pawl 451 and pawl carrier 452. The pawl carrier is engaged by a slot 453 in the lever 440 so that triggered movement of the lever 440 causes one of the ratchet teeth to be "taken" in preparation for the power stroke which is to follow. At the same time the lever 440 engages the lift release lever 144, causing the same to be rocked backwardly into its stripped position. This sets in motion the chain of events which was discussed in connection with Fig. 13. Briefly stated, the latch controlling the torque shaft 127 is released, which permits the torque shaft to rotate through one-half revolution. During the course of such revolution the operating cam 181 on the shaft 127 presses against the cam follower 189 on the lift release lever 144. This causes the upper end of the lever 144 to exert a power thrust against the lift drive lever 440. The resulting rotation of the pawl 451 connected thereto drives the ratchet wheel 450 through one step of movement. The ratchet wheel 450 is coupled to the helix shaft 411 through a pair of gears 454. This causes lug 420 to react against the stop lever 400 to press the stop 370 out into active position. At the same time the lever controlling the previous stop is disengaged so that the previous stop is retracted.

The entire sequence of operations outlined above is completed within a second or two so that the new stop is positioned as promptly as possible in the path of movement of subsequently inserted cards. The stops are thus switched into active position one by one upon successive actuations of the release plate 216.

In order to get the lift mechanism into synchronism when the recorder is set up, a manual release lever 455 is provided which has a finger plate carrying the word "lift." This release lever is centrally pivoted and the left-hand end thereof is hooked under the latch 442. In operation the finger plate is depressed to initiate a single lift cycle and this is repeated until the desired stop is in extended position. This condition is readily seen by watching a day indicating disc 456 through the apertured cover plate 457, the disc being coupled to the helix shaft 411. Synchronism may be checked at any time by viewing the day disc through the window 71 (Fig. 2) provided in the recorder housing.

Attention may next be given to the means for sensing that a card has been fully inserted and bottomed on the appropriate step. This sensing means is set forth in Figs. 36, 37 and 39 which show the lift unit in partial section. In Fig. 36 the contact slide is in its normal or upraised position where it is held by spring 383. Figs. 37 and 39 show the manner in which the contact slide 381 is forced down when a card is inserted. In Fig. 39 the card 64 is in contact with the upper stop 370, which extends through a slot 380 in the contact slide 381. The rear end of the stop is engaged in the fulcrum plate 382. It is apparent that bottoming a card on the stop 370 causes the stop to be rocked downwardly about its fulcrum forcing the contact slide 381 downwardly into its bottomed position. Any one of the stops 361–370, when engaged by a card, is effective to accomplish this.

One of the effects of moving the contact slide is to operate a switch assembly 460, which controls a printing magnet 461. An adjustable set screw 462 is mounted on the contact slide so that switch operation may be caused to occur at the instant of bottoming. The printing magnet is sufficiently rapid in operation so that the printing impulse is applied immediately. The printing magnet and printing mechanism will be discussed in greater detail in a following section. A further effect of bottoming a card is of interest in connection with manual operation of the recorder. The contact slide 381 has a release member 463 which operates a latch 464, which is normally positioned in the path of movement of the push bar 72. It will be apparent that unless a card is fully inserted the push bar will remain latched and inoperative.

With the lugs 412–420 on the helix shaft 411 arranged in a clockwise or right-hand path (see Fig. 38), the stops are extended in bottom-to-top rotation. This causes printing to take place from top-to-bottom on the card. It is, however, one of the features of the present lift mechanism that this rotation can be reversed in order to provide "up the card" or subtractive printing. This is accomplished simply by replacing the helix shaft 411 with a similar shaft having the lugs arranged in a left-hand rather than a right-hand helical path. Aside from this simple substitution, which may be readily accomplished in the field, no change is required.

*Period print (lock-out) mechanism*

In the preceding section it was assumed that the contact slide would move freely downward upon bottoming a card in the recorder. In accordance with the present invention, means are provided for locking the contact slide against downward movement during certain periods of the day. The recorder is thus effectively locked and neither automatic nor manual operation is possible. The periods of locking and unlocking are programmed in much the same way that the shift and lift functions are programmed. The programming is accomplished by means of the disc 212 in the program unit, which serves to raise the release plate 217. By appropriate setting of the clips on the disc 212, the recorder can be locked at night or during those hours that employees are not working in the plant.

The locking function is performed by a mechanism which is included in the selector mechanism set forth in Figs. 18 and 19. For simplicity of understanding, the period print mechanism has been set forth diagrammatically in Fig. 40.

Obstruction to the downward movement of the contact slide 381 is provided by a contact slide stop member 470, which projects rearwardly from the selector mechanism into the path of movement of an arm 471 fastened to the contact slide. Under normal circumstances the stop 470 is free to move but under conditions of lock-out it is blocked against movement by the mechanism set forth in Fig. 41. Tripping by the disc 212 of the program unit causes the release plate 217 to move upwardly. This trips a latch 472 moving it out of the way of a stop 469 on the release bar so that the release bar is free to rotate in a clockwise direction about its center of pivoting under the influence of a biasing spring 473.

Figure 42:
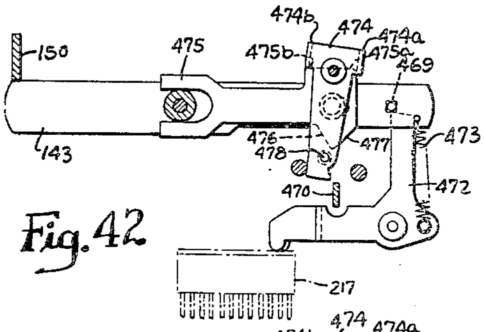

Means are provided for locking and unlocking the stop member 470 in response to rocking movement of the release bar 143, the locking and unlocking occurring upon alternate rocking cycles. For this purpose, a pivoted locking dog 474 is used which rotates into and out of the path of movement of the stop member 470, and a slide 475 is provided on the release bar 143 for moving the locking dog into and out of its locking position. The slide 475 is provided with a pair of camming surfaces 476, 477, which engage a pin 478 mounted at the lower end of the locking dog. In order to visualize the operation of the locking mechanism, reference is made to a series of stop-motion views 42–**42*c*. These views are diagrammatic and show only the essential elements. The normal condition of the locking mechanism is shown in Fig. 42 where the dog 474 is in its clockwise or unlocked position, providing no obstruction to the upward movement of the stop member 470. The slide 475** is to the left.

Figure 42A:
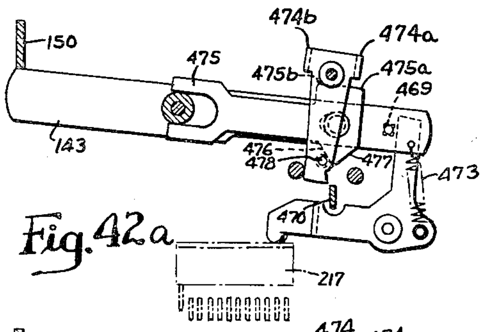

When the latch member 472 is triggered by the program unit, the release bar rotates into the position shown in Fig. 42*a*, under urging of a spring 473. During the course of this movement, the pin 478 at the bottom of the locking dog engages the cam surface 476 on the slide, causing the slide to be moved to its right-hand position on the bar 143.

Figure 42B:
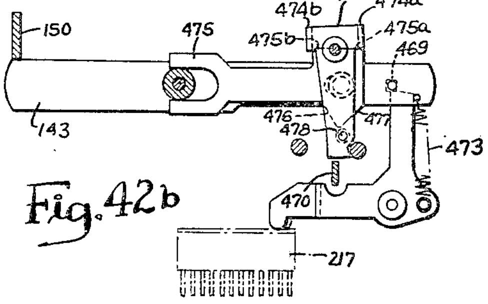
Figure 42C:
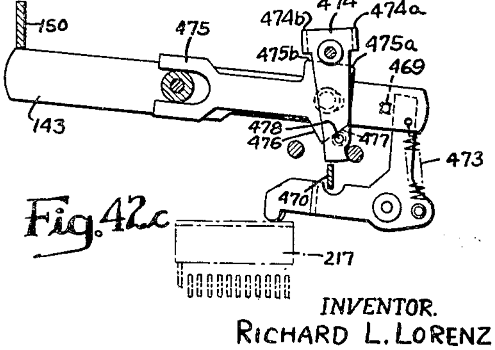

As a result of the tripping of the release bar 143, the torque shaft 127 is released for a half revolution, and this shaft, operating upon the release lever 150 (Fig. 13), forces the release bar 143 into the horizontal position shown in Fig. 42*b*. This restoring movement performs two functions. In the first place, it resets the latch 472 for a subsequent operation. Secondly, the dog 474 is rotated into its alternate or locking position. The latter is brought about by providing ears **474*a* and 474*b* on the dog 474 which cooperate with abutments 475*a* and 475*b* on the slide 475. As previously stated, the tripping movement of the release bar has caused the slide to be in its extreme right-hand position. Thus, abutment 475*a* is alined with the ear 474*a*, and as the release bar is restored to its horizontal position, the dog 474** is rotated counterclockwise into the locking position shown in Fig. 42*b*.

With the locking mechanism as shown in Fig. 42*b*, the recorder is effectively locked, since the contact slide 381 is blocked against movement when a card is inserted. The recorder remains locked until such time as a new operating cycle is initiated by the disc 212 in the program unit. In such cycle the plate 217, raised by the program disc, releases the latch 472, permitting the release bar to drop into the position in Fig. 42*c*. As an incident to this dropping movement, the camming surface 477 on the slide is engaged by the pin 478 on the dog, causing the slide to move into its left-hand position. In such position an abutment **475*b* on the slide is alined with the ear 474*b* on the dog. The power-operated resetting of the release bar 143** then restores the release bar to the position shown in Fig. 42*a* and, as an incident thereto, rotates the dog 474 into the unlocked position. This returns the mechanism to the condition shown in Fig. 42, restoring the recorder to normal operation.

Since the period print device reverses its condition each time it is operated by the program unit, it is desirable that it have absolute reliability. In the present device the mechanism is of the overcenter type. Although overcenter devices are not usually considered highly reliable, particularly when a tensioned overcenter spring is used, the oppositely directed cam surfaces mounted on the slide as shown insure reliability, the locking member being positively moved and locked in either position. The device is nevertheless inexpensive to construct, requiring no more than the usual machining tolerances.

*Operation of lock-out mechanism during shift transition*

In accordance with one of the aspects of the invention, the recorder is locked against operation during the transition period when the shift mechanism is operating to advance the type unit from one column to the next. To accomplish this, an auxiliary locking dog 480 (Fig. 40) is provided which is swingable about an axis at right angles to the previously discussed locking dog 474, and which cooperates with an extension of the stop member 470. A detent member 481 is connected to the dog 480 and includes a series of eight detent positions or serrations. These positions are occupied in turn by a roller 482 on the type unit when the type unit is properly alined for column printing. Under such conditions, the dog 480 connected to the detent and under the urging of a spring 483 is swung clear of the end of the stop element 470 and does not affect the operation of the stop element. However, when the type unit is in process of moving to the next column, the roller 482 moves out of a detent position onto a high spot which causes the dog 480 to swing downwardly into the path of movement of the stop member 470. Under such conditions, insertion of a card will not cause any imprint to occur. However, after the type unit has completed its movement to the next column position, the dog 480 will again swing clear of the stop member 470 and the recorder may be operated normally. It is to be kept in mind that the disablement of the printing mechanism during the shifting operation occupies no more than one or two seconds of time. It does, nevertheless, insure that the recorder will not print an impression on a card until the type unit occupies a precise columnar position, thereby insuring a neat impression under all conditions of operation. Furthermore, careless positioning of the type unit when manually shifting, which would cause over-printing, is thus negated.

For skip-column shifting, it will be understood that a detent member 481 is used which omits the detent positions corresponding to the blank columns, i. e., the appropriate detent spaces are "filled in." Thus, when the type unit occupies a blank column, the locking dog 480 remains in locking position, disabling the recorder until the type unit has had time to move to the next active column. As stated in a previous section, this occupies a period of only one minute and the shift program may be set up so that the minute interval occurs at a time when the recorder is not being used by the workmen.

*Color change mechanism*

It is one of the features of the present recorder that printing takes place with ordinary blue or black ink during all conditions when employees are likely to be using the recorder, i. e., at the beginning and end of a shift, and that the printing is done with red or other distinctively colored ink at all other times. This program is controlled by setting up clips on the disc 215 in the program unit. Transfer from one color to the opposite color takes place upon successive operations of the release plate 220. The mechanism for accomplishing this is set forth in Figs. 43 and 44, Fig. 44 being a diagrammatic representation.

Referring to Fig. 44, the release bar 142 which controls the color change function is connected to a push rod 490, which in turn is pivoted to a color change lever 491, which is biased in the clockwise direction by a biasing spring 492. The end of the lever 491 is coupled to a pawl disc 493 carrying a pawl 494. The latter operates a ratchet wheel 495, which is directly coupled to a 3-lobed cam 496. The cam is spanned by a cam follower 497 having rollers 498, 499 and, because of the shape of the cam, the follower is positively switched from one extreme position to the other each time the cam is advanced one step.

The cam follower 497 is rigidly connected to the ribbon carriage 500 which is pivoted for bodily rocking on brackets 501, 502. A spring 503 is provided for counterweighting the ribbon carriage. The 2-color ribbon 505 travels between spools 506, 507. A ratchet mechanism 508 (Fig. 5) is provided for advancing the ribbon a small increment following each imprinting operation. Such ratchet mechanism is driven by a roller 509 coupled to a lever 509*a* which forms a part of the printing mechanism to be discussed and which oscillates back and forth at each imprint. The ratchet mechanism for the ribbon is conventional and need not be discussed.

Operation takes place as follows: Color change is initiated by the raising of the release plate 220 associated with the program disc 215 in the program unit. Engaging the release plate 220 is a trigger element 510, which forms a part of the latch 511. The latter cooperates with a stop 512 mounted on the color change release bar 142. Upon tripping of the latch 511 by the program unit, the release bar 142 is free to rotate in a clockwise direction under the urging of the spring 492. This causes the ratchet pawl to "take a tooth" in readiness for forward ratcheting.

As described in connection with Fig. 13, tripping of the release bar 142 causes the torque shaft 127 to be rotated through one-half turn. The resulting rotation of the cam 181 acting upon the lower release arm 150 forcibly restores the release bar 142 to its initial position.

The restoring movement is accompanied by an upward thrust on the push rod 490, producing clockwise rotation of the pawl disc which forcibly advances the ratchet wheel 495. The change-over cam 496 is thereby rotated through one step of movement, causing the inking carriage to shift to its opposite position to change the color.

At the same time the restoring movement of the release bar causes the latch 511 to be reset. The color remains the same until another color change is initiated by the program unit.

*Signal mechanism*

The final function performed by the program unit is the actuation of a signal switch at predetermined times during the course of the working day. This function is controlled by the disc 214 in the program unit (see Figs. 11, 45) which operates release plate 219. The release plate 219 is coupled to a signal switch 513, which is mounted on the index plate 230 of the program unit. The switch has a plunger 513*a*, which bears against a bell crank 513*b*. The bell crank is operated by an arm 514 which is riveted or otherwise fastened to the release plate 219. It will be apparent from Fig. 45 that upward movement of the release plate causes clockwise rotation of the bell crank, thereby operating the signal switch. If desired, a signal device may be controlled directly by the switch 513, the length of the signal depending upon the length of time that the sensing fingers associated with the disc 214 remain upraised. Normally, however, a separate timing circuit, well known to one skilled in the art, is used which is triggered by closure of the switch contacts and which limits the duration of the signal to, say, four seconds.

*Type unit*

Up to this point in the discussion, the type unit 84 has been discussed simply as a unit and it has been assumed that the setting of its discs appropriately changes upon passage of time. It is the purpose of the present section to discuss the internal mechanism of the type unit shown in Figs. 46–52 and to describe the manner in which the positioning of the intput gear 84*a* causes change in the day-hour-minute indication.

Minute indication is provided by a minute type disc 516. The latter has an integral gear 515 (Fig. 50) which meshes with the input gear 84*a*. In order to operate the next or hour disc, a mechanism is provided which includes, first of all, a detent disc 517. The detent disc has a notch 518 formed in its edge portion, which is engaged by a post 519 on the gear 515. This permits limited rotational movement of the detent disc relative to the gear. A spring 521 is provided for normally biasing the detent disc in a counterclockwise direction so that the post 519 seats in the end 518*a* of the notch 518. One end of the spring is connected to the post 519 and the other end being hooked to a post 522 on the detent disc. The detent disc 517 has a detent 520 formed in its periphery. Generally alined with the detent disc 517 is a detent lever 525. This detent lever has a pawl portion 526 and a cam follower portion 527. The detent lever, as will be seen, engages the detent in order to store up energy in the spring for shifting the hour disc.

Rigidly coupled to the detent disc 517 is an hour change-over disc 530. The hour change-over disc lies adjacent an hour gear 531, which is connected to the hour type disc 532 by a shaft 533. A Geneva gear arrangement is provided for coupling the hour change-over disc 530 to the hour gear 531. The Genevera gear elements include teeth 535 (Fig. 51) mounted on the periphery of the disc 530 cooperating with a star wheel 536. The star wheel 536 is formed integrally with a pinion 537, which meshes with the hour gear 531.

For the purpose of locking the Geneva mechanism between the hour change-over, the Geneva gear teeth 535 are recessed with respect to the disc 530, the disc 530 being scalloped out, as indicated at 538. When the change-over disc rotates to bring the teeth 535 into engagement with the star wheel, the pinion 537 is rotated, causing rotation of the hour gear 531 and advancement of the type disc 532.

It is one of the features of the present construction that the change-over disc 530 is not coupled directly to the minute disc, but is connected thereto by the spring 521. Because the detent locks in as the change-over point is approached, the change-over disc is retarded and energy is stored in the spring 521. Preferably energy for change-over is stored during a period of 4 minutes prior to the hour, and is released upon the hour.

The operation of the above change-over mechanism may be readily understood by considering the following operating sequence. Referring particularly to Fig. 50, the minute type disc 516 is rotated in a counterclockwise direction upon passage of time. During such movement the post 519 is biased solidly against the end 518*a* of the notch 518 and the detent disc 517 rotates in unison with the type disc 516. For the first 56 minutes of the hour, the detent lever 525 rides idly on the edge of the detent disc. Four minutes prior to the end of the hour, rotation of the detent disc 517 brings the detent 520 into blocking engagement with the detent lever 525. Further rotation of the type disc 516 during the last 4 minutes of the hour takes place with the detent disc blocked, the post 519 leaving the end 518*a* of the notch so that energy is stored in the coil spring 521.

Just before the end of the hour the post 519 has rotated into contact with the cam follower portion 527 of the detent lever. The post 519 upon further movement cams the detent lever 525 upwardly out of engagement with the detent. With the obstruction removed, the detent disc 517 is then free to "catch up with" the minute type disc, and rotation of the detent disc takes place under the urging of the spring until the post 519 is again seated in the position 518*a*. This causes extremely rapid rotation of the changeover disc 530, which is connected to the detent disc. The Geneva mechanism during such movement imparts one step of rotation to the hour gear 531, which advances the hour disc 532 to the next hour. The hour disc is locked in this position until the above operation is repeated at the end of the following hour.

Since the change-over energy is stored in the spring during a 4-minute period, the torque required for change-over is substantially less than that which would be required by a conventional Geneva arrangement. Only a very small amount of power need be supplied by the long pinion 107. Thus, also, the present construction overcomes the inherent discrepancy between the angular movement of disc 216 and disc 532.

Novel means are also provided for indicating the day of the week during each imprint and for causing change-over of the day of the week automatically. As shown in Fig. 52, the day is indicated in abbreviated form on the periphery of a day disc 540. For the purpose of changing the day disc, a day change-over disc 541 is provided which is direct-coupled to the hour disc 532 by the shaft 533. Lying adjacent the day change-over disc 541 is a day disc gear 543, which is coupled directly to the day disc. A Geneva mechanism 545 is provided for causing the day disc to move one step at the end of each 24-hour day. This Geneva mechanism includes gear teeth 546 on the periphery of the disc 541, meshing with a pinion 547. Integral with the pinion 547 is a pinion 548, which meshes with the teeth of the gear 543. The pinion 548 in the present instance is in the form of four circumferentially arranged lugs which are spaced to register with the square-formed teeth of the gear 543.

Upon expiration of a 24-hour day, the Geneva mechanism advances the day disc one step. In order to insure accurate positioning of the day disc and to lock it in its new position, a locking arm 550 is employed having a positioning lug 551 and a biasing spring 554. At the end of the arm 550 is a cam follower portion 552, which engages a four-lobed cam 553. Under normal conditions, the locking arm is in its lowered position with the lug 551 snugly received between two of the teeth of the gear 543. However, as the end of the day approaches, and as the pinion 547 begins to rotate, rotation of the cam 553 causes the arm 550 to be upraised and the positioning lug 551 to be withdrawn. Movement of the gear 543 then causes change-over of the day disc, and the final movement of the cam 553 again lowers the positioning lug 551 into the next tooth space. The day disc is thus locked against further movement for another period of 24 hours. Similar construction is used when a date wheel supplants the day wheel, the only difference being that the gear 543 is formed with 31 rather than 28 notches in its periphery.

The type unit discussed above is easily put into a condition of synchronism when the recorder is placed in operation. The hour and minute are set by manually rotating the time shaft 106 carrying the pinion 107. The day is set by rotating the Geneva mechanism 545. Since the Geneva mechanism employed for day change-over is not of the locking type, the day disc may be advanced into synchronism very quickly and without rotating the day change-over disc 541 through a large number of revolutions.

Provision is made for identifying the particular recorder on which the imprint has been made. This is accomplished by auxiliary slugs 556, 557 adjacent the discs. These may be installed without dismounting the type unit from the recorder.

*Automatic printing mechanism*

Printing power for the present recorder is normally supplied from the commercial A.-C. line. Thus, bottoming a card in the recorder operates a switch mechanism 460 (Fig. 39), which is in series with an A.-C. magnet 461. The magnet 461 operates a printing mechanism which forces the card into contact with the discs in the type unit by impact with the ink ribbon interposed to provide the printed impression.

The mechanism for accomplishing the above is set forth diagrammatically in Fig. 53, the side and front views being shown in Figs. 17 and 54, respectively.

To provide the necessary impact, a printing hammer 560 is employed. This hammer extends vertically within the mechanism, being pivoted at 561 and having a rubber-inserted transversely extending head 562. The head is sufficiently wide as to apply a printing impact at any column on the inserted card. Extending rearwardly from the printing hammer 560 are cam fingers 563 (only one of which is shown) having downwardly facing surfaces for receiving the motion of the magnet 461.

Turning attention now to the magnet and associated structure, it will be seen that the magnet has an armature 570 mounted on arms 571, 572. Pivoted to the outer end of the arms 571, 572, is a rocker actuator 573 having side walls 574, 575. This actuator is guided for vertical movement by two guides, one of which is shown at 576 (Fig. 17). Arranged above the rocker actuator 573 is a U-shaped rocker 580 having rollers 581, 582, which are positioned in alinement with the side walls of the rocker actuator. The rocker is pivoted on a transverse axis 583.

The cam fingers 563 on the printing hammer are arranged in the upward path of movement of the rollers 581, 582, respectively. Each of the rollers 581, 582 is preferably composed of two roller elements arranged side by side and freely rotatable with respect to one another. The inner rollers 581—582 are in arcuate contact with edges 576 (Fig. 17) and serve to back up the forward force stroke of the hammer 560. The outer rollers 581—582 contact cam pieces 563 of the hammer 560. Since the inner rollers revolve oppositely to the outer ones, a pair of each is used.

During normal operation, bottoming of a card in the recorder causes the armature to be drawn upwardly with abrupt movement. Such movement is imparted to the rocker actuator 573 and to the rollers 581, 582 on the rocker. The rollers contact the cam fingers 563 causing the printing hammer to strike against the inserted card for the printing of the time data. The printing operation is accomplished so quickly that printing on the proper line is assured.

The card-actuated switch assembly 460 has been referred to only generally in the above discussion. Attention may next be given to the details of construction of this switch since it includes a number of worthwhile features. Referring to Fig. 55, the switch assembly is shown in perspective, and the placement of the switch relative to the card-receiving mechanism is shown diagrammatically in Fig. 39. Figs. 56–59 are a series of stop motion views in partial cross section, illustrating a complete cycle of the operation.

The switch assembly 460 has a release lever 590, which carries a forwardly extending treadle 591. The treadle is upwardly biased by a spring 592. It will be recalled from the discussion of Fig. 39 that the treadle 591 is arranged in the path of movement of a set screw 462 on a contact slide 381, which slide is moved downwardly upon bottoming a card in the recorder.

Horizontally pivoted above the release lever 590 is an upwardly extending switch lever 593 having a contact arm 594 and a stop member 595 at its lower end. Arranged in the path of movement of the contact arm 594 are contacts 596 which are connected to the printing magnet. The switch lever is biased in the contact-closing direction by a strong spring 597.

Figures 56, 57, 58, 59:
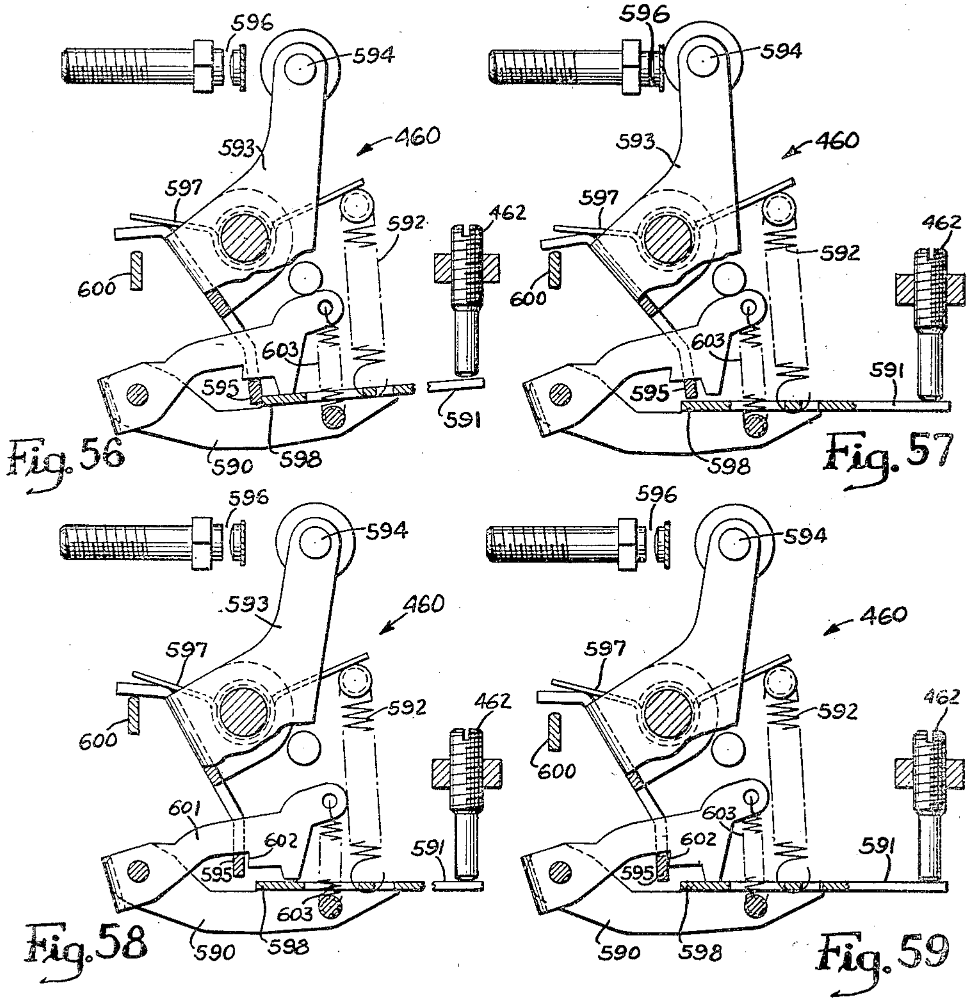

Prior to insertion of a card, the switch mechanism is in the condition shown in Fig. 56. The release lever 590 is in its upraised position and a latch surface 598 thereon abuts the stop 594 on the switch lever. When a card is inserted in the recorder and properly bottomed, the set screw 462 strikes the treadle 591, moving the release lever 590 down into the position shown in Fig. 57. This releases the stop member 594 and the switch lever then rocks rearwardly to close the contacts 596, energizing the magnet which applies the printing impulse. The resulting movement of the magnet armature is utilized for reopening the switch contacts. For this purpose the rocker actuator 573 (Fig. 53) is fitted with an upstanding reset arm 600. Upward movement of the reset arm 600 against the switch lever 593 (Fig. 58) causes the lever to be rotated in a clockwise direction, thereby opening the contacts 596.

In carrying out the invention, means are provided for latching the switch lever in its open position, regardless of whether the card is withdrawn or has been held in the recorder. This is accomplished by an auxiliary latch member 601 having an auxiliary latching surface 602 and biased downwardly by a spring 603. It will be seen in Fig. 58 that the restoring movement imparted to the switch lever by the reset arm 600 rotates the stop 594 to a position behind the latch surface 602. Thus, when the arm 600 falls back to its normal position, as shown in Fig. 59, the switch lever is latched open. The switch contacts thus remain open in spite of the fact that a card may be held in the recorder and repeated impact or recycling is prevented. When the card is taken out of the recorder, the release lever 590 and the treadle 591 thereon again assume the position of readiness shown in Fig. 56.

*Manual printing mechanism*

It is one of the features of the present recorder that printing may be accomplished manually whenever the A.-C. power fails and provided that a card is inserted into a bottomed position in the recorder. The mechanism for accomplishing manual operation is shown diagrammatically in Figs. 39 and 53 and in more complete form in the side and front views of Figs. 17 and 54, respectively. The push bar 72 is at the back of the case (see Fig. 2) in an out-of-the-way position. The push bar is mounted for vertical movement on a slide plate 605. Arranged directly under the push bar is a printing spring 606 in which energy is stored as the push bar is pressed downwardly. The spring 606 is engaged at its lower end by a manual plunger 607, the lower end of which is positioned directly above the cross arm of the rocker 580. The elements 580, 607 are for convenience shown separated in Fig. 53.

A latch mechanism is provided for preventing movement of the manual plunger until the push bar 72 is fully depressed. This is accomplished by a latch lever 608, which engages a stop 609 integrally formed in the lower end of the manual plunger. The upper portion of the latch lever 608 rides against a cam 610 mounted on the push bar plate 605. A spring 611 is provided for keeping the latch and cam in engagement with one another.

It will be apparent that when the push bar 72 is depressed, force is built up in the printing spring 606. The latch 608 is tripped at the end of the downward stroke of the push bar, releasing the manual plunger which is then projected downwardly into contact with the rocker 580. The rollers 581, 582 thereon then contact the cam fingers 563 on the printing hammer to produce an imprint. Since friction is reduced to a minimum in the mechanism described above, it is found that very little force is required to produce a clear, positive impression.

As previously stated in connection with Fig. 39, an interlock 464 is provided for preventing manual operation of the plunger unless a card is bottomed in the recorder. The construction of this interlock is set forth in detail in Fig. 60. Here it will be noted that the lock includes two arms 612, 613, which are held together by a spring 614 to rotate as a unit similar to a bell crank. The upper end of the arm 613 is placed in the path of movement of a lug 615 on the push bar plate, and is maintained in this position by a biasing spring 616. When a card is bottomed, the arm 463 on the contact slide moves downwardly causing the unlocking arm 613 to move out of the way of the lug 615 and permitting the manual printing sequence set forth above. By "splitting" the unlocking arm as shown, there is no interference with automatic printing if a person should put pressure on the push bar during this time.

When power is restored to the A.-C. supply lines, the present recorder is in condition to resume fully automatic operation. Time cards subsequently inserted will cause a magnet to be operated instantaneously as the card reaches the lowermost position. The "thump" accompanying electrical printing signifies clearly to the workman that printing has taken place and he will recognize immediately that there is no need to press the manual plunger. Check-out lines can flow smoothly without delay or disorder, even though the A.-C. power may fail repeatedly during the check-out interval. Furthermore, all of the cards, whether printed electrically or by hand, bear the same uniform indication. Completeness of records is assured.

*Power requirements for recorder*

Except for obtaining its printing energy from the A.-C. supply lines, the recorder described above obtains its energy from the timing impulse which arrives at the beginning of each minute and has a duration of 2 seconds. It is one of the features of the recorder that energy is derived from the solenoid both on the power stroke and on the return stroke of the armature. On the power stroke the timing lever which is connected to the solenoid winds up the energy storage spring 121 and compresses the return spring 105. On the return stroke the timing lever rotates the timing shaft 107, which advances the type unit, indicator clock and program unit. One of the advantages of such arrangement is that the load imposed upon the solenoid during the power stroke is a spring load which may be determined with a high degree of accuracy and which is consistent from one operation to the next. This consistency enables the spring loading to be adjusted to a point which is relatively close to the power capabilities of the solenoid. Furthermore, the spring loading curve, as a function of displacement, is caused to coincide very closely to the force curve of the solenoid. Both of these factors enable the energy of the solenoid to be utilized to the maximum possible extent (see Fig. 10*b*).

On the return stroke, energy from the spring 105 operates resiliently on the connected load. The energy demands placed upon the spring 105 are moderate, since the type unit is designed for very low operating torque and since the gears 111–114 (see Fig. 9) connected to the program unit have a relatively high mechanical advantage. This, combined with the inherently low torque requirements of the program unit, makes it possible to operate all five of the release plates 216–220 at the same time with complete reliability.

The amount of energy required by the storge spring 121 is moderate, since energy is stored in the spring over a long period and is released in relatively short bursts. As a result, it is found that the recorder may be operated at conventional voltages with a current drain of less than 1/10 of an ampere. The voltages, by way of example, may be on the order of 40 volts.

This extremely low current drain enables the present recorder to be substituted for conventional recorders in existing systems, without necessity for rewiring the impulse leads from the master clock. Or, if desired, the present recorder may be added to existing systems without overloading the supply lines. Since in many factories and other commercial establishments the impulse lines are lengthy and difficult to replace and since the voltage of the standby power facilities is rather strictly limited, it can readily be seen that the present recorder permits a substantial saving to be made. The lower power drain is also an advantage in new systems, enabling the wiring, batteries and other components to be light-duty and relatively inexpensive, without in any way sacrificing reliability.

*Card-facing mechanism*

The present recorder requires that a card be inserted face forward. Many types of recorders require front-to-back insertion of cards, and it is therefore desirable to provide means for insuring that the card is inserted in the proper fashion. This is accomplished by a novel stop mechanism which is set forth in Figs. 61–64.

Fig. 61 is a fragmentary side view showing the stop mechanism, while Fig. 62 is a fragmentary front view. Fig. 63 shows a card properly inserted in the recorder, while Fig. 64 illustrates the blocking which takes place when a card is improperly inserted.

Referring to Fig. 61, the card 620 is shown inserted into the recorder. Arranged in the path of movement of the card 620 is a laterally slidable stop 621. Horizontally pivoted above the stop 621 is a bell crank release member 622 having a card-engaging or sensing arm 623 and a stop-engaging arm 624. The release member 622 is normally biased in the position shown in Fig. 61 by a coil spring 625.

When a card is properly inserted into the recorder, the lower edge of the card strikes the arm 623 of the release member, and subsequent downward movement rotates the release member in a clockwise direction. This moves the slidable stop out of the path of the card, as shown in Fig. 63, and the card may be bottomed in the recorder for printing in the normal fashion.

Where it is desired to prevent front-to-back insertion, each card is notched at its lower edge as indicated at 626. The notch is sufficiently wide so as to straddle the arm 623 of the release member and sufficiently deep so that the lower edge of the card strikes the stop member 621 at the same time or prior to contact between the card and the release member. This causes the card to be blocked, since the card cannot be moved downwardly the additional amount required to operate the release member and retract the stop 621.

In employing the above arrangement, the stop 621 is preferably mounted near the mouth of the card funnel. The advantage of this is that the card, when improperly inserted, is stopped during the first few inches of movement, thereby clearly signaling to the workman that the failure of the recorder to operate is due to improper insertion and not due to any fault of the recorder itself.

*Use of synchronous motor for timing of system*

In systems employing a number of recorders, it is conventional to operate a mechanical master clock from a D.-C. source using batteries for standby purposes. This type of circuit has been previously discussed in connection with Fig. 4. It is possible, however, to dispense with a mechanical clock and to obtain the timing impulses directly from a synchronous motor. The latter arrangement is particularly useful where failure of the A.-C. power lines is of no particular concern.

Such an alternative arrangement is shown in Fig. 65. Here the solenoid 90 is operated by the timing impulse obtained from a synchronous motor 630. The synchronous motor operates the contacts 631, which are closed for a period of approximately 2 seconds at the beginning of every minute. This applies A.-C. power to a rectifier 632, which in turn applies D.-C. to the solenoid. The operation and construction of the recorder is in all respects the same as that discussed in the preceding sections.

Use of the circuit shown in Fig. 65 permits the signal duration to be controlled by the same timing motor 630, which supplies the timing impulses. This is accomplished in the present instance by providing an auxiliary cam 634 on the shaft of the motor 630, and a set of contacts 635. These contacts are wired in series with the contacts 513 in the program unit. The cam 634 is adjusted so as to provide a signal of 5 or 6 seconds duration.

*Use of synchronous motor for self-contained timing*

Because of the extremely low drain of the present recorder on the timing circuit, the recorder is ideally suited for use in or addition to a system having a remote master clock. It is, however, one of the features of the invention, that the present recorder is not limited to use in such systems, but may be readily adapted for self-contained timing. The modified structure is clearly set forth in Figs. 66 and 67. The solenoid magnet is removed and the timing lever 101 is powered by a small synchronous motor 640. The motor has an output gear 641 which rotates at 1 R. P. M. In order to insure that a purely torsional load is applied to the motor 640, the gear 641 is meshed with a jack shaft gear 642, which rotates a jack shaft 643. The latter shaft carries the cams which are used to drive the timing lever 101.

In carrying out the present invention, the timing lever is coupled to the shaft 643 in such a manner as to provide slow compression but rapid expansion of the return spring 105. This is accomplished by a cam 644 having a sharp point of drop-off 645 and by providing a cam follower 646 for riding on the cam. Simultaneously with the compression of spring 105 energy is imparted to the storage spring 121 in barrel 122 via the ratchet pawl 125. This has the advantage that the motor 640 is subjected to a constant torque load, enabling a smaller motor to be employed than would otherwise be possible.

In accordance with one of the aspects of the invention, means are provided for retracting the drive pawl to "take a tooth" just prior to the release of energy from the spring 105. Referring to the drawings, the drive pawl is indicated at 650 and is carried by a drive pawl lever 651. The drive pawl lever has a cam follower 652 which bears against a notched disc 653 on the jack shaft 643. The notched disc has a drop-off point 654, which is adjusted so that drop-off of the pawl lever occurs just prior to drop-off of the cam follower 646. When drop-off of the pawl lever occurs, the lever is rotated in a clockwise direction by a spring 655. This retracts the drive pawl 650 through the space of one ratchet tooth plus clearance. The timing lever is slotted, as indicated at 656 (Fig. 65*a*) so as to provide a lost motion connection with a drive pawl pin 657 connected to the drive pawl. This permits the drive pawl to be retracted unobstructedly. After retraction, the pin 657 occupies a position at the left-hand end of slot 656 in readiness for a drive thrust by the spring 105.

The drawings (Figs. 66, 67) show the condition of the mechanism just after retraction of the drive pawl and just prior to arrival of the drop-off point 645 on cam 644. As the drop-off point is reached, the timing lever is freed for rapid movement to the right and energy is released from spring 105. This energy is imparted to the timing shaft 106, which drives the program unit, type unit and indicator clock.

One of the advantages of the above arrangement is that the drive pawl 650 is maintained and locked under pin 663 in its forward position throughout each minute interval. This removes the effect of play in the ratchet wheel and insures that the timing shaft 106 is positioned with a high degree of accuracy substantially all of the time.

If desired, the duration of the signal may be controlled by the synchronous motor 630. This is accomplished by providing a cam 660 on the jack shaft 633. Riding on the cam 660 is a cam follower 661 which is connected to a sensitive switch 662. The switch contacts are connected in series with the contacts 513 associated with the signal disc in the program unit. The operation of the cam 660 and its associated contacts is the same as that previously described in connection with cam 634 in the preceding section. The cam 660 is so designed that a ringing signal of the desired duration, for example, 5 or 6 seconds, is produced.

I claim as my invention:

1. In a recorder for use with a direct voltage supply producing periodic impulses of short duration and limited in magnitude by the current-carrying capacity of the supply, the combination comprising a magnetic solenoid connected to said supply, a timing shaft having a driving connection with said solenoid for step-by-step rotation of the shaft, a program unit and type unit coupled to said timing shaft for rotation in unison therewith, means including shift and lift mechanisms of stepping type for positioning an inserted card horizontally and vertically relative to said type unit, means including a storage spring for storing a portion of the energy released by said solenoid, said spring being coupled to the shift and lift mechanism, means including latches arranged for triggering by said program unit at predetermined times for causing stepping of said shift and lift mechanisms by energy stored in said spring, and magnetic means arranged for connection to an A. C. supply line for applying a printing impulse to the card as an incident to bottoming of the same in the recorder.

2. In a recorder for use with a direct voltage supply producing periodic impulses of short duration and limited in magnitude by the current-carrying capacity of the supply, the combination comprising a magnetic solenoid connected to said supply, a timing shaft having a ratchet connection with said solenoid for step-by-step rotational advancement of the shaft, a program unit and type unit coupled to said timing shaft for rotation in unison therewith, means including shift and lift mechanisms for positioning an inserted card relative to said type unit, means including a storage spring having a ratchet connection with said solenoid for winding of said spring, means including latches operated by said program unit for causing transfer of energy from said spring to said shift and lift mechanisms for causing stepping of such mechanisms at predetermined times, and means connected to a separate source of energy for printingly engaging the card and the type unit upon manual bottoming of the card in the recorder.

3. In a recorder for use with a direct voltage supply producing periodic impulses of short duration and limited in magnitude by the current-carrying capacity of the supply, the combination comprising a magnetic solenoid connected to said supply and having a return spring, a timing shaft having a ratchet connection with said solenoid for rotational advancement on the return stroke thereof, a program unit and type unit coupled to said timing shaft for rotation in unison therewith, shift and lift mechanisms of the stepping type for positioning an inserted card relative to said type unit, a storage spring having a ratchet connection with said solenoid for winding on the power stroke of the solenoid, means including latches arranged for triggering by said program unit at predetermined times for causing transfer of energy from said spring to said shift and lift mechanisms for stepping of such mechanisms, and means connected to a separate source of energy for applying a printing impulse to the card as an incident to bottoming of the same in the recorder.

4. In a time recorder having a type unit and having shift and lift mechanisms for periodic repositioning of a record card relative to said type unit, the combination of a card receiver, a sensing member shifted to a bottomed position upon bottoming the card in the card receiver, a time-printing mechanism, a printing magnet coupled to said time printed mechanism and arranged for connection to an A.-C. supply line, a switch for causing operation of the printing magnet in response to shifting of the sensing member to its bottomed position, means including a manual push bar coupled to said time-printing mechanism for manually operating the same, a latch member arranged in the path of movement of the push bar, means for normally preventing manual movement of the push bar, and means coupling said latch member to said sensing member so that the latch member is moved out of its latching position incident to movement of the sensing member to its bottomed position thereby to free the push bar for manual operation.

5. In a time recorder having a type unit and having shift and lift mechanisms for periodic repositioning of a record card relative to said type unit, the combination of a card receiver, a contact slide shiftable to a bottomed position upon bottoming the card in the card receiver, an impulse producing mechanism for causing said card to be impulsed forcibly against said type unit for applying time indicia thereto, a printing magnet arranged to operate said impulse mechanism and having provision for connection to an A.-C. supply line, a switch for causing operation of the printing magnet in response to arrival of the contact slide at its bottomed position, means including a manual push bar for manually operating said impulse mechanism, a latch mechanism including a latch arranged in the path of movement of the push bar means for normally disabling the push bar but for releasing the same upon shift of the contact slide to its fully bottomed position thereby to permit manual operation when a card is bottomed in the recorder, means including a timed program unit for programming the operations of the time recorder, and lockout means coupled to the program unit for blocking movement of the contact slide for preventing operation of both the printing magnet and the push bar during predetermined time intervals.

6. In a time recorder, the combination of a timing mechanism, a program unit and a type unit driven thereby, lift and shift units operated by said program unit for positioning a record card relative to said type unit, means including a movable sensing member movable into a bottomed position upon the bottomed insertion of a card into the recorder, a printing mechanism associated with said type unit for applying printed time indicia to said card, means including a printing magnet for operating the printing mechanism and arranged for connection to an A.-C. supply line, a switch for causing operation of the printing magnet, means including a manual push bar for manually operating the printing mechanism, a conditioning mechanism associated with said push bar, said conditioning mechanism including a conditioning member shiftable between a normal first position in which the push bar is made ineffective and a second position in which the push bar is effective to produce manual printing, means coupled to the sensing member for (*a*) moving the conditioning member into its second position and (*b*) operating said switch when the sensing member is moved to its bottomed position.

7. In a time recorder, the combination of a card receiver, a lift mechanism having a series of selectable stops for vertically positioning a card in the recorder, said lift mechanism having a spring-returned slide for mounting said stops so that the slide is shifted to a bottomed position when a card is bottomed in the card receiver on any selected one of said stops, a printing magnet arranged for connection to an A.-C. supply line, a switch for causing operation of the printing magnet in response to shifting of the slide, means including a manual push bar for manually applying a printing impulse, and latch means including a member movable between two positions in which the push bar is disabled and released, respectively, for normally disabling the push bar but for releasing the same upon shifting of the slide to its bottomed position thereby to permit manual operation of the recorder during failure of the A.-C. supply line.

8. In a workmen's in-and-out recorder, the combination comprising a card receiver having a plurality of stops, switching means for switching said stops sequentially into the path of movement of an inserted time card, a drive member for operating the switching means, said drive member being mounted for oscillating movement and having a ratchet mechanism for advancing the switching means one step during each complete oscillation thereof, said drive member having a return spring, means including a program latch for normally holding the drive member in a cocked position against the force of the return spring, program means for tripping the latch for movement of the drive member under the influence of the return spring, and reset means responsive to the movement of the drive member from its cocked position for resetting the member back to its cocked position, thereby to complete a cycle of oscillating movement.

9. In a workmen's in-and-out recorder, the combination comprising a card receiver having a plurality of stops, switching means for switching said stops sequentially into the path of movement of an inserted time card, a drive member mounted for oscillation forward and back, a stepping mechanism connected to the drive member for advancing the switching means one step during the forward movement of the drive member, said drive member having a return spring, means including a program latch for normally holding the drive member in a cocked position against the force of the return spring, program means for tripping the latch for movement of the drive member under the influence of the return spring, means for detecting movement of the drive member from its cocked position, and means actuated by the detecting means for resetting the drive member back to its cocked position.

10. In a workmen's in-and-out recorder, the combination comprising a card receiver having a plurality of stops, switching means including a drive shaft for switching said stops sequentially into the path of movement of an inserted time card, a drive member mounted for oscillation forward and back, a stepping mechanism interposed between the drive member and the drive shaft for advancing the switching means one step during the forward movement of the drive member, said drive member having a return spring, a latch arranged in the path of movement of the drive member for holding the drive member in cocked position against the force of the spring, program means for releasing said latch at a predetermined time and thereby releasing said drive member for movement under the influence of the return spring, a lift release lever arranged in the path of return movement of the drive member, and means triggered by the resulting movement of the release lever for applying restoring torque to the release lever to effect switching of said stops and simultaneous resetting of the drive member to its cocked position.

11. In a workmen's in-and-out recorder, the combination comprising a card receiver having a plurality of stops, switching means for switching said stops sequentially into the path of movement of an inserted time card, a drive member mounted for movement forward and back, a stepping mechanism connected to the drive member for advancing the switching means one step during a single step of movement of the drive member, said drive member having a return spring, means including a program latch for normally holding the drive member in a cocked position against the force of the return spring, program means for tripping the latch for movement of the drive member under the influence of the return spring, an energy storage spring, means including a shaft for coupling the energy storage spring to the drive member and so arranged that upon rotation of the shaft by said spring the drive member is reset to its cocked position, means including a drive latch for normally latching said shaft against movement, and means actuated upon tripping of the program latch by said program unit for causing sequential tripping of said drive latch.

12. In a workmen's in-and-out time recorder, means for receiving an inserted time card, a plurality of stop members arranged one above the other, a vertically arranged slide member for receiving the stop members and for supporting the forward portion thereof, a lift selector mechanism for moving a selected one of said stop members into the path of movement of the card, a spring for urging the slide member upwardly, means for fulcruming the rear portions of said stop members for bodily rotation of the stop members about respective horizontal axes so that bottoming the inserted card on the active one of said stop members causes downward movement of the slide member against the force of said spring to a lower limit position, printing means for applying a printed impression on said card, and means responsive to arrival of the slide member at its lower limit position for operating said printing means thereby to insure accurate vertical location of the printed impression on the card.

13. In a workmen's in-and-out time recorder, means for receiving an inserted time card, a plurality of stop members arranged one above the other, a vertically arranged slide member for receiving the stop members and for supporting the same, a lift selector mechanism for moving a selected one of said stop members into the path of movement of the card, a spring for urging the slide member normally upward so that bottoming the inserted card on the active one of said stop members causes bottoming movement of the slide to a lower limit position, means including an electromagnet for applying a printed impression on said card, and a switch responsive to bottoming movement of the slide member for operating said electromagnet thereby to insure accurate vertical location of the printed impression on the card.

14. In a workmen's in-and-out time recorder, means for receiving an inserted time card, a plurality of stop members arranged one above the other, a lift selector mechanism for moving a selected one of said stop members into the path of movement of the time card, each of said stop members being arranged for limited bottoming movement upon engagement by the inserted card, a slide member for mounting said stop members and mounted for vertical sliding movement between upper and lower limit positions, a spring for biasing the slide member upwardly, a printer, means including a push bar and an electromagnet both arranged to operate said printer, a latch for normally locking said push bar against movement, and means actuated upon said slide member reaching its lower limit position for simultaneously releasing said latch and energizing said electromagnet.

15. In a workmen's in-and-out time recorder, means for receiving an inserted card, a stop means arranged in the path of movement of the inserted card for positioning a card at a predetermined level, a selector mechanism for adjusting the level of the stop means, means for sensing contact between said card and said stop means, a printing mechanism, means including an electromagnet and a manual push bar mechanism both coupled to the printing mechanism for operating the same, means for normally disabling the push bar, and means operated by said sensing means for simultaneously energizing said electromagnet and abling said push bar.

16. In a workmen's in-and-out time recorder, the subcombination comprising a frame plate having a central opening, a contact slide mounted flatly along one side of said frame plate adjacent said opening, a plurality of stop members in said contact slide arranged one above the other, each of said stop members being mounted for sliding movement outwardly from the face of said contact slide and through the opening in said frame plate into active position, means including a power-actuated member for switching said stops sequentially into said active position, said frame plate having a card-receiving funnel for guiding an inserted card into contact with the active one of said stop members, and means for causing imprinting of the inserted card when the card is bottomed on the active stop member.

17. In a workmen's in-and-out time recorder, a lift mechanism for vertical positioning of an inserted card, a type unit, a shift mechanism for lateral positioning of an inserted card relative to the type unit, a magnetic actuator, a torque shaft, means including an energy-storing spring coupled to said torque shaft, means including a ratchet advanced incrementally by said magnetic actuator for winding said spring, a latch for normally preventing rotation of said torque shaft, and means including a program unit for selectively coupling said lift and shift mechanisms to said torque shaft and for releasing the torque shaft latch for limited rotation of said torque shaft.

18. In a workmen's in-and-out time recorder, a lift mechanism for vertical positioning of an inserted card, a type unit, a shift mechanism for lateral positioning of an inserted card relative to the type unit, a periodically operating magnetic actuator, a torque shaft, means including an energy-storing spring coupled to said torque shaft, means including a ratchet incrementally advanced by said magnetic actuator for winding said spring, a latch for normally preventing rotation of said torque shaft, a slip clutch interposed between said ratchet and said spring for preventing overwinding of the latter, and means including a program unit for selectively coupling said lift and shift mechanisms to said torque shaft and for releasing the torque shaft latch for limited rotation of said torque shaft.

19. In a workmen's in-and-out time recorder, a lift mechanism for vertical positioning of an inserted card, a type unit, a shift mechanism for lateral positioning of an inserted card relative to the type unit, a periodically energized solenoid magnet, a torque shaft, means for coupling the same to said lift and shift mechanisms, an energy-storing spring connected to said torque shaft, a stepping mechanism operated by said solenoid for winding said spring, means including a latch for normally preventing rotation of said torque shaft, means including a program unit for selectively triggering said lift and shift mechanisms for operation by said torque shaft, and means for automatically resetting said latch after predetermined rotation of said torque shaft.

20. In a workmen's in-and-out time recorder, means including a type unit for imprinting time data on the card, a lift mechanism for vertical positioning of an inserted card and a shift mechanism for horizontal positioning of an inserted card relative to the type unit, a torque shaft, a spring for applying torque to said torque shaft, means including a latch for restraining said torque shaft against rotation, a program unit, means operated by said program unit for coupling said torque shaft to said lift and shift mechanisms and for releasing said latch for transfer of energy from said spring to said lift and shift mechanisms, and means driven by said torque shaft for positively restoring the latch to its latching position upon predetermined limited rotation of the torque shaft.

21. In a workmen's in-and-out time recorder, means including a type unit for imprinting time data on the card, a lift mechanism for vertical positioning of an inserted card and a shift mechanism for horizontal positioning of an inserted card relative to the type unit, a torque shaft, a spring for applying torque to said torque shaft, means including a latch for restraining said torque shaft against rotation, a program unit, means operated by said program unit for coupling said torque shaft to said lift and shift mechanisms and for releasing said latch for transfer of energy from said spring to said lift and shift mechanisms, and a cam on said torque shaft for positively restoring the latch to its latching position upon predetermined limited rotation of the torque shaft.

22. In a workmen's in-and-out time recorder, a plurality of function units for performing different functions at predetermined times, a torque shaft, a spring for applying torque to said torque shaft, means including a latch for restraining said torque shaft against rotation, a thrust-applying member coupled to said shaft, release levers associated with each of said function units, a program unit, means operated by said program unit for triggering said release levers from a latched position into a released position in the path of movement of said thrust-applying member, means operated as an incident to triggering at least one of said release levers for releasing the latch on the torque shaft so that thrust is applied to the triggered ones of release levers thereby simultaneously resetting them and providing the energy to perform the corresponding function, and means for relatching the torque shaft after the function has been performed.

23. In a workmen's in-and-out time recorder, a plurality of function units for performing different functions at predetermined times, a timing shaft having a time printer coupled thereto, a torque shaft, a spring for applying torque to said torque shaft, timing means operated periodically for advancing said timing shaft and for winding said spring, means including a latch for restraining said torque shaft against rotation, a program unit, means operated by said program unit for selectively coupling said torque shaft to said function units and for releasing said latch for transfer of energy from said spring to said function units, means for resetting said latch after a predetermined degree of rotation, and means for locking said timing shaft against rotation until after said predetermined degree of rotation has been completed thereby to disable the time shaft in the event of insufficient energy in said spring.

24. In a workmen's in-and-out time recorder, a plurality of function units for performing different functions at predetermined times, a timing shaft having a time printer coupled thereto, a spring motor, timing means operated periodically for rotating said timing shaft and for winding the spring in said motor, a program unit, means operated by said program unit for coupling said motor to selected ones of said function units to cause performance of such functions, and means for disabling said timing shaft during rotation of said motor.

25. In a workmen's in-and-out recorder, a magnetic actuator, a timing shaft, a ratchet mechanism driven by said magnetic actuator for rotating said timing shaft incrementally in accordance with electrical impulses received periodically by said magnetic operator, means including a type unit coupled to said timing shaft for imprinting time indication on a time card, shift and lift mechanisms for controlling the lateral and vertical positioning of the card relative to said type unit, a program unit having timing discs therein for operating said shift and lift mechanisms at predetermined times during the course of the day, a gear train interconnecting said timing shaft and said program discs and having an output gear rigidly coupled to said program discs, the number of teeth on said output gear being integrally related to the number of operating positions of said program discs, and means including a positioning member for wedgingly engaging the teeth of said output gear thereby to insure accurate positioning of the program discs independently of play in said gear train, and means for retracting said positioning member during periods of movement of the gear train.

26. In a workmen's in-and-out time recorder, the combination comprising, a timing shaft, means for rotating the timing shaft in accordance with passage of time, a type unit coupled to said timing shaft, a program unit coupled to said timing shaft, said program unit having a plurality of program discs, and having a series of release members associated with said discs for release at predetermined times, a torque shaft having means for applying torque thereto, function units, means including latches operated by individual ones of said release members for coupling corresponding ones of said function units to said torque shaft for transfer of energy therefrom, and means operated by said torque shaft for resetting said latches in readiness for subsequent unlatching by said program unit.

27. In a workmen's in-and-out recorder, a card-receiver, means including a type unit for making a time imprint on an inserted card, means for mounting said receiver and type unit for relative positioning movement, means for applying a torque including a torque shaft and a latch for releasing the torque shaft for limited rotation, means including a cam for laterally positioning the type unit relative to the card-receiver, a clutch mechanism interposed between the said torque shaft and said cam, a driven program disc having a release member, means coupled to said release member for simultaneously releasing said latch and engaging said clutch to product a step of rotation of the cam and relative shift of the type unit.

28. In a workmen's in-and-out recorder, a card-receiver for receiving cards having vertical columns, means including a type unit for making a time imprint on the inserted card, means for mounting said receiver and type unit for relative positioning movement, means for applying torque including a torque shaft and a latch for releasing the torque shaft for limited rotation, means including a cam and cam follower for laterally positioning the type unit relative to the card-receiver, means for biasing said type unit toward its left-hand position and for maintaining said cam follower in contact with the cam, a clutch mechanism interposed between said torque shaft and said cam, a driven program disc having a release member, means coupled to said release member for simultaneously releasing said latch and engaging said clutch to produce a step of rotation of the cam and relative shift of the type unit, said cam having a relatively sharp point of drop-off so that the type unit returns from the right-hand column to the left-hand column during one step of movement of the cam.

29. In a workmen's in-and-out recorder, a card-receiver for receiving cards having vertical columns, means including a type unit for making a time imprint on the inserted card, means for mounting said receiver and type unit for relative positioning movement, means for applying torque including a torque shaft and a latch for releasing the torque shaft for limited rotation, means including a cam having flatted steps for laterally positioning the type unit relative to the card-receiver, a clutch mechanism interposed between the said torque shaft and said cam, a driven program disc having a release member, means coupled to said release member for simultaneously releasing said latch and engaging said clutch to produce a step of rotation of the cam and relative shift of the type unit from one column on the card to the next column.

30. In a workmen's in-and-out recorder, a card-receiver for receiving cards having vertical columns, means including a type unit for making a time imprint on the inserted card, means for mounting said receiver and type unit for relative positioning movement, means for applying torque including a torque shaft and a latch for releasing the torque shaft for limited rotation, means including a cam for laterally positioning the type unit relative to the card-receiver, a clutch mechanism interposed between the said torque shaft and said cam, a driven program disc having a release member, means coupled to said release member for simultaneously releasing said latch and engaging said clutch to produce a single step of movement of the cam for each operation of the release member, said cam having a constant radius over a portion of its periphery for enabling cam movement without corresponding movement of the printing unit to accommodate cards having a limited number of columns.

31. In a workmen's in-and-out recorder, a card receiver for receiving a card having vertical columns, means including a type unit for making a time imprint on the inserted card, means for mounting said receiver and type unit for relative positioning movement, means for applying torque including a torque shaft and a latch for releasing the torque shaft for limited rotation, means including a cam for laterally positioning the type unit relative to the card receiver, a clutch mechanism interposed between the said torque shaft and said cam, a driven program disc having a release member, and means coupled to said release member for simultaneously releasing said latch and engaging said clutch to produce a step of rotation of the cam and relative shift of the type unit, and means for disabling the imprinting means during movement of the type unit.

32. In a workmen's in-and-out recorder, a card receiver for receiving a card having vertical columns, means including a type unit for making a time imprint on an inserted card, means for mounting said receiver and type unit for relative positioning movement, means for applying torque including a torque shaft and a latch for releasing the torque shaft for limited rotation, means including a cam for laterally positioning the type unit relative to the card receiver, a clutch mechanism interposed between the said torque shaft and said cam, a driven program disc having a release member, means coupled to said release member for simultaneously releasing said latch and engaging said clutch to produce step-by-step rotation of the cam and relative shift of the type unit, and means for setting a desired step phasing between the torque shaft and the cam.

33. In a workmen's in-and-out time recorder having a program unit, the combination comprising a card receiver, a type unit for imprinting the time on a card inserted in the card receiver, a plurality of stop members spaced flatly one above the other, each of said stop members being slidable edgewise into the path of movement of the inserted card, operating levers connected to the stop members respectively, means for biasing said levers and their associated stop members into retracted position, and selector means coupled to the program unit for switching stop members at predetermined times, said selector means including a helically arranged series of abutments alined with respective ones of said levers for camming said levers outwardly in sequence, the selected stop member providing a bottoming abutment for the inserted card.

34. In a workmen's in-and-out time recorder having a program unit, the combination comprising a card receiver, a type unit for imprinting the time on a card inserted into the card receiver, a plurality of stop members spaced flatly one above the other, each of said stop members being slidable edgewise into the path of movement of the inserted card, operating levers connected to the stop members respectively, selector means coupled to the program unit, said selector means including a helically arranged series of abutments alined with respective ones of said levers for camming said levers outwardly in sequence, and resilient connectors interposed between said levers and said stops respectively.

35. In a workmen's in-and-out time recorder employing a program unit having a release member, the combination comprising a card receiver, a type unit for imprinting the time on a card inserted into the card receiver, a plurality of stop members spaced flatly one above the other, each of said stop members being slidable edgewise into active position into the path of movement of the inserted card, camming means for switching said stop members into active position in sequence one by one, in successive steps of camming movement, a source of torque coupled to said camming means, and means operated by a single movement of said release member for causing said torque source to move the camming means through a single step of movement.

36. In a workmen's in-and-out time recorder, the combination of a card receiver, a type unit on one side of said card receiver, a printing hammer at the other side of said card receiver for striking the back surface of a card therein, said printing hammer being hinged at its lower end and normally occupying a rearwardly toppled position, a rocker member, a cam interposed between said rocker member and printing hammer and secured to one of them and so constructed and arranged that the hammer is forcibly propelled from its rearwardly toppled position into engagement with the card, an electromagnetically operated armature coupled to the rocker member for rocking the same, a manual push bar having a snap action mechanism coupled to said rocker member for impulsing said rocker member, said armature and said snap action mechanism each having a one-way force-transmitting connection with the rocker member to permit them to be employed independently for applying a printing impulse to the printing hammer.

37. In a workmen's in-and-out time recorder, the combination of a card receiver, a type unit, a printing hammer for bringing said card into contact with the type unit, a rocker member for engaging said printing hammer, an electromagnetically operated armature and a manual push bar coupled to said rocker member for rocking the latter, said armature and said push bar each having a one-way force-transmitting connection with the rocker member, means for normally locking said push bar against movement, and means for releasing said push bar and simultaneously operating said armature upon bottoming a card in the recorder.

38. In a workmen's in-and-out time recorder having a type unit, a card receiver, a printing hammer for bringing said card into contact with the type unit for the making of a printed impression thereon, an electromagnet coupled to said printing hammer, a switch for operating said electromagnet and positioned for actuation upon bottoming a card in said card receiver, said switch having means for reopening the switch contacts incident to completion of a printing impulse and for maintaining the contacts open until a successive bottoming of a card in said card receiver.

39. In a workmen's in-and-out time recorder having a type unit, a card receiver, a printing hammer for bringing the card into contact with the type unit for the making of a printed impression thereon, an electromagnet coupled to said printing hammer, a switch for operating said electromagnet and positioned for actuation upon bottoming a first card in said card receiver, means actuated by the printing impulse for latching the switch contacts in open position, and means for conditioning the latch for later closure of the contacts by a successively inserted card as an incident to withdrawing said first card thereby to prevent undesired recycling of said electromagnet.

40. In a workmen's in-and-out time recorder having a card receiver, means for preventing front-to-back insertion of a card having an off-center notch in its bottom edge which comprises a stop slidable into and out of the path of movement of the inserted card, means for biasing the stop into active position, a bell crank having a sensing arm arranged in the path of movement of the card and having an operating arm coupled to said stop, said sensing arm being so positioned that (1) when the card is properly inserted the sensing arm abuts the lower edge of the card and retracts the stop out of the way of the card and (2) when the card is inserted front-to-back the sensing arm is alined with the notch in the card causing the stop to remain in its active position.

41. In a workmen's in-and-out time recorder having a card receiver, means for preventing insertion of a card having an off-center notch in its bottom edge when the card is improperly oriented front-to-back, which comprises a stop movable into and out of the path of movement of the inserted card, sensing means arranged in the path of movement of the card, said sensing means being alined with said notch in one of the two possible conditions of orientation of the card, said stop and said sensing means being positioned a short distance below the mouth of the card receiver in order to engage the card during the initial portion of the inserting movement thereof, and means responsive to the movement of the sensing means for causing the stop to be withdrawn from the path of movement of the card when the card is properly oriented.

42. In a workmen's in-and-out time recorder having a card receiver, means for preventing insertion of a card having an off-center irregularity in its bottom edge when the card is improperly oriented front-to-back, which comprises a stop movable into and out of the path of movement of the inserted card, sensing means arranged in the path of movement of the card, said sensing means being aligned with said irregularity in one of the two possible conditions of orientation of the card, and means responsive to the movement of the sensing means upon engagement of the card when the card is properly oriented for causing the stop to be withdrawn from the path of movement of the card, the stop and sensing means being located relatively close to the mouth of the card receiver and so arranged that the sensing means and stop are encountered by the card in close sequence.

43. In a workmen's in-and-out time recorder, the combination comprising a timing lever having a return spring, a synchronous motor, a cam driven by said synchronous motor, a cam follower on said timing lever for engaging said cam to produce gradual compression of the return spring, said cam having a sharp drop-off point to produce rapid return movement of the timing lever under the influence of the return spring, a timing shaft and a ratchet connection between said timing lever and said timing shaft for rapid incremental advancement of the latter.

44. In a workmen's in-and-out time recorder, the combination of a timing lever having a return spring, a synchronous motor having a cam and cam follower for coupling to the timing lever, said cam being so shaped as to provide gradual compression of the return spring and having a sharp drop-off point for the release of the timing lever and expansion of said return spring, a timing shaft having a ratchet wheel thereon, a drive pawl engaging said ratchet wheel and having a lost-motion connection with said timing lever and means coupled to said cam for operation just prior to said drop-off point for retracting said drive pawl in readiness for a power thrust thereon by the return spring.

45. In a workmen's in-and-out recorder for imprinting time date in vertical columns on a time card, the combination of a program unit, a lift unit, a shift unit, and a type unit, a timing member having a magnetic operator for moving the member through a complete cycle including a power stroke and a return stroke at the beginning of each minute, a torque release mechanism including a storage spring and torque shaft, means for winding said spring and for moving said timing shaft through one step of movement during a cycle of movement of the timing member, means for driving the program unit and type unit from said timing shaft, means for driving said shift unit and lift unit from said torque shaft, and means for mounting said units for normal coupling to their respective driving means while permitting the units to be bodily removed.

46. In a workmen's in-and-out recorder for imprinting time data in vertical columns on a time card and for use with an insertable program unit, lift unit, shift unit and type unit, the combination comprising a timing member, magnetically operated means for moving the timing member through a cycle including a power stroke and a return stroke at the beginning of each minute, a torque release mechanism including a storage spring and torque shaft, means for winding said storage spring during the power stroke of the timing member, a timing shaft, means for moving said timing shaft one step of movement during the return stroke of the timing lever, means for driving the program unit and type unit from said timing shaft and means for driving said shift unit and lift unit from said torque shaft.

47. In a workmen's in-and-out recorder, the subcombination comprising a card receiver, a type unit, means for shifting said type unit for movement relative to the card receiver, said shifting means including a cam and cam follower together with means for periodically advancing the same, a manual operator coupled to the type unit, said type unit being coupled to the cam and cam follower by a yieldable connection so that the manual operator is effective to relatively position the type unit independently of the shift mechanism.

48. In a workmen's in-and-out recorder, the subcombination comprising a card receiver, a type unit, means for shifting said type unit for movement relative to the card receiver, said shifting means including a cam and cam follower together with means for periodically advancing the same, a manual operator coupled to the type unit, said type unit being coupled to the cam and cam follower by a yieldable connection so that the manual operator is effective to relatively position the type unit independently of the shift mechanism, means for locking said manual operator, said manual operator having a lost-motion connection with said type unit for permitting normal shifting of said type unit by said shifting means under locked conditions.

49. In a workmen's in-and-out time recorder, the combination comprising a card receiver, a printer for printing time indicia on an inserted card, a lift unit mounted adjacent said card receiver, said lift unit having a frame, a plurality of movable stops arranged one above the other in said frame at equal incremental spacing, means for switching said stops outwardly one by one into the path of movement of an inserted card for determining the degree of insertion thereof, a program unit, means triggered by said program unit for operating said switching means, a fixed stop permanently arranged in the path of movement of the inserted card when the same is inserted into said card receiver, said fixed stop being located at an incremental distance below the lowermost one of the movable stops for engagement of the card when the movable stops are all withdrawn, and means triggered by the bottoming of the card on any one of said stops including the fixed stop for operating the printer.

50. In a workmen's in-and-out time recorder, the combination comprising a card receiver, a program unit, shift and lift units arranged for triggering by the program unit at predetermined points of time, printing means for printing time indicia on a card placed in said card receiver, sensing means responsive to the bottoming of a card in said card receiver for operating the printing means, a lock-out disc in said program unit, and lock-out means coupled to said lock-out disc and having a locked and unlocked condition for disabling the sensing means during predetermined periods, said lock-out means being switched from one condition to its alternative condition successively in response to successive impulses from said program disc.

51. In a workmen's in-and-out time recorder for imprinting time data on a time card, the combination comprising a card receiver, a type unit, a shift unit for positioning said type unit laterally with respect to the card receiver, a lift unit for positioning a card vertically in said card receiver, a program unit, timing means coupled to said type unit and program unit for synchronously advancing the same, printing means cooperating with said type unit for making a printed impression on the time card, and means controlled by said program unit for disabling said printing means during predetermined intervals.

52. In a workmen's in-and-out time recorder for imprinting time data on a time card, the combination comprising a card receiver, a type unit, a shift unit for positioning said type unit laterally with respect to the card receiver, a lift unit for positioning a card vertically in said card receiver, a program unit, timing means coupled to said type unit and program unit for synchronously advancing the same, printing means cooperating with said type unit for making a printed impression on the time card, a torque mechanism, lock-out means coupled to said torque mechanism, and controlled by said program unit for disabling said printing means during predetermined intervals.

53. In a workmen's in-and-out time recorder for imprinting time data on a time card, the combination comprising a card receiver, a type unit, a shift unit for positioning said type unit laterally with respect to the card receiver, a lift unit for positioning a card vertically in said card receiver, a program unit, a torque mechanism including a storage spring, timing means coupled to said type unit and program unit for synchronously advancing the same, printing means cooperating with said type unit for making a printed impression on the time card, and lock-out means coupled to said torque shaft and controlled by said program unit for disabling said printing means during predetermined intervals, said lock-out means having a locked and unlocked condition and so arranged that it is successively switched from one condition to its opposite condition upon successive actuations by said program unit.

54. In a workmen's in-and-out time recorder, the combination comprising a card receiver, a type unit and printer arranged adjacent said card receiver for printing time data on an inserted card, lift and shift units for relatively positioning the type unit and card receiver, a torque mechanism including a storage spring, a program unit for initiating operation of said shift and lift units, a timing shaft drivingly coupled to said type unit and said program unit, a synchronous electric motor, a cam mechanism constantly driven by said electric motor, said cam mechanism having a cam with sharp drop-off, a cam follower having a return spring, means connected to the cam follower for winding the storage spring and compressing the return spring during buildup of the cam, and means operated by the return spring for imparting a step of movement to the timing shaft upon drop-off.

55. In a workmen's in-and-out time recorder, the combination comprising a card receiver, a type unit and printer arranged adjacent said card receiver for printing time data on an inserted card, lift and shift units for relatively positioning the type unit and card receiver, a program unit, a timing lever mounted for limited oscillating movement and having a return spring, a magnetic operator connected to said timing lever, a torque mechanism including an energy-storing spring having a ratchet connection with the timing lever for winding the spring on the power stroke of the latter, a timing shaft having a ratchet connection with said timing lever for advancement of the shaft on the return stroke of the lever, said timing shaft being drivingly coupled to said type unit and said program unit, and means operated by the program unit for releasing energy from said spring to said lift and shift units.

56. In a recorder for use with a direct voltage supply line producing periodic timing impulses of short duration, the combination comprising a solenoid including an armature and having a rising force characteristic, a return spring connected to said armature having a force characteristic which is flatter than the characteristic of the solenoid, timed means including a timing shaft connected to said armature and driven upon return movement thereof when the solenoid is deenergized, means including a torque spring and torque shaft for releasing energy in said recorder for performance of programmed functions, and means including a lost-motion connection between said armature and said torque spring for imparting a step of winding movement to said torque spring during the terminal portion of the power thrust of said armature.

57. In a recorder for use with a direct voltage supply line producing periodic timing impulses of short duration, the combination comprising a solenoid including an armature and having a rising force characteristic, a return spring connected to said armature, timed means including a timing shaft connected to said armature and driven upon return movement thereof when the solenoid is deenergized, means including a torque spring and torque shaft for releasing energy in said recorder for performance of programmed functions, and means for imparting a step of winding movement to said torque spring during the terminal portion of the power thrust of said armature.

58. In a workmen's in-and-out time recorder or the like, the combination comprising a card receiver, a type unit arranged for printing on a card inserted in said card receiver, an ink ribbon carriage for cooperation with said type unit, said ink ribbon carriage being shiftable between two positions for two-color printing, a positioning mechanism for said ink ribbon carriage including a cam and cam follower, said cam follower being arranged to straddle said cam and said cam being so shaped as to move the cam follower positively between two extreme positions in successive steps of rotation of the cam, and means including a program unit and source of torque for producing step-by-step rotation of the cam at predetermined times.

59. In a workmen's in-and-out time recorder or the like, the combination comprising a card receiver, a type unit arranged for printing on a card inserted in said card receiver, an ink ribbon carriage for cooperation with said type unit, said ink ribbon carriage being shiftable between two positions for two-color printing, a positioning mechanism for said ink ribbon carriage including a cam and cam follower, said cam and cam follower being arranged to move the carriage positively between two extreme positions in successive steps of rotation of the cam, a timed program device, a source of torque, and means operated by said program means at predetemined intervals for coupling the source of torque to said cam for stepping movement thereof.

References Cited in the file of this patent

UNITED STATES PATENTS

| | | |
|---|---|---|
| 853,878 | Hawley | May 14, 1907 |
| 935,312 | Larrabee | Sept. 28, 1909 |
| 956,309 | Dey | Apr. 26, 1910 |
| 1,069,303 | Tomlinson | Aug. 5, 1913 |
| 1,082,008 | Bundy | Dec. 23, 1913 |
| 1,143,364 | Crook | June 15, 1915 |
| 2,019,301 | Friden | Oct. 29, 1935 |
| 2,209,783 | Long | July 30, 1940 |
| 2,389,345 | Dell et al. | Nov. 20, 1945 |
| 2,553,644 | Fehr | May 22, 1951 |
| 2,617,706 | Jeffrey | Nov. 11, 1952 |